US012786975B2

(12) United States Patent
Liu et al.

(10) Patent No.: US 12,786,975 B2
(45) Date of Patent: Nov. 3, 2026

(54) COMMUNICATION METHOD AND APPARATUS

(71) Applicant: HUAWEI TECHNOLOGIES CO., LTD., Shenzhen (CN)

(72) Inventors: Yunfeng Liu, Shenzhen (CN); Zhiheng Guo, Beijing (CN); Ruixiang Ma, Shenzhen (CN); Xinqian Xie, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 18/750,760

(22) Filed: Jun. 21, 2024

(65) Prior Publication Data

US 2024/0349264 A1 Oct. 17, 2024

Related U.S. Application Data

(63) Continuation of application No. PCT/CN2022/140905, filed on Dec. 22, 2022.

(30) Foreign Application Priority Data

Dec. 24, 2021 (CN) ......................... 202111596767.1

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0051* (2013.01); *H04L 5/1469* (2013.01); *H04W 28/26* (2013.01); *H04W 72/0446* (2013.01)

(58) Field of Classification Search
CPC ......... H04W 72/0453; H04W 72/0446; H04W 28/26; H04L 5/0051; H04L 5/1469;
(Continued)

(56) References Cited

U.S. PATENT DOCUMENTS

2017/0303144 A1* 10/2017 Guo ...................... H04L 5/0051
2019/0098615 A1 3/2019 Wang et al.
(Continued)

FOREIGN PATENT DOCUMENTS

CA 3221582 A1 * 8/2023 ........... H04L 5/0053
CN 111107555 A 5/2020

OTHER PUBLICATIONS

Extended European Search Report in European Appln. No. 22910121.7, mailed on Mar. 19, 2025, 9 pages.
(Continued)

*Primary Examiner* — Ricardo H Castaneyra
(74) *Attorney, Agent, or Firm* — Fish & Richardson P.C.

(57) ABSTRACT

Communication methods and apparatuses are provided in this disclosure. In an implementation, a terminal device determines a first time-frequency resource, and a second time-frequency resource based on received first configuration information and received second configuration information, and receives a zero-power downlink signal on the first time-frequency resource and the second time-frequency resource. The terminal device determines a third time-frequency resource and a fourth time-frequency resource based on received third configuration information and received fourth configuration information, and sends a zero-power uplink signal on the third time-frequency resource and the fourth time-frequency resource.

18 Claims, 24 Drawing Sheets

(51) Int. Cl.
*H04L 5/14* (2006.01)
*H04W 28/26* (2009.01)
*H04W 72/0446* (2023.01)

(58) Field of Classification Search
CPC . H04L 5/0005; H04L 5/0094; H04L 25/0224; H04L 25/02; H04B 17/345
USPC .......................................... 370/329, 252, 311
See application file for complete search history.

(56) References Cited

U.S. PATENT DOCUMENTS

| | | | |
|---|---|---|---|
| 2020/0119881 A1 | 4/2020 | Xia et al. | |
| 2021/0320779 A1 | 10/2021 | Huang et al. | |
| 2024/0031993 A1* | 1/2024 | Abotabl .................... | H04L 5/14 |

OTHER PUBLICATIONS

Office Action in Indian Appln. No. 202417052503, mailed on Jun. 5, 2026, 8 pages (with English translation).

* cited by examiner

COMMUNICATION METHOD AND APPARATUS

CROSS-REFERENCE TO RELATED APPLICATIONS

This application is a continuation of International Application No. PCT/CN2022/140905, filed on Dec. 22, 2022, which claims priority to Chinese Patent Application No. 202111596767.1, filed on Dec. 24, 2021. The disclosures of the aforementioned applications are hereby incorporated by reference in their entireties.

TECHNICAL FIELD

This application relates to the field of communication technologies, and in particular, to a communication method and apparatus.

BACKGROUND

In a time division duplex (time division duplex, TDD) system, usually, a downlink (downlink, DL) occupies main time resources, and an uplink (uplink, UL) occupies a small quantity of time resources. This leads to poor UL coverage and a long delay. Therefore, a subband fullduplex (subband fullduplex, SBFD) system is provided. In the SBFD system, a frequency domain resource of one component carrier (component carrier, CC) may be divided into a plurality of subbands, and transmission directions of different subbands may be the same or may be different, so that sending and receiving can be performed simultaneously on a same time domain resource, to increase uplink transmission resources, reduce a UL delay, and enhance UL coverage. However, on a same time domain resource, a plurality of terminal devices simultaneously perform uplink transmission or downlink transmission, leading to cross link interference (cross link interference, CLI) between terminal devices and cross link interference between network devices. The CLI between the terminal devices is UL-to-DL interference, and the CLI between the network devices is DL-to-UL interference.

In a data transmission process, a demodulation reference signal (demodulation reference signal, DMRS) is usually used to perform channel estimation on a channel on which data is located, and a channel estimation result is used for data demodulation.

However, currently, compared with a legacy (legacy) TDD scenario, in a scenario in which SBFD is performed for at least one of a plurality of network devices, interference to a DMRS (including a DL DMRS and a UL DMRS) increases. Newly increased interference decreases accuracy of channel estimation performed based on the DMRS and deteriorates demodulation performance.

SUMMARY

This application provides a communication method and apparatus, to improve accuracy of channel estimation performed based on a DMRS and improve demodulation performance.

According to a first aspect, this application provides a communication method. The method may be applied to a terminal device or a processor, a chip, or a functional module in the terminal device. The method may include: receiving first configuration information and second configuration information, and/or third configuration information and fourth configuration information from a network device, where the first configuration information indicates a frequency domain range of a first downlink subband and a frequency domain range of a second downlink subband on a carrier and a time domain symbol position of an uplink demodulation reference signal UL DMRS, the second configuration information indicates a frequency domain range of a first time-frequency resource on the first downlink subband and a frequency domain range of a second time-frequency resource on the second downlink subband, the third configuration information indicates a frequency domain range of a first uplink subband on the carrier and a time domain symbol position of a downlink demodulation reference signal DL DMRS, and the fourth configuration information indicates a frequency domain range of a third time-frequency resource and a frequency domain range of a fourth time-frequency resource on the first uplink subband; and the first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband; and further, determining the first time-frequency resource and the second time-frequency resource on a carrier in a slot in a first time range based on the first configuration information and the second configuration information, and receiving the zero-power downlink signal on the first time-frequency resource and the second time-frequency resource; and/or determining the third time-frequency resource and the fourth time-frequency resource on the carrier in the slot in the first time range based on the third configuration information and the fourth configuration information, and sending a zero-power uplink signal on the third time-frequency resource and the fourth time-frequency resource.

According to the method, the terminal device can perform interference measurement based on the first time-frequency resource and the second time-frequency resource, and/or the third time-frequency resource and the fourth time-frequency resource, to improve accuracy of channel estimation performed based on a DMRS and improve demodulation performance.

In a possible design, the second configuration information indicates that the frequency domain range of the first time-frequency resource is all resource blocks (resource block, RB) on the first downlink subband, and the second configuration information indicates that the frequency domain range of the second time-frequency resource is all RBs on the second downlink subband; and the fourth configuration information indicates that the frequency domain range of the third time-frequency resource is all RBs on the first uplink subband, and the fourth configuration information indicates that the frequency domain range of the fourth time-frequency resource is all the RBs on the first uplink subband. In this case, the second configuration information can accurately indicate the frequency domain range of the first time-frequency resource and the frequency domain range of the second time-frequency resource, and the fourth configuration information can accurately indicate the frequency domain range of the third time-frequency resource and the frequency domain range of the fourth time-frequency resource.

In a possible design, the second configuration information indicates that the first time-frequency resource occupies M1 RBs, and the second time-frequency resource occupies M2 RBs, the fourth configuration information indicates that the third time-frequency resource occupies N1 RBs, and the fourth time-frequency resource occupies N2 RBs, M1, M2, N1, and N2 are integers greater than or equal to 1, the M1 RBs are some of the RBs included on the first downlink subband, the M2 RBs are some of the RBs included on the second downlink subband, and N1 RBs and N2 RBs are some of the RBs included on the first uplink subband. In this case, the second configuration information can accurately indicate the frequency domain range of the first time-frequency resource and the frequency domain range of the second time-frequency resource, and the fourth configuration information can accurately indicate the frequency domain range of the third time-frequency resource and the frequency domain range of the fourth time-frequency resource.

In a possible design, the method further includes: determining a frequency domain resource of the first time-frequency resource and a frequency domain resource of the second time-frequency resource based on the first configuration information and the second configuration information, and/or determining a frequency domain resource of the third time-frequency resource and a frequency domain resource of the fourth time-frequency resource based on the third configuration information and the fourth configuration information. The frequency domain resource of the first time-frequency resource includes the M1 RBs whose end position is an RB corresponding to a largest RB sequence number on the first downlink subband; the frequency domain resource of the second time-frequency resource includes the M2 RBs whose start position is a resource block corresponding to a smallest RB sequence number on the second downlink subband; the frequency domain resource of the third time-frequency resource includes the N1 RBs whose start position is an RB corresponding to a smallest RB sequence number on the first uplink subband; and the frequency domain resource B of the fourth time-frequency resource includes the N2 RBs whose end position is an RB corresponding to a largest RB sequence number on the first uplink subband. In this case, the terminal device can accurately determine the frequency domain resource of the first time-frequency resource and the frequency domain resource of the second time-frequency resource, and/or the frequency domain resource of the third time-frequency resource and the frequency domain resource of the fourth time-frequency resource.

In a possible design, M1 is equal to M2, and N1 is equal to N2. In this case, an implementation is simple.

In a possible design, a time domain symbol position of the first time-frequency resource and a time domain symbol position of the second time-frequency resource are the time domain symbol position of the UL DMRS, and a time domain symbol position of the third time-frequency resource and a time domain symbol position of the fourth time-frequency resource are the time domain symbol position of the DL DMRS.

In a possible design, a symbol type of some or all symbols in the slot in the first time range on the first downlink subband is “downlink”, a symbol type of some or all symbols in the slot in the first time range on the second downlink subband is “downlink”, and a symbol type of some or all symbols in the slot in the first time range on the first uplink subband is “uplink”.

In a possible design, a time period in which a symbol type of the first downlink subband is “downlink” is the same as a time period in which a symbol type of the second downlink subband is “downlink” in the first time range.

According to a second aspect, this application provides a communication method. The method may be applied to a network device or a processor, a chip, or a functional module in the network device. The method may include: determining first configuration information and second configuration information, and/or third configuration information and fourth configuration information; and sending the first configuration information and the second configuration information, and/or the third configuration information and the fourth configuration information to a terminal device. The first configuration information indicates a frequency domain range of a first downlink subband and a frequency domain range of a second downlink subband on a carrier and a time domain symbol position of an uplink demodulation reference signal UL DMRS, the second configuration information indicates a frequency domain range of a first time-frequency resource on the first downlink subband and a frequency domain range of a second time-frequency resource on the second downlink subband, the third configuration information indicates a frequency domain range of a first uplink subband on the carrier and a time domain symbol position of a downlink demodulation reference signal DL DMRS, and the fourth configuration information indicates a frequency domain range of a third time-frequency resource and a frequency domain range of a fourth time-frequency resource on the first uplink subband; and the first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband.

According to the method, the terminal device can determine the first time-frequency resource and the second time-frequency resource, and/or the third time-frequency resource and the fourth time-frequency resource, and perform interference measurement based on the first time-frequency resource and the second time-frequency resource, and/or the third time-frequency resource and the fourth time-frequency resource, to improve accuracy of channel estimation performed based on a DMRS and improve demodulation performance.

According to a third aspect, this application provides a communication method. The method may be applied to a terminal device or a processor, a chip, or a functional module in the terminal device. The method may include: sending a first uplink signal to a network device on a sixth time-frequency resource. A sending time point of the first uplink signal is $t1-(N_{TA}T_c+N_{TA,\ offset}T_c)$, $N_{TA}T_c$ is a timing advance, $N_{TA}$ is greater than or equal to 0, $N_{TA,\ offset}T_c$ is a timing advance offset, a value of $N_{TA,\ offset}$ is 0, $T_c$ is a time unit, a value of $T_c$ is 1/(48000×4096), a unit of $T_c$ is second, a frequency domain resource on which the sixth time-frequency resource is located is on a first uplink subband, t1 is a time point at which a first downlink signal arrives at the terminal device, $t1=t0+N_{TA}T_c/2$, a fifth time-frequency resource is used by the network device to send the first downlink signal, a sending time point of the first downlink signal is t0, a frequency domain resource on which the fifth time-frequency resource is located is on a first downlink subband and/or a second downlink subband, a start moment of the fifth time-frequency resource and a start moment of the sixth time-frequency resource are t0, the first uplink subband, the first downlink subband, and the second downlink subband are consecutive frequency domain resources on a frequency domain resource corresponding to a carrier, a frequency of the first uplink subband is greater than a frequency of the first downlink subband, and a frequency of the second downlink subband is greater than the frequency of the first uplink subband.

According to the method, when the value of $N_{TA,\ offset}$ is 0, adjacent-channel self-interference caused by a signal received by the network device from the terminal device and a signal sent by the network device may be symbol aligned in terms of time, to help suppress adjacent-channel self-interference.

In a possible design, one or more last symbols in symbols included on a first subband in an $n^{th}$ slot are uplink symbols, the first subband is the first downlink subband, the second downlink subband, or the first uplink subband, n is an integer greater than or equal to 0, one or more start symbols in symbols included on the first subband in an $(n+1)^{th}$ slot are downlink symbols, and no uplink signal is sent on the last symbol of the symbols included on the first subband in the $n^{th}$ slot. In this case, it can be ensured that the network device switches to a sending state after receiving a signal on an uplink symbol, to send a signal on a downlink symbol.

In a possible design, the method includes: receiving configuration information from the network device. The configuration information indicates that the value of $N_{TA,\ offset}$ is 0.

According to a fourth aspect, this application provides a communication method. The method may be applied to a network device or a processor, a chip, or a functional module in the network device. The method may include: receiving a first uplink signal from a terminal device on a sixth time-frequency resource. A sending time point of the first uplink signal is $t1-(N_{TA}T_c+N_{TA,\ offset}T_c)$, $N_{TA}T_c$ is a timing advance, $N_{TA}$ is greater than or equal to 0, $N_{TA,\ offset}\ T_c$ is a timing advance offset, a value of $N_{TA,\ offset}$ is 0, $T_c$ is a time unit, a value of $T_c$ is $1/(48000\times4096)$, a unit of $T_c$ is second, a frequency domain resource on which the sixth time-frequency resource is located is on a first uplink subband, t1 is a time point at which a first downlink signal arrives at the terminal device, $t1=t0+N_{TA}T_c/2$, a fifth time-frequency resource is used by the network device to send the first downlink signal, a sending time point of the first downlink signal is t0, a frequency domain resource on which the fifth time-frequency resource is located is on a first downlink subband and/or a second downlink subband, a start moment of the fifth time-frequency resource and a start moment of the sixth time-frequency resource are t0, the first uplink subband, the first downlink subband, and the second downlink subband are consecutive frequency domain resources on a frequency domain resource corresponding to a carrier, a frequency of the first uplink subband is greater than a frequency of the first downlink subband, and a frequency of the second downlink subband is greater than the frequency of the first uplink subband.

According to the method, when the value of $N_{TA,\ offset}$ is 0, adjacent-channel self-interference caused by a signal received by the network device from the terminal device and a signal sent by the network device may be symbol aligned in terms of time, to help suppress adjacent-channel self-interference.

In a possible design, one or more last symbols in symbols included on a first subband in an $n^{th}$ slot are uplink symbols, the first subband is the first downlink subband, the second downlink subband, or the first uplink subband, n is an integer greater than or equal to 0, one or more start symbols in symbols included on the first subband in an $(n+1)^{th}$ slot are downlink symbols, and no uplink signal is received on the last symbol of the symbols included on the first subband in the $n^{th}$ slot. In this case, it can be ensured that the network device switches to a sending state after receiving a signal on an uplink symbol, to send a signal on a downlink symbol.

In a possible design, the method includes: sending configuration information to the terminal device. The configuration information indicates that the value of $N_{TA,\ offset}$ is 0.

According to a fifth aspect, this application further provides a communication apparatus. The communication apparatus may be a terminal device, and the communication apparatus has a function of implementing the method in the first aspect or the possible design examples of the first aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions in the first aspect or the possible design examples of the first aspect. For details, refer to detailed descriptions in the method examples. Details are not described herein again.

In a possible design, a structure of the communication apparatus includes a transceiver and a processor, and optionally, further includes a memory. The transceiver is configured to: receive and send a message or data, and communicate and interact with another device in a communication system. The processor is configured to support the communication apparatus in performing corresponding functions in the first aspect or the possible design examples of the first aspect. The memory is coupled to the processor, and stores program instructions and data that are necessary for the communication apparatus.

According to a sixth aspect, this application further provides a communication apparatus. The communication apparatus may be a network device, and the communication apparatus has a function of implementing the method in the second aspect or the possible design examples of the second aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions in the second aspect or the possible design examples of the second aspect. For details, refer to detailed descriptions in the method examples. Details are not described herein again.

In a possible design, a structure of the communication apparatus includes a transceiver and a processor, and optionally, further includes a memory. The transceiver is configured to: receive and send a message or data, and communicate and interact with another device in a communication system. The processor is configured to support the communication apparatus in performing corresponding functions in the second aspect or the possible design examples of the second aspect. The memory is coupled to the processor, and stores program instructions and data that are necessary for the communication apparatus.

According to a seventh aspect, this application further provides a communication apparatus. The communication apparatus may be a terminal device, and the communication apparatus has a function of implementing the method in the third aspect or the possible design examples of the third aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions in the third aspect or the possible design examples of the third aspect. For details, refer to detailed descriptions in the method examples. Details are not described herein again.

In a possible design, a structure of the communication apparatus includes a transceiver and a processor, and optionally, further includes a memory. The transceiver is configured to: receive and send a message or data, and communicate and interact with another device in a communication system. The processor is configured to support the communication apparatus in performing corresponding functions in the third aspect or the possible design examples of the third aspect. The memory is coupled to the processor, and stores program instructions and data that are necessary for the communication apparatus.

According to an eighth aspect, this application further provides a communication apparatus. The communication apparatus may be a network device, and the communication apparatus has a function of implementing the method in the fourth aspect or the possible design examples of the fourth aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions in the fourth aspect or the possible design examples of the fourth aspect. For details, refer to detailed descriptions in the method examples. Details are not described herein again.

In a possible design, a structure of the communication apparatus includes a transceiver and a processor, and optionally, further includes a memory. The transceiver is configured to: receive and send a message or data, and communicate and interact with another device in a communication system. The processor is configured to support the communication apparatus in performing corresponding functions in the fourth aspect or the possible design examples of the fourth aspect. The memory is coupled to the processor, and stores program instructions and data that are necessary for the communication apparatus.

According to a ninth aspect, an embodiment of this application provides a communication system. The communication system may include the terminal device and the network device that are mentioned above.

According to a tenth aspect, an embodiment of this application provides a computer-readable storage medium. The computer-readable storage medium stores program instructions, and when the program instructions run on a computer, the computer is enabled to perform the method in any one of the first aspect and the possible designs of the first aspect, or any one of the second aspect and the possible designs of the second aspect, or any one of the third aspect and the possible designs of the third aspect, or any one of the fourth aspect and the possible designs of the fourth aspect in embodiments of this application. For example, the computer-readable storage medium may be any usable medium that can be accessed by the computer. As an example rather than a limitation, the computer-readable medium may include a non-transitory computer-readable medium, a random access memory (random access memory, RAM), a read-only memory (read-only memory, ROM), an electrically erasable programmable read-only memory (electrically EPROM, EEPROM), a CD-ROM or another optical disk storage, a magnetic disk storage medium or another magnetic storage device, or any other medium that can carry or store desired program code in a form of instructions or a data structure and that can be accessed by the computer.

According to an eleventh aspect, an embodiment of this application provides a computer program product, including computer program code or instructions. When the computer program code or the instructions run on a computer, the method in any one of the first aspect or the possible designs of the first aspect, or any one of the second aspect or the possible designs of the second aspect, or any one of the third aspect or the possible designs of the third aspect, or any one of the fourth aspect or the possible designs of the fourth aspect is performed.

According to a twelfth aspect, this application further provides a chip, including a processor. The processor is coupled to a memory, and is configured to read and execute program instructions stored in the memory, so that the chip implements the method in any one of the first aspect or the possible designs of the first aspect, or any one of the second aspect or the possible designs of the second aspect, or any one of the third aspect or the possible designs of the third aspect, or any one of the fourth aspect or the possible designs of the fourth aspect.

For each aspect of the fifth aspect to the twelfth aspect and technical effects that may be achieved in each aspect, refer to descriptions of technical effects that may be achieved in any one of the first aspect or the possible solutions of the first aspect, or any one of the second aspect or the possible solutions of the second aspect, or any one of the third aspect or the possible solutions of the third aspect, or any one of the fourth aspect or the possible solutions of the fourth aspect.

DESCRIPTION OF EMBODIMENTS

The following further describes in detail this application with reference to accompanying drawings.

Embodiments of this application provide a communication method and apparatus, to improve accuracy of channel estimation performed based on a DMRS and improve demodulation performance. The method and the apparatus in this application are based on a same technical concept. Because problem-resolving principles of the method and the apparatus are similar, mutual references may be made to implementation of the apparatus and the method, and repeated parts are not described.

In the description of this application, words such as “first” and “second” are merely used for distinguishing between descriptions, and cannot be understood as an indication or implication of relative importance, or cannot be understood as an indication of implication of an order.

In the description of this application, “at least one (type)” means one or more (types), and “a plurality of (types)” means two or more (types).

“And/or” describes an association relationship between associated objects, and represents that three relationships may exist. For example, A and/or B may represent the following cases: A exists alone, both A and B exist, and B exists alone, where A and B may be singular or plural. The character “/” usually indicates an “or” relationship between the associated objects.

The following describes two systems in embodiments of this application.

Figure 1:
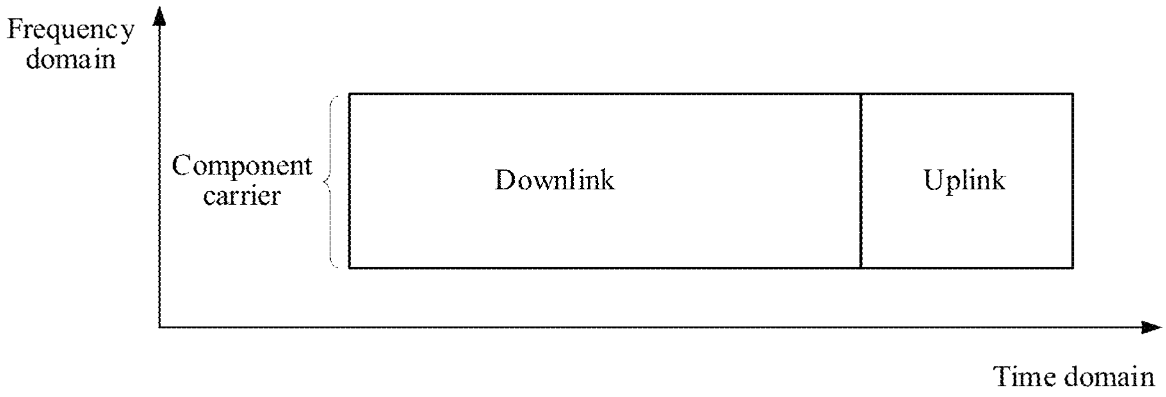
FIG. 1 is a diagram of a TDD system according to this application.

FIG. 1 is a diagram of a TDD system. In the TDD system (which may be referred to as legacy (legacy) TDD), a quantity of time domain resources occupied by a downlink is usually greater than a quantity of time domain resources occupied by an uplink, for example, as shown by a downlink and an uplink in FIG. 1. In FIG. 1, an example in which a frequency domain resource is one CC is used. It can be learned from FIG. 1 that the quantity of time domain resources occupied by the downlink is greater than the quantity of time domain resources occupied by the uplink. For the uplink, a quantity of available resources is small, coverage is poor, and a delay is long. It may be understood that the uplink and the downlink are relative. If the uplink is from a network device to a terminal device ((terminal equipment, TE) or (user equipment, UE)), the downlink is from the terminal device to the network device. If the downlink is from a network device to a terminal device, the uplink is from the terminal device to the network device (this is used as an example in this specification).

An SBFD system is provided for the TDD system, to reduce an uplink delay. In the SBFD system, a frequency domain resource of one component carrier (component carrier, CC) may be divided into a plurality of subbands, and transmission directions of different subbands may be the same or may be different, so that sending and receiving can be performed simultaneously on a same time domain resource, to increase uplink transmission resources, reduce an uplink delay, and enhance uplink coverage.

Figure 2:
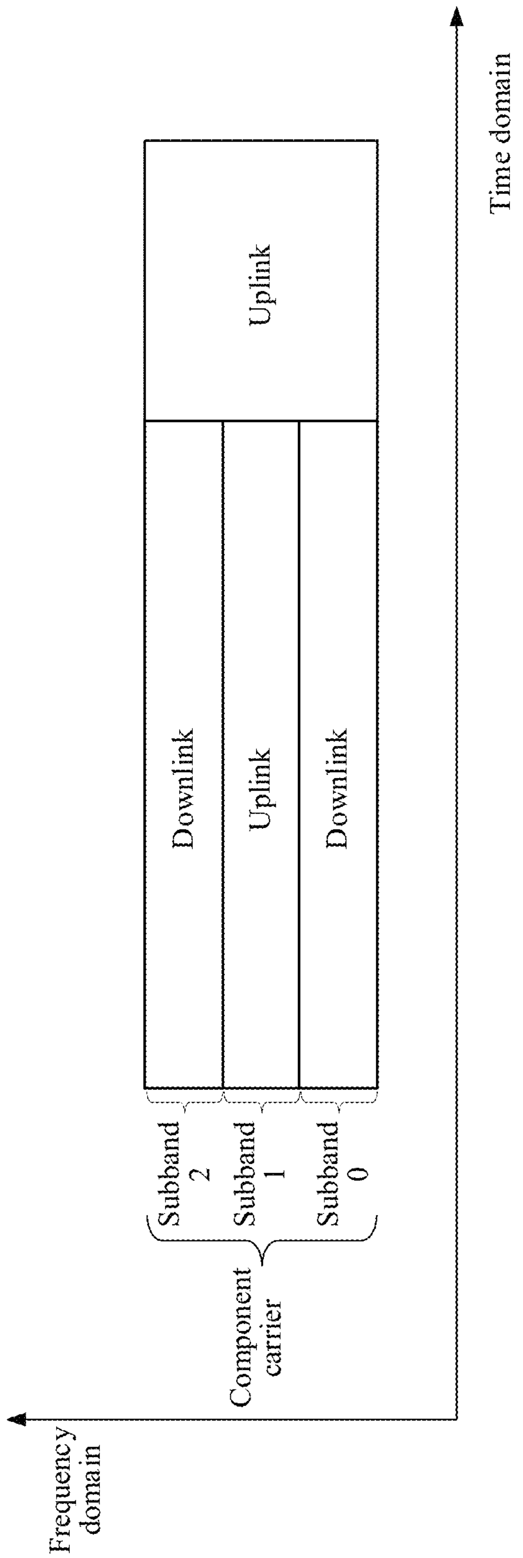
FIG. 2 is a diagram of an SBFD system according to this application.

FIG. 2 is a diagram of an SBFD system. In FIG. 2, an example in which a frequency domain resource is one CC is used for description. The CC is a segment of consecutive frequency domain resources, and may correspond to one cell configuration. As shown in FIG. 2, the CC may be divided into three subbands. For example, in FIG. 2, the three subbands are a subband 0, a subband 1, and a subband 2. Transmission directions of different subbands may be different. FIG. 2 shows an example in which a transmission direction of the subband 1 in the three subbands is an uplink direction, and a transmission direction of the subband 0 and a transmission direction of the subband 2 are a downlink direction. Frequencies of the three subbands do not overlap. It can be learned from FIG. 2 that an uplink transmission resource available to a terminal device is increased. It may be understood that a guard band (guard band) may exist between the three subbands, a specific frequency interval exists between a maximum frequency of the subband 0 and a minimum frequency of the subband 1, and a specific frequency interval exists between a maximum frequency of the subband 1 and a minimum frequency of the subband 2. The maximum frequency of the subband 0 may be understood as a maximum value of a frequency in a frequency domain range in which the subband 0 is located, and the minimum frequency of the subband 1 may be understood as a minimum value of a frequency in a frequency domain range in which the subband 1 is located.

Figure 3:
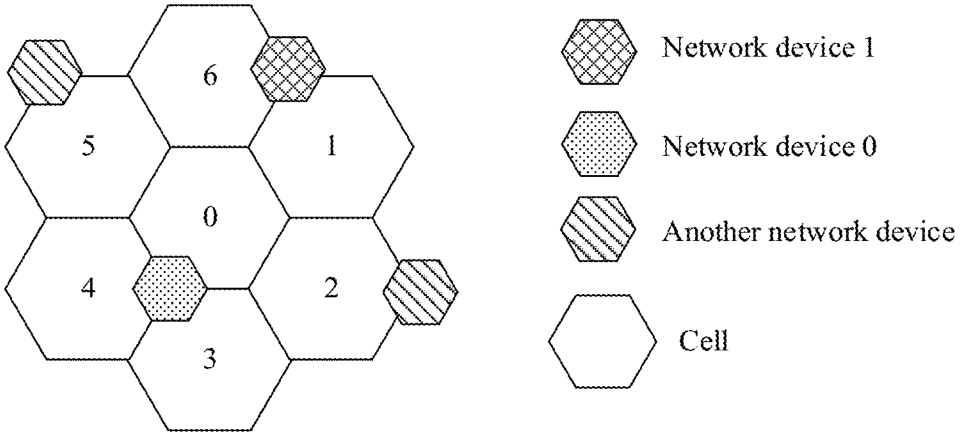
FIG. 3 is a diagram of an interference cell according to this application.

In the SBFD system, when one network device simultaneously serves terminal devices in a plurality of cells, as shown in FIG. 3, a network device 0 serves terminal devices in cells (cell) 0, 3 and 4, and a same CC is used for different cells. The network device 0 simultaneously sends a DL signal and receives a UL signal in the cell 0. Similarly, the network device 0 simultaneously sends a DL signal and receives a UL signal in the cell 3, and the network device 0 simultaneously sends a DL signal and receives a UL signal in the cell 4.

In a cell, one UE receives a DL signal or sends a UL signal. A transmission direction corresponding to the DL signal is downlink transmission, and a transmission direction corresponding to the UL signal is UL transmission. Transmission directions of different UEs may be different.

This leads to UE-UE (UE-UE) cross link interference (cross link interference, CLI), cell-cell (cell-cell) CLI, and self-interference (self-interference, SI) in a cell.

The UE-UE CLI is interference of a UL signal to a DL signal, and the UE-UE CLI may be further divided into intra-cell (intra-cell) UE-UE CLI and inter-cell (inter-cell) UE-UE CLI. The intra-cell UE-UE CLI is UE-UE CLI caused when transmission directions of two UEs in one cell are different, and the inter-cell UE-UE CLI means that two UEs that cause UE-UE CLI are in different cells.

The cell-cell CLI is interference of a DL signal in another cell to a UL signal in a current cell. The cell-cell CLI may be further divided into intra-network device cell-cell CLI and inter-network device cell-cell CLI. The intra-network device cell-cell CLI is cell-cell CLI between two cells served by one network device, and the inter-network device cell-cell CLI means that two cells that cause the cell-cell CLI belong to different network devices. It may be understood that when one network device serves only one cell, there is no intra-network device cell-cell CLI.

The SI in the cell is interference of a DL signal in a cell to a UL signal in the cell.

Currently, in a data transmission process, a demodulation reference signal (demodulation reference signal, DMRS) is usually used to perform channel estimation on a channel on which data is located, and a channel estimation result is used for data demodulation.

In a TDD system, interference to a DL DMRS includes codirectional interference (DL-to-DL interference) from another cell and DL DMRS inter-layer interference (interference caused when different DMRSs occupy a same time-frequency resource), and interference to a UL DMRS includes UL codirectional interference and UL DMRS inter-layer interference.

Compared with a TDD scenario, when SBFD is performed for all network devices, adjacent-channel cell-cell CLI and adjacent-channel SI are newly added to a UL DMRS. The adjacent-channel cell-cell CLI means that a DL signal that causes cell-cell CLI and a UL signal that is interfered have different frequencies. The adjacent-channel SI means that SI caused a DL signal and SI caused a UL signal coexist in a cell. Because the DL signal and the UL signal are on different subbands, and different subbands on one CC are located at different frequencies, the SI in the cell is adjacent-channel SI. Adjacent-channel UE-UE CLI is newly added to a DL DMRS. The adjacent-channel UE-UE CLI means that a UL signal that causes UE-UE CLI and a DL signal that is interfered have different frequencies.

Compared with a TDD scenario, when SBFD is performed for some network devices and TDD is performed for some network devices, adjacent-channel cell-cell CLI, adjacent-channel SI, and co-channel cell-cell CLI are newly added to a UL DMRS, and UL codirectional interference is reduced. In contrast, the co-channel cell-cell CLI is much greater than the UL codirectional interference. The co-channel cell-cell CLI means that a DL signal that causes cell-cell CLI and a UL signal that is interfered have a same frequency. Adjacent-channel UE-UE CLI is newly added to a DL DMRS.

It can be learned from the foregoing that, compared with a legacy TDD scenario, in a scenario in which SBFD is performed for at least one of a plurality of network devices, interference to a DMRS (including a DL DMRS and a UL DMRS) increases. Newly increased interference decreases accuracy of channel estimation performed based on the DMRS and deteriorates demodulation performance.

Based on this, an embodiment of this application provides a communication method, to improve accuracy of channel estimation performed based on a DMRS and improve demodulation performance.

To describe the technical solutions in embodiments of this application more clearly, the following describes a communication method and apparatus provided in embodiments of this application in detail with reference to the accompanying drawings.

Figure 4:
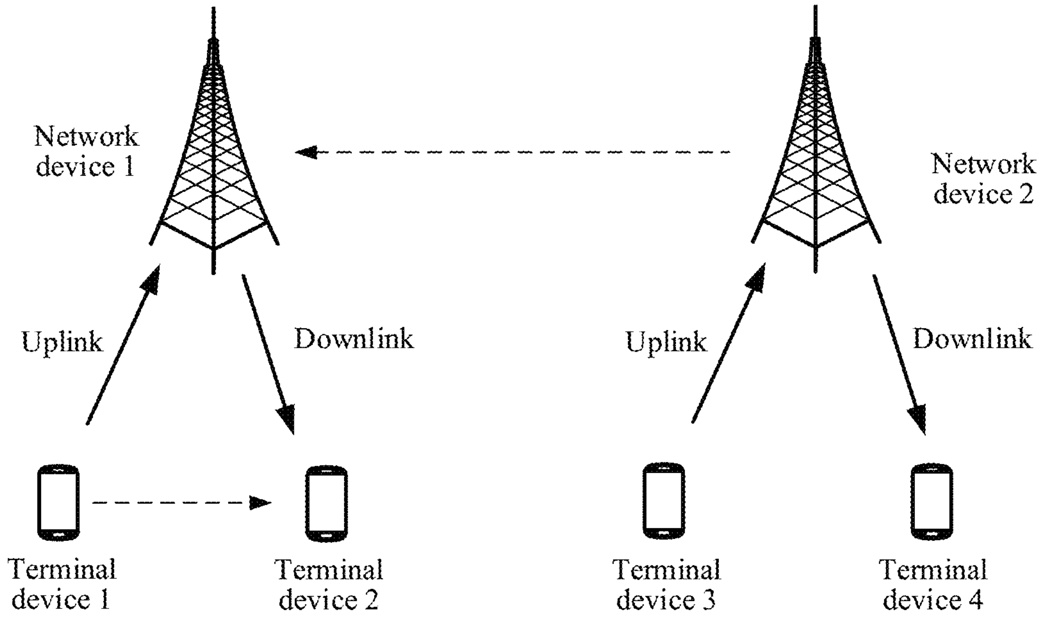
FIG. 4 is a diagram of an architecture of a communication system according to this application.

A communication method provided in an embodiment of this application may be applied to a scenario in which cross interference exists between an uplink and a downlink in an SBFD system. FIG. 4 is a schematic diagram of an architecture of a communication system to which an embodiment of this application is applicable. The communication system includes at least one network device and at least one terminal device. For example, the communication system shown in FIG. 4 includes a network device 1 and a network device 2. Two terminal devices exist in a coverage area of a cell served by the network device 1, for example, a terminal device 1 and a terminal device 2 shown in FIG. 4. The terminal device 1 sends an uplink signal, and the terminal device 2 receives a downlink signal. Two terminal devices exist in a coverage area of a cell served by the network device 2, for example, a terminal device 3 and a terminal device 4 shown in FIG. 4. The terminal device 3 sends an uplink signal, and the terminal device 4 receives a downlink signal.

The network device is a device with a wireless transceiver function or a chip that may be disposed in the network device. The network device includes but is not limited to a generation NodeB (generation NodeB, gNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission and reception point, TRP, or transmission point, TP), and the like. The network device may alternatively be a network node that constitutes a gNB or a transmission point, for example, a baseband unit (BBU), or a distributed unit (distributed unit, DU).

In some deployments, the gNB may include a central unit (central unit, CU) and a DU. The gNB may further include a radio unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited.

The terminal device may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in this embodiment of this application may be a mobile phone (mobile phone), a tablet (Pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in smart grid (smart grid), a wireless terminal in transportation safety (transportation safety), a wireless terminal in smart city (smart city), a smart wearable device (smart glasses, a smart watch, a smart headset, or the like), a wireless terminal in smart home (smart home), or the like. The terminal device may alternatively be a chip, a chip module (or a chip system), or the like that can be disposed in the foregoing device. An application scenario is not limited in this embodiment of this application. A terminal device with a wireless transceiver function and a chip that may be disposed in the terminal device are collectively referred to as the terminal device in this application.

It should be noted that, a quantity of terminal devices that exist in the network device and a coverage area of each network device in the communication system shown in FIG. 4 is merely an example. In practice, there may be more or fewer devices. This is not limited in this application.

In the communication system, SBFD is performed for at least one of the plurality of network devices. To be specific, there may be two scenarios. In a first scenario, SBFD is performed for all network devices. For example, SBFD is performed for both the network device 1 and the network device 2 in FIG. 4. In a second scenario, SBFD is performed for some network devices, and legacy TDD is performed for some network devices. For example, in FIG. 4, SBFD is performed for the network device 1, and legacy TDD is performed for the network device 2. A network device for which an SBFD slot configuration is used may be referred to as an SBFD network device, and a cell for which an SBFD slot configuration is used may be referred to as an SBFD cell. In addition, there may be a third scenario, which is referred to as a different-configuration scenario in this application. In the different-configuration scenario, the SBFD system is used, and a quantity of uplink transmission resources may be increased by increasing a quantity of resources occupied by an uplink in FIG. 1, to reduce an uplink delay and enhance uplink coverage (which may be referred to as new (New) TDD). A downlink transmission resource may correspond to a time-frequency resource whose slot format is configured as "downlink" on one CC, and the uplink transmission resource may correspond to a time-frequency resource whose slot format is configured as "uplink" on one CC. When a legacy TDD slot configuration is used for a cell and a new TDD slot configuration is used for a cell, there is a difference between slot configurations used for the two cells. Such a scenario is referred to as a different-configuration scenario.

The cell for which the legacy TDD slot configuration is used may be referred to as a legacy TDD cell, and the cell for which the new TDD slot configuration is used may be referred to as a new TDD cell.

In this embodiment of this application, a pattern (pattern) of a mute (mute) resource is designed for the three scenarios, and each network device indicates the pattern to the terminal device, so that the terminal device performs interference measurement based on the mute resource. This embodiment of this application mainly relates to a configuration of a symbol type on a time domain resource. The following first describes some terms.

(1) A resource includes a time domain resource and a frequency domain resource, and may be considered as a resource pair including the time domain resource and the frequency domain resource. The time domain resource is an orthogonal frequency division modulation (orthogonal frequency division modulation, OFDM) symbol (briefly referred to as a symbol in this specification) occupied in time domain. A minimum granularity of the time domain resource is not limited in this embodiment of this application. For example, the minimum granularity of the time domain resource is one OFDM symbol, or may be a mini-slot (mini-slot), a slot (slot), or the like. One mini-slot may include a plurality of OFDM symbols, and "a plurality of" herein may be two or more. One slot may include 14 OFDM symbols or 12 OFDM symbols.

The frequency domain resource is a resource occupied in frequency domain, or is referred to as a frequency resource. A minimum granularity of the frequency domain resource may be one subcarrier, or may be a physical resource block (physical resource block, PRB), a resource block group (resource block group, RBG), or the like. One PRB includes 12 subcarriers in frequency domain, and one RBG may include two PRBs, four PRBs, eight PRBs, or 16 PRBs.

(2) It should be understood that, a mute resource is merely a name example, and may also be referred to as another name, for example, a reserved resource.

For example, the mute resource is a time-frequency resource occupied by a zero-power signal (including a zero-power uplink signal and a zero-power downlink signal). In other words, a terminal device does not send and/or receive a useful signal on the mute resource.

A process in which a network device determines the mute resource may be understood as a resource reservation process. Optionally, resource reservation may include resource block (resource block, RB)-level resource reservation and resource element (resource element, RE)-level resource reservation.

Figure 5:
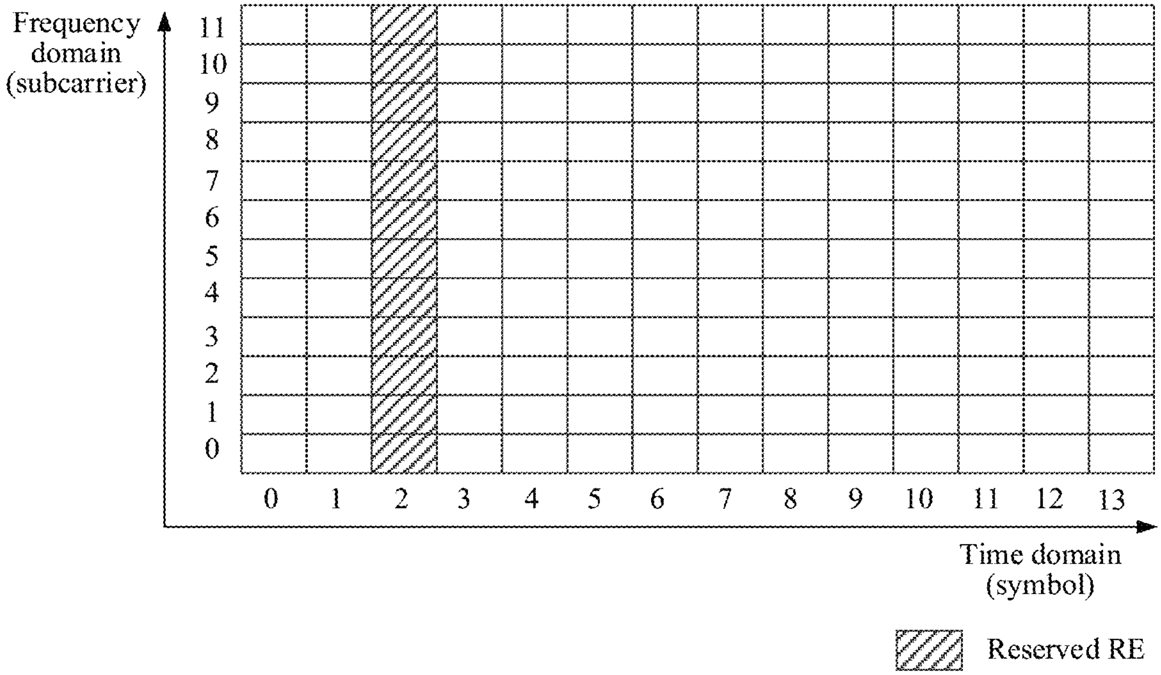
FIG. 5 is a diagram of RB-level resource reservation according to this application.
Figure 6:
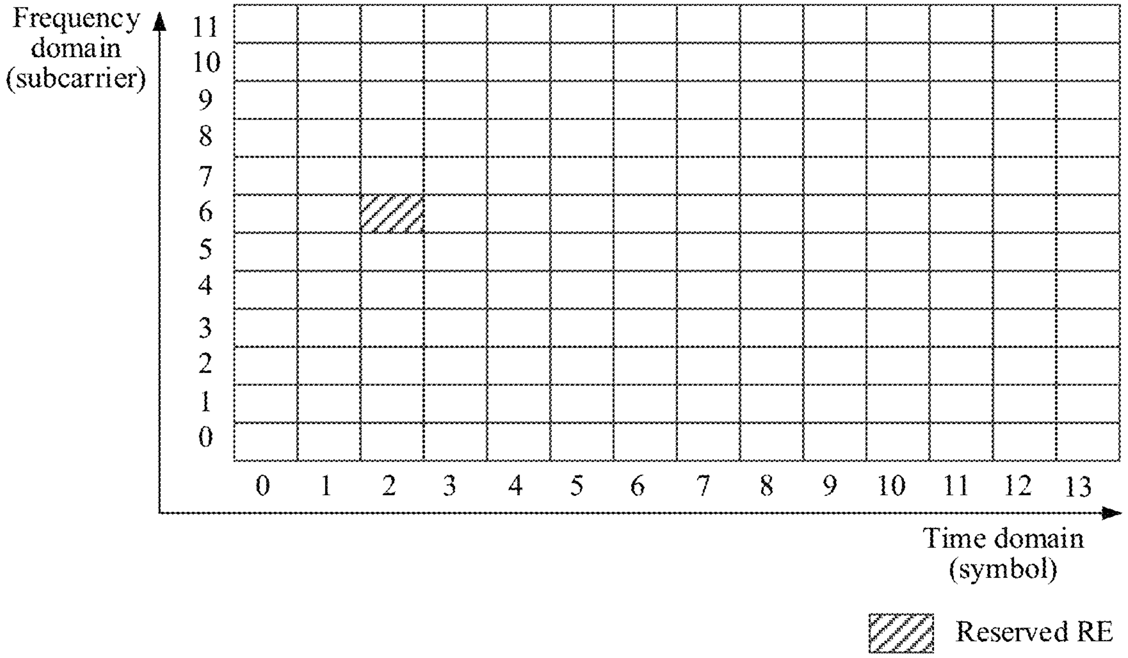
FIG. 6 is a diagram of RE-level resource reservation according to this application.

Specifically, RB-level resource reservation indicates that all subcarriers on one or more symbols are reserved on one RB. For example, FIG. 5 is a diagram of RB-level resource reservation. It can be learned from FIG. 5 that all subcarriers on a symbol 2 on one RB are reserved. RE-level resource reservation indicates that one or more subcarriers on one or more symbols are reserved on one RB. For example, FIG. 6 is a diagram of RE-level resource reservation. It can be learned from FIG. 6 that a subcarrier 6 on a symbol 2 on one RB is reserved. It should be understood that FIG. 5 and FIG. 6 are merely examples, and are not intended to limit this application.

It should be noted that, the symbol represents a time domain symbol, for example, an OFDM symbol. It should be understood that the symbol that appears in this specification and the time domain symbol are two expressions of an equivalent concept.

Optionally, one RB includes 12 subcarriers in frequency domain, and includes 14 symbols or 12 symbols in time domain. In FIG. 5 and FIG. 6, an example in which one RB includes 12 subcarriers in frequency domain and includes 14 symbols in time domain is used for description.

(3) A CC indicates a segment of consecutive frequency domain resources, and may correspond to one cell configuration.

(4) For a subband, it is designed that a quantity of frequency domain resources occupied by one subband may be less than a quantity of frequency domain resources occupied by one CC, and frequency domain resources of different subbands do not overlap. A plurality of subbands may be consecutive or inconsecutive in frequency domain. For example, a design in which a plurality of subbands are inconsecutive in frequency domain may be that there may be a guard band between every two of the plurality of subbands. Similarly, a design in which a plurality of subbands are consecutive in frequency domain may be that there is no guard band between every two of the plurality of subbands.

(5) Higher layer signaling may be signaling sent from a higher-layer protocol layer. The higher-layer protocol layer is a protocol layer above a physical layer. The higher-layer protocol layer may include at least one of the following protocol layers: a MAC layer, an RLC layer, a PDCP layer, an RRC layer, and a non-access stratum (non-access stratum, NAS).

In 5G NR, a network device may implement a configuration of a symbol category on one CC in the following two manners: a higher layer configuration/RRC layer signaling configuration and downlink control information 2-0 (downlink control indicator 2-0, DCI 2-0) dynamic indication. The DCI 2-0 dynamic indication is also referred to as a slot format indicator (slot format indicator, SFI).

In a higher layer configuration solution, the network device may notify a terminal device by using RRC layer signaling, to implement a configuration of a symbol category in a specific periodicity. This solution may also be referred to as a slot format configured through RRC. Configuration parameters in the higher layer configuration solution may be further classified into a cell-level configuration parameter such as a TDD common configuration (TDD-ConfigCommon) and a terminal device-level configuration parameter such as a TDD dedicated configuration (TDD-ConfigDedicated).

Information included in TDD-ConfigCommon includes a periodicity of TDD-ConfigCommon, a quantity of downlink slots in the periodicity, a quantity of uplink slots in the periodicity, a quantity of downlink symbols in the periodicity, a quantity of uplink symbols in the periodicity, and the like. TDD-ConfigCommon supports both a single-periodicity configuration and a dual-periodicity configuration.

TDD-ConfigDedicated is a terminal device-level configuration parameter, and each terminal device may be separately configured. Each terminal device may modify a direction of a flexible symbol in TDD-ConfigCommon. Information included in TDD-ConfigDedicated includes an identifier (identifier, ID) of a slot, a quantity of uplink symbols in the slot, a quantity of downlink symbols in the slot, and the like.

In the higher layer configuration solution, there may be only a cell-level configuration parameter, or there may be both a cell-level configuration parameter and a terminal-level configuration parameter. To avoid subsequent misunderstanding, the higher layer configuration solution may be referred to as an RRC slot format configuration in this embodiment of this application.

Figure 7:
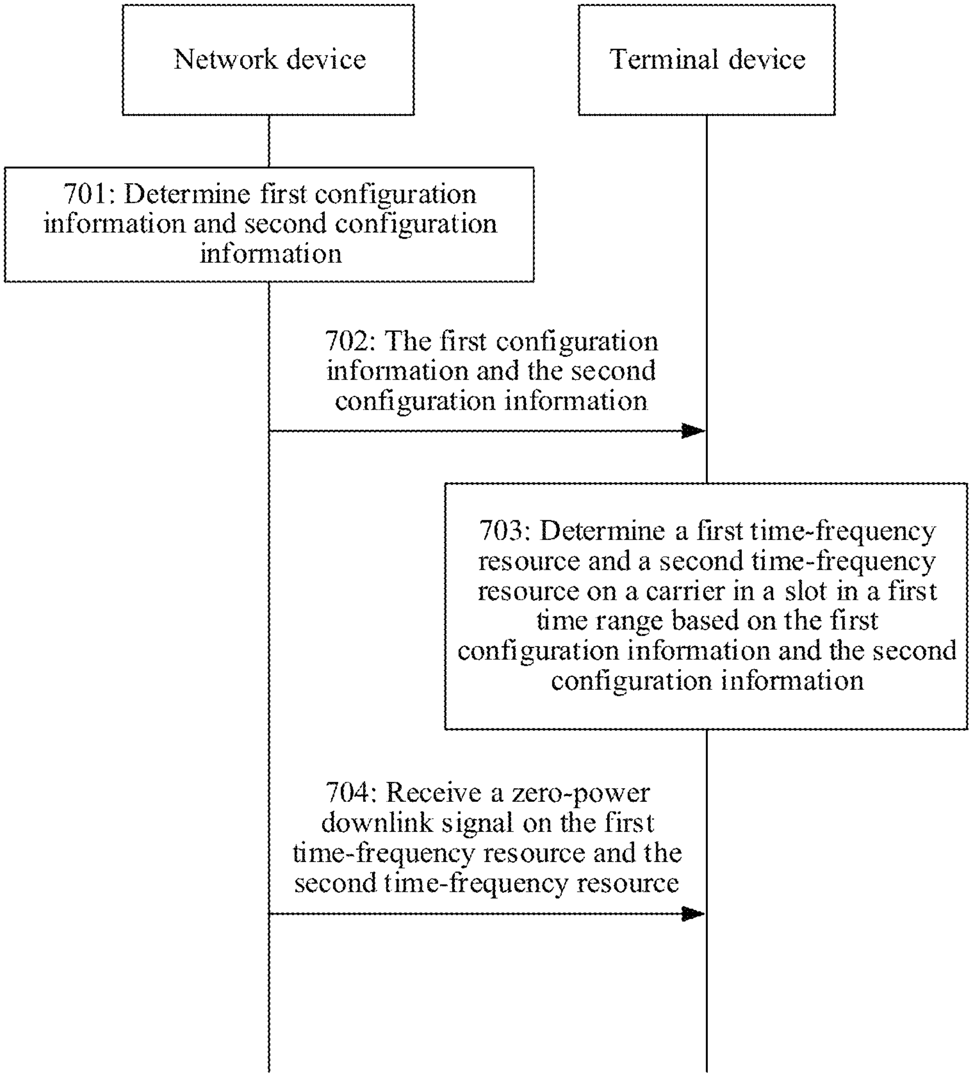
FIG. 7 is a flowchart of a communication method according to this application.

Based on the foregoing descriptions, an embodiment of this application provides a communication method, applied to a scenario in which SBFD is performed for all network devices in a communication system. As shown in FIG. 7, a specific procedure of the method may include the following steps.

Step 701: The network device determines first configuration information and second configuration information.

The first configuration information indicates a frequency domain range of a first downlink subband and a frequency domain range of a second downlink subband on a carrier and a time domain symbol position of a UL DMRS of a current cell, and the second configuration information indicates a frequency domain range of a first time-frequency resource on the first downlink subband and a frequency domain range of a second time-frequency resource on the second downlink subband.

Step 702: The network device sends the first configuration information and the second configuration information to a terminal device.

Step 703: The terminal device determines the first time-frequency resource and the second time-frequency resource on a carrier in a slot in a first time range based on the first configuration information and the second configuration information.

The terminal device may determine the first time-frequency resource and the second time-frequency resource on a carrier in each slot in the first time range based on the first configuration information and the second configuration information.

Step 704: The terminal device receives the zero-power downlink signal on the first time-frequency resource and the second time-frequency resource.

Compared with a TDD scenario, in the scenario in which SBFD is performed for all network devices, adjacent-channel cell-cell CLI and adjacent-channel SI are newly added to a UL DMRS, and adjacent-channel UE-UE CLI, including inter-cell UE-UE CLI and intra-cell UE-UE CLI, is newly added to a DL DMRS. For example, in a diagram of an interference cell in FIG. 3, one network device serves three cells. When SBFD is performed for a network device 0 and another network device, a cell 0 is interfered by another six cells and adjacent-channel SI.

In an optional implementation, in a scenario in which SBFD is performed for the network device, the carrier may be divided into three subbands, for example, a first uplink subband, a first downlink subband, and a second downlink subband. The first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband.

Figure 8:
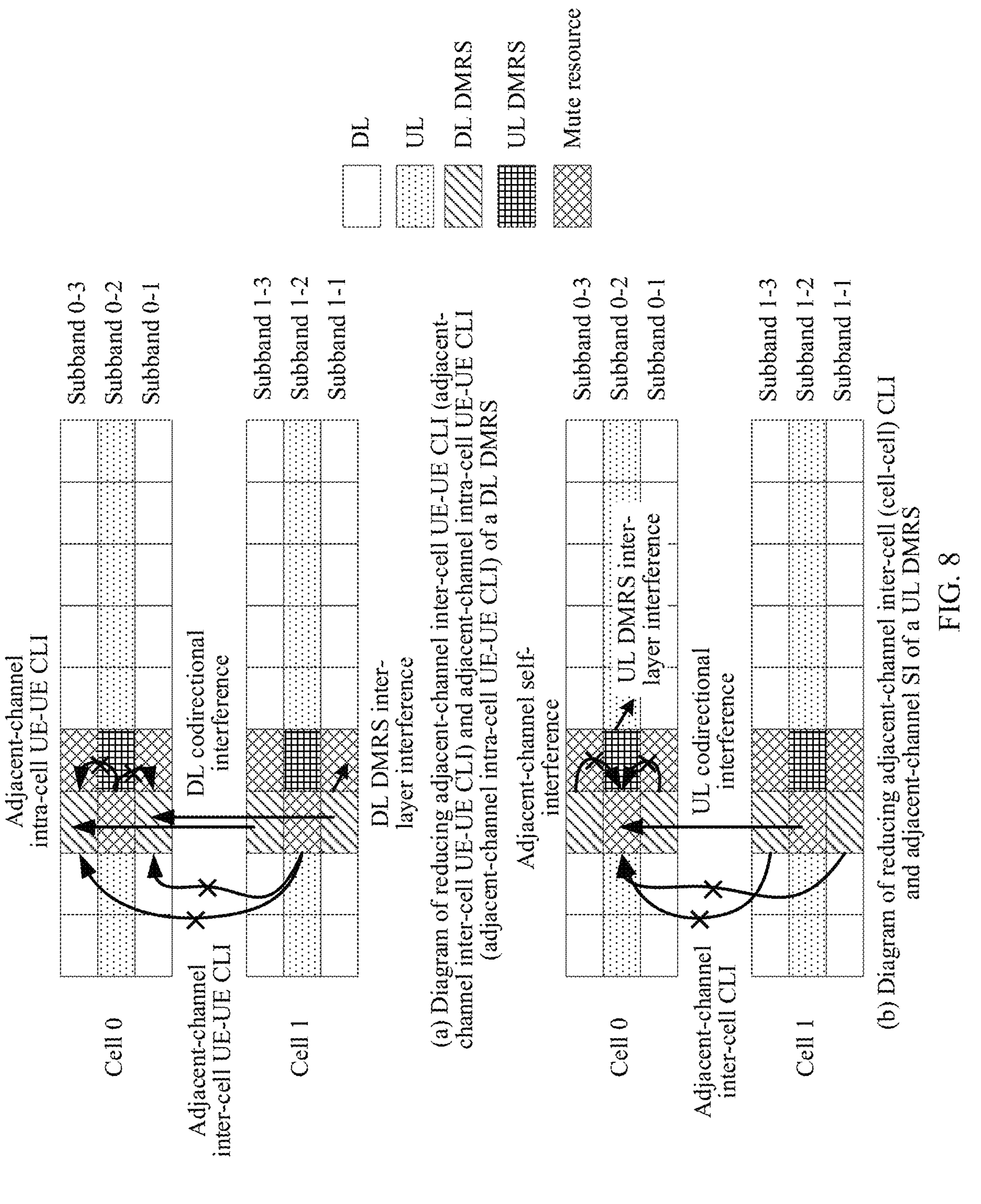
FIG. 8 is a diagram of reducing interference according to this application.

For example, the cell 0 of the network device 0 and a cell 1 of a network device 1 are used as an example for description. As shown in FIG. 8, a first uplink subband corresponding to the cell 0 is a subband 0-2, a first downlink subband corresponding to the cell 0 is a subband 0-1, a second downlink subband corresponding to the cell 0 is a subband 0-3, a first uplink subband corresponding to the cell 1 is a subband 1-2, a first downlink subband corresponding to the cell 1 is a subband 1-1, and a second downlink subband corresponding to the cell 1 is a subband 1-3.

Due to the foregoing mentioned interference, after determining the first time-frequency resource on the first downlink subband and the second time-frequency resource on the second downlink subband, the network device indicates the first time-frequency resource and the second time-frequency resource to the terminal device, so that when receiving the zero-power downlink signal on the first time-frequency resource and the second time-frequency resource, the terminal device can measure the adjacent-channel UE-UE CLI. In addition, when the network device sends the zero-power downlink signal on the first time-frequency resource and the second time-frequency resource, the adjacent-channel cell-cell CLI and the adjacent-channel SI of the UL DMRS can be reduced. For example, (b) in FIG. 8 is a diagram of reducing adjacent-channel cell-cell CLI and adjacent-channel SI of a UL DMRS. The first time-frequency resource and the second time-frequency resource each may be referred to as a mute (mute) resource (or a reserved resource, or the like). For ease of illustration, only the mute resource is shown in FIG. 8. It should be understood that, in FIG. 8, a mute resource located on the first downlink subband (the subband 0-1 and the subband 1-1) is the first time-frequency resource, and a mute resource located on the second downlink subband (the subband 0-3 and the subband 1-3) is the second time-frequency resource.

Optionally, the network device exchanges a slot format, a periodicity (for example, a cell-level TDD periodicity), and the like with another network device, for example, information such as a start symbol position of a DMRS and a quantity of symbols occupied by the DMRS. The information is used by the network device to determine the first time-frequency resource and the second time-frequency resource.

For example, the network device sends a capability query request to the terminal device, to query whether the terminal device supports a subband fullduplex capability. The terminal device sends capability information to the network device. The capability information includes information about whether the terminal device supports the subband fullduplex capability. Further, the network device configures the first time-frequency resource and the second time-frequency resource based on the capability information of the terminal device.

In a first possible example, the network device may configure that the frequency domain range of the first time-frequency resource is all RBs on the first downlink subband, and the frequency domain range of the second time-frequency resource is all RBs on the second downlink subband. In this case, overheads can be reduced.

Further, in this case, the second configuration information indicates that the frequency domain range of the first time-frequency resource is all the RBs on the first downlink subband, and the second configuration information indicates that the frequency domain range of the second time-frequency resource is all the RBs on the second downlink subband. Further, the terminal device may determine a frequency range of the first time-frequency resource and a frequency range of the second time-frequency resource on the carrier in each slot in the first time range based on the frequency domain range of the first downlink subband and the frequency domain range of the second downlink subband on the carrier that are indicated by the first configuration information and content indicated by the second configuration information.

In the first possible example, the second configuration information may perform indication by using a flag bit (flag) or a parameter.

In a second possible example, the foregoing interference is mainly caused by an RB included on a subband and an adjacent edge RB on a contradirectional subband, and the contradirectional subband is a subband with a reverse transmission direction. Adjacent-channel interference caused by another RB is small and may be ignored. Therefore, when determining a specific frequency domain resource on the first time-frequency resource on the first downlink subband and a specific frequency domain resource on the second time-frequency resource on the second downlink subband, the network device may determine that the frequency domain resource on which the first time-frequency resource and the second time-frequency resource are located is an edge RB on a corresponding subband, to reduce a quantity of RBs occupied by a reserved resource. An edge RB on the first downlink subband is an RB at an edge that is of the first downlink subband and that is adjacent to the first uplink subband, and an edge RB on the second downlink subband is an RB at an edge that is of the second downlink subband and that is adjacent to the first uplink subband.

Optionally, that the network device may configure the frequency domain resource of the first time-frequency resource includes: M1 RBs whose end position is an RB corresponding to a largest RB sequence number on the first downlink subband; and configuring the frequency domain resource of the second time-frequency resource includes: M2 RBs whose start position is an RB corresponding to a smallest RB sequence number on the second downlink subband. The M1 RBs are some of the RBs included on the first downlink subband, and the M2 RBs are some of the RBs included on the second downlink subband. M1 and M2 are integers greater than or equal to 1.

Figure 9:
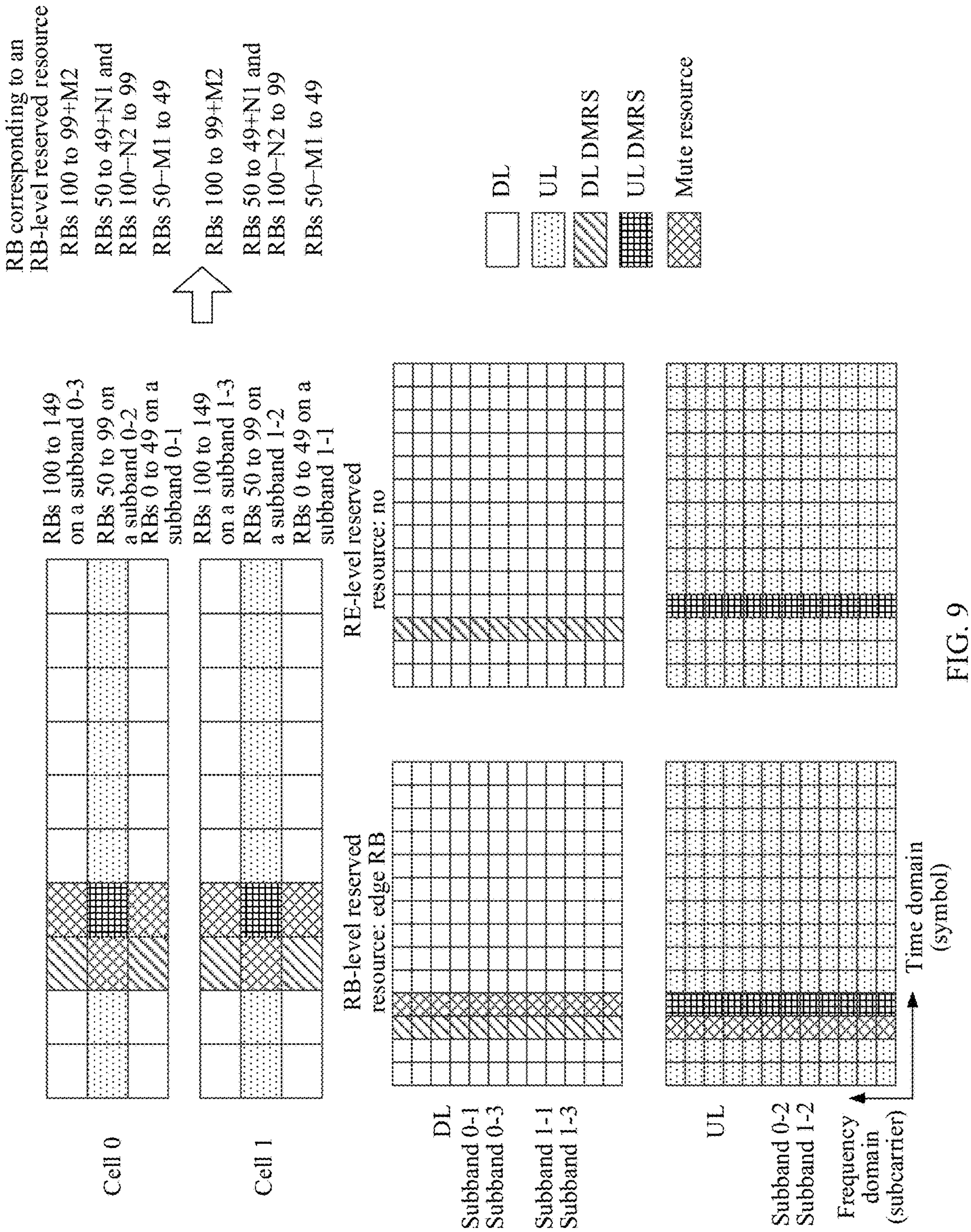
FIG. 9 is a diagram of a reserved resource according to this application.

For example, an example in which one carrier includes 150 RBs is used for description. Correspondingly, as shown in FIG. 9, the subband 0-1 includes RBs 0 to 49, the subband 0-2 includes RBs 50 to 99, and the subband 0-3 includes RBs 100 to 149. Similarly, the subband 1-1 includes RBs 0 to 49, the subband 1-2 includes RBs 50 to 99, and the subband 1-3 includes RBs 100 to 149. For the cell 0 of the network device 0, a frequency domain resource occupied by the first time-frequency resource on the subband 0-1 includes M1 RBs whose end position is RB 49 on the subband 0-1, in other words, includes RB 50-M1 to RB 49, in other words, RB 50-M1 to RB 49 are edge RBs on the subband 0-1; and a frequency domain resource occupied by the second time-frequency resource on the subband 0-3 includes M2 RBs whose start position is RB 100 on the subband 0-3, in other words, includes RB 100 to RB 99+M2, in other words, RB 100 to RB 99+M2 are edge RBs on the subband 0-3. Similarly, edge RBs on the subband 1-1 are RB 50-M1 to RB 49, and edge RBs on the subband 1-3 are RB 100 to RB 99+M2.

Further, as shown in FIG. 9, for each edge RB on a downlink subband, that is, the subband 0-1 and the subband 0-3, and the subband 1-1 and the subband 1-3, a subcarrier is determined in an RB-level resource reservation manner, without performing RE-level resource reservation.

Optionally, a position of the first time-frequency resource on the first downlink subband and a position of the second time-frequency resource on the second downlink subband may be shown in Table 1.

TABLE 1

| First downlink subband | Subcarrier position of a first time-frequency resource | Second downlink subband | Subcarrier position of a second time-frequency resource |
|---|---|---|---|
| | Subcarriers 0 to 11 on M1 edge RBs | | Subcarriers 0 to 11 on M2 edge RBs |
| | No another RB is occupied | | No another RB is occupied |
| | Symbol position of the first time-frequency resource | | Symbol position of the second time-frequency resource |
| | Symbol position of a UL DMRS of a current cell and symbol position of a UL DMRS of an adjacent cell | | Symbol position of a UL DMRS of a current cell and symbol position of a UL DMRS of an adjacent cell |

The M1 edge RBs are the M1 RBs whose end position is the RB corresponding to the largest RB sequence number on the first downlink subband. The M2 edge RBs are the M2 RBs whose start position is the RB corresponding to the smallest RB sequence number on the second downlink subband.

In an optional implementation, M1 may be equal to M2.

Further, in the second possible example, the second configuration information may indicate that the first time-frequency resource occupies the M1 RBs, and the second time-frequency resource occupies the M2 RBs. Further, the terminal device may determine the frequency domain resource of the first time-frequency resource and the frequency domain resource of the second time-frequency resource based on the first configuration information and the second configuration information. Specifically, for content included in the frequency domain resource of the first time-frequency resource and content included in the frequency domain resource of the second time-frequency resource that are determined by the terminal device, refer to the foregoing related descriptions. Details are not described herein again.

The following describes, by using two examples, how the second configuration information indicates that the first time-frequency resource occupies the M1 RBs, and the second time-frequency resource occupies the M2 RBs:

Example a1: It is assumed that when M1 is equal to M2, the second configuration information may include one value. For example, when the second configuration information includes {2}, it indicates that the second configuration information indicates that the first time-frequency resource and the second time-frequency resource each occupy two RBs.

Example a2: It is assumed that M1 is 1, M2 is 2, and the second configuration information includes {1, 2}. In this case, it indicates that the second configuration information indicates that the first time-frequency resource occupies one RB, and the second time-frequency resource occupies two RBs.

In addition to the foregoing methods, when the second configuration information indicates the frequency domain range of the first time-frequency resource on the first downlink subband and the frequency domain range of the second time-frequency resource on the second downlink subband, this can be further implemented by indicating a quantity of bits occupied by an RB of the first time-frequency resource on the first downlink subband and a quantity of bits occupied by an RB of the second time-frequency resource on the second downlink subband.

In a manner, the second configuration information may include a first bit group, the first bit group includes a plurality of bits, the plurality of bits correspond to the RB corresponding to the first downlink subband and the RB corresponding to the second downlink subband, and positions of RBs corresponding to bits whose values are a first value in the plurality of bits are a frequency domain position of the first time-frequency resource and a frequency domain position of the second time-frequency resource on corresponding downlink subbands.

Figure 10:
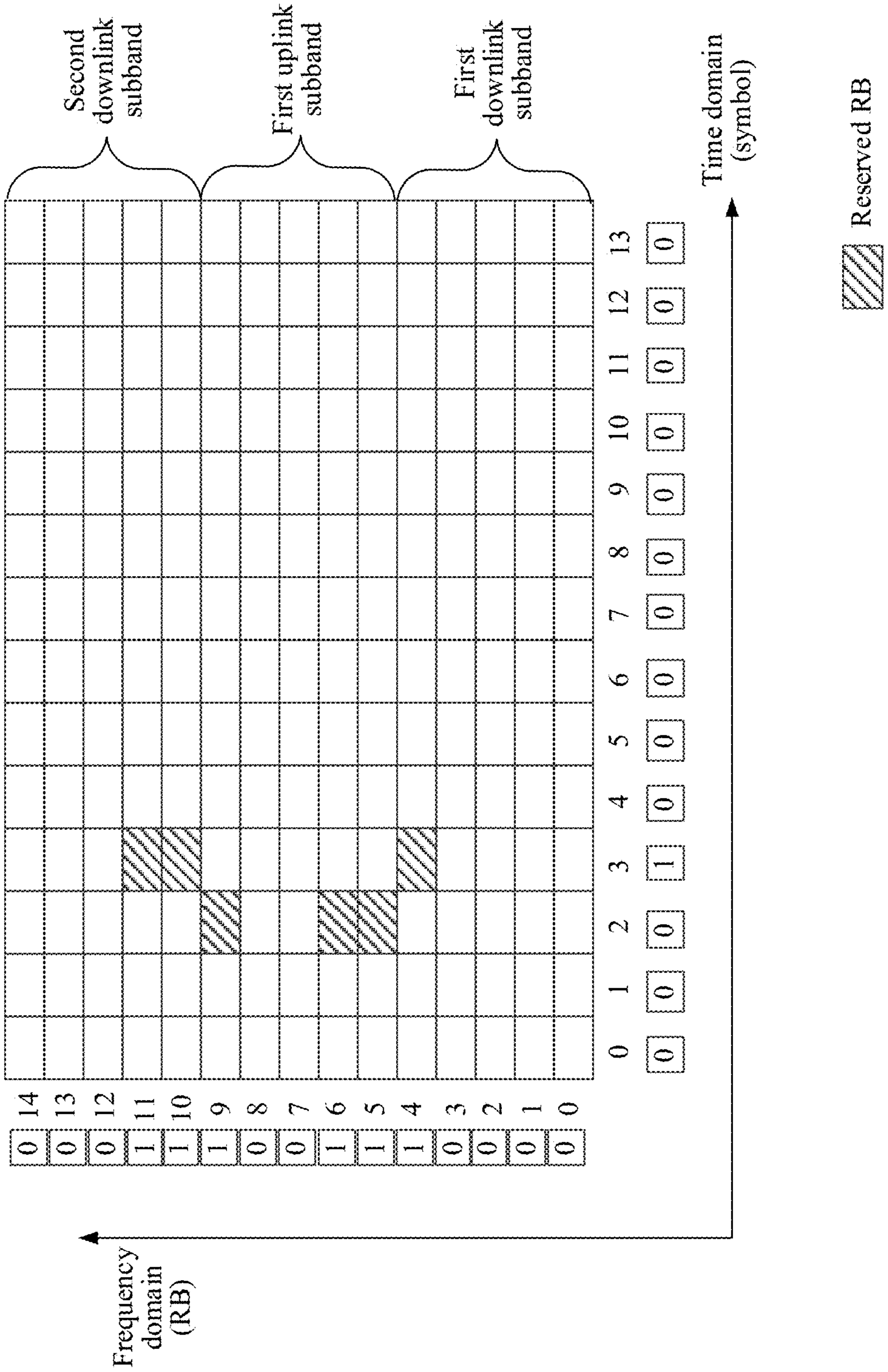
FIG. 10 is a diagram of RB reservation according to this application.

For example, in a diagram of RB reservation in FIG. 10, the first time-frequency resource occupies an RB whose RB number is 4 on the first downlink subband, and the second time-frequency resource occupies RBs whose RB numbers are 10 and 11 on the second downlink subband. In this case, the second configuration information may include 0000111000. Bits whose values are 1 indicate positions corresponding to RBs occupied by the first time-frequency resource and the second time-frequency resource.

In another manner, the second configuration information includes three bit groups and start positions or end positions of RBs respectively corresponding to the three bit groups, each of the three bit groups includes at least one bit, two bit groups whose bit values are all a second value in the three bit groups respectively correspond to the first downlink subband and the second downlink subband, a quantity of bits included in each of the two bit groups indicates a quantity of RBs, and quantities of RBs respectively corresponding to the two bit groups and start positions or end positions of the RBs respectively corresponding to the two bit groups indicate a frequency domain position of the first time-frequency resource on the first downlink subband and a frequency domain position of the second time-frequency resource on the second downlink subband.

For example, the second configuration information includes 1011. Herein, the first digit "1" is a first bit group, 0 is a second bit group, and the last two digits "1" are a third bit group. The two bit groups "1" and "11" whose bit values are 1 respectively correspond to the first downlink subband and the second downlink subband. That a quantity of bits in the first bit group is 1 indicates that the first time-frequency resource occupies one RB on the first downlink subband; and that a quantity of bits in the third bit group is 2 indicates that the second time-frequency resource occupies two RBs on the second downlink subband.

In an optional implementation, the time domain symbol position of the first time-frequency resource and the time domain symbol position of the second time-frequency resource are the time domain symbol position of the UL DMRS of the current cell. In this case, the terminal device may accurately determine the first time-frequency resource and the second time-frequency resource with reference to the second configuration information and the first configuration information.

Optionally, a symbol type of some or all symbols in the slot in the first time range on the first downlink subband is "downlink", a symbol type of some or all symbols in the slot in the first time range on the second downlink subband is "downlink", and a symbol type of some or all symbols in the slot in the first time range on the first uplink subband is "uplink".

Optionally, single-periodicity or dual-periodicity duration of an RRC slot format configuration is T, T includes N slots, and the first time range is some or all slots in the N slots.

Optionally, single-periodicity or dual-periodicity duration of RRC slot format configurations of different cells is the same.

In an example, a time period in which a symbol type of the first downlink subband is "downlink" is the same as a time period in which a symbol type of the second downlink subband is "downlink" in the first time range.

In an optional implementation, the network device may further determine fifth configuration information. The fifth configuration information indicates the time domain resource of the first time-frequency resource and the time domain resource of the second time-frequency resource.

Optionally, the fifth configuration information may include information indicating a time domain symbol position of the first time-frequency resource and a time domain symbol position of the second time-frequency resource in any slot in the first time range.

For example, the fifth configuration information may include at least two pieces of information in a start time domain symbol, an end time domain symbol, and a time domain symbol length of the first time-frequency resource, and include at least two pieces of information in a start time domain symbol, an end time domain symbol, and a time domain symbol length of the second time-frequency resource. For example, if the fifth configuration information may include {3, 1}, it indicates that a start symbol number of the first time-frequency resource and a start symbol number of the second time-frequency resource are 3, and a symbol length is 1. If the time domain symbol position of the first time-frequency resource and the time domain symbol position of the second time-frequency resource are different, the first time-frequency resource and the second time-frequency resource may be separately configured.

Figure 11:
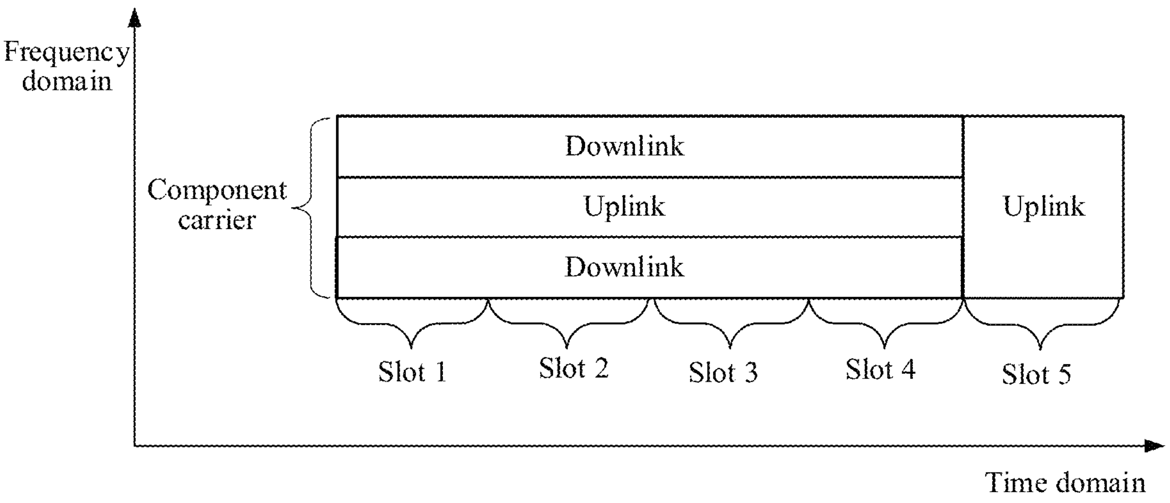
FIG. 11 is a diagram of a time range according to this application.

In a manner, the fifth configuration information may further include information indicating the first time range, the first time range falls within a second time range, and the second time range is the duration T or an integer multiple of the duration T. For example, if the fifth configuration information includes 11110, it indicates that the first time range is first four slots, for example, a slot 1 to a slot 4 shown in FIG. 11, and the second time range is five slots, for example, the slot 1 to a slot 5 shown in FIG. 11.

Optionally, the information indicating the first time range may include at least two pieces of information in start slots, end slots, and quantities of slots of the first time-frequency resource and the second time-frequency resource.

Alternatively, the information indicating the first time range may include at least two pieces of information in a start slot, an end slot, and a quantity of slots. In this case, it indicates that time ranges of reserved resources in an uplink subband and a downlink subband may be the same.

Optionally, when a slot in the second time range meets a constraint condition A1, the slot belongs to the first time range. The constraint condition A1 may be a subset of a constraint condition A, and the constraint condition A may be at least one of the following:

- a symbol category of at least one symbol in symbols included in the slot on the downlink subband is "DL", and a symbol category on the uplink subband is "UL"; or
- a symbol category of at least one symbol in symbols included in the slot on the downlink subband is "DL", and a symbol category on the uplink subband is "flexible (flexible, F)"; or
- a symbol category of at least one symbol in symbols included in the slot on the downlink subband is "F", and a symbol category on the uplink subband is "UL"; or
- a symbol category of at least one symbol in symbols included in the slot on the downlink subband is "F", and a symbol category on the uplink subband is "F".

In a third possible example, edge consecutive M1 RBs and edge consecutive M2 RBs are configured for resource reservation in the second possible example, and the other RBs are not used for resource reservation. The edge consecutive M1 RBs and the edge consecutive M2 RBs may be referred to as consecutive RB-level resource reservation. In the third possible example, discrete RB-level resource reservation may be performed for some or all of the other RBs. In this case, compared with the second possible example, in the third possible example, overheads of the reserved resource increase, and accuracy of channel estimation performed based on the UL DMRS is improved. The discrete RB-level resource reservation means that M4 RBs are reserved in every M3 RBs, M3 and M4 are positive integers, and M4 is less than M3.

In an optional implementation, a default value of M4 is 1.

Optionally, the network device configures, on the first downlink subband, a frequency domain range of the discrete RB-level resource reservation is all the RBs on the first downlink subband, and the network device configures, on the second downlink subband, a frequency domain range of the discrete RB-level resource reservation is all the RBs on the second downlink subband. For an indication manner of the frequency domain range of the discrete RB-level resource reservation, refer to the method in the first possible example. Mutual references may be made.

Optionally, the network device may determine that a frequency domain resource of the discrete RB-level resource reservation is an edge RB (that is, some RBs) on a corresponding subband. An edge RB on the first downlink subband is an RB at an edge that is of the first downlink subband and that is adjacent to the first uplink subband, and an edge RB on the second downlink subband is an RB at an edge that is of the second downlink subband and that is adjacent to the first uplink subband. For an indication manner of the frequency domain range of the discrete RB-level resource reservation, refer to the method in the second possible example. Mutual references may be made.

For example, in the frequency domain range of the discrete RB-level resource reservation on the first downlink subband, first M41 RBs in every M31 RBs are used for resource reservation, where M31 and M41 are positive integers, and M41 is less than M31; and in the frequency domain range of the discrete RB-level resource reservation on the second downlink subband, first M42 RBs in every M32 RBs are used for resource reservation, where M32 and M42 are positive integers, and M42 is less than M32.

In an optional implementation, M31 is equal to M32, and M41 is equal to M42.

Further, in the third possible example, the second configuration information may indicate parameters M31 and M41 of the discrete RB-level resource reservation on the first downlink subband and parameters M32 and M42 of the discrete RB-level resource reservation on the second downlink subband. The terminal device may determine RBs of the discrete RB-level resource reservation on the first downlink subband and the second downlink subband based on the first configuration information and the second configuration information.

The following describes, by using three examples, how the second configuration information indicates the parameters M31 and M41 of the discrete RB-level resource reservation on the first downlink subband and the parameters M32 and M42 of the discrete RB-level resource reservation on the second downlink subband.

Example a3: It is assumed that M31 is equal to M32, M41 is equal to M42, and M41 is a default value. For example, M41 is 1. The second configuration information may include one value. For example, when the second configuration information includes {2}, it indicates that the second configuration information indicates that a first RB in every two RBs on the frequency domain resource of the discrete RB-level resource reservation on the first downlink subband and the frequency domain resource of the discrete RB-level resource reservation on the second downlink subband is used for resource reservation. It is assumed that the frequency domain resource of the discrete RB-level resource reservation on the first downlink subband is RBs 0 to 49. In this case, resource reservation is performed for RBs {0, 2, 4, 6, 8, 10, 12, 14, 16, 18, 20, 22, 24, 26, 28, 30, 32, 34, 36, 38, 40, 42, 44, 46, 48}.

Example a4: It is assumed that M31 is equal to M32, and M41 is equal to M42. The second configuration information may include two values. For example, when the second configuration information includes {4, 2}, it indicates that the second configuration information indicates that first two RBs in every four RBs on the frequency domain resource of the discrete RB-level resource reservation on the first downlink subband and the frequency domain resource of the discrete RB-level resource reservation on the second downlink subband are used for resource reservation. It is assumed that the frequency domain resource of the discrete RB-level resource reservation on the first downlink subband is RBs 0 to 49. In this case, resource reservation is performed for RBs {0, 1, 4, 5, 8, 9, 12, 13, 16, 17, 20, 21, 24, 25, 28, 29, 32, 33, 36, 37, 40, 41, 44, 45, 48, 49}.

Example a5: It is assumed that M31 is 4, M32 is 3, M41 is 2, and M42 is 1. The second configuration information may include four values. For example, when the second configuration information includes {4, 2; 2, 1}, it indicates that the second configuration information indicates that first two RBs in every four RBs on the frequency domain resource of the discrete RB-level resource reservation on the first downlink subband are used for resource reservation, and a first RB in every two RBs on the frequency domain resource of the discrete RB-level resource reservation on the second downlink subband is used for resource reservation.

In a fourth possible example, it is configured that an edge RB is used for resource reservation, and the other RBs are not used for resource reservation in the second possible example. In the fourth possible example, RE-level resource reservation may be performed for some or all of the other RBs, and the resource reservation may be referred to as additional RE-level resource reservation. In this case, compared with the second possible example, in the third possible example, overheads of the reserved resource increase, and accuracy of channel estimation performed based on the UL DMRS is improved.

Optionally, the network device configures, on the first downlink subband, a frequency domain range of an RB of the additional RE-level resource reservation is all the RBs on the first downlink subband, and the network device configures, on the second downlink subband, a frequency domain range of an RB of the additional RE-level resource reservation is all the RBs on the second downlink subband. For an indication manner of the RB of the additional RE-level resource reservation, refer to the method in the first possible example. Mutual references may be made.

Optionally, the network device may determine that the RB of the additional RE-level resource reservation is an edge RB (that is, some RBs) on a corresponding subband. An edge RB on the first downlink subband is an RB at an edge that is of the first downlink subband and that is adjacent to the first uplink subband, and an edge RB on the second downlink subband is an RB at an edge that is of the second downlink subband and that is adjacent to the first uplink subband. For an indication manner of the RB of the additional RE-level resource reservation, refer to the method in the second possible example. Mutual references may be made.

On the first downlink subband, there is a spacing of m31 REs between occupied REs in each of the RB of the additional RE-level resource reservation, and a minimum value of a subcarrier ID in the occupied REs is m41, where m31 is a positive integer, m41 is an integer, m31 is less than 13, and m41 is less than 12. On the second downlink subband, there is a spacing of m32 REs between occupied REs in each of the RB of the additional RE-level resource reservation, and a minimum value of a subcarrier ID in the occupied REs is m42, where m32 is a positive integer, m42 is an integer, m32 is less than 13, and m42 is less than 12.

In an optional implementation, default values of m41 and m42 are 0.

In an optional implementation, m31 is equal to m32, and m41 is equal to m42.

Further, in the third possible example, the second configuration information may indicate parameters m31 and m41 of each of the RB of the additional RE-level resource reservation on the first downlink subband and parameters m32 and m42 of each of the RB of the additional RE-level resource reservation on the second downlink subband. The terminal device may determine a subcarrier occupied by each of the RB of the additional RE-level resource reservation on the first downlink subband and the second downlink subband based on the first configuration information and the second configuration information.

The following describes, by using three examples, how the second configuration information indicates the parameters m31 and m41 of each of the RB of the additional RE-level resource reservation on the first downlink subband and the parameters m32 and m42 of each of the RB of the additional RE-level resource reservation on the second downlink subband.

Example a6: It is assumed that m31 is equal to m32, m41 is equal to m42, and m41 is a default value. For example, m41 is 0. The second configuration information may include one value. For example, when the second configuration information includes {4}, it indicates that the second configuration information indicates that a minimum value of a subcarrier ID of an occupied RE in each of the RB of the additional RE-level resource reservation on the first downlink subband and each of the RB of the additional RE-level resource reservation on the second downlink subband is 0, and a spacing between the occupied REs is four REs. That is, the occupied REs are {0, 4, 8}.

Example a7: It is assumed that m31 is equal to m32, and m41 is equal to m42. The second configuration information may include two values. For example, when the second configuration information includes {4, 2}, it indicates that the second configuration information indicates that a minimum value of a subcarrier ID of an occupied RE in each of the RB of the additional RE-level resource reservation on the first downlink subband and each of the RB of the additional RE-level resource reservation on the second downlink subband is 2, and a spacing between the occupied REs is four REs. That is, the occupied REs are {2, 6, 10}.

Example a8: It is assumed that m31 is 4, m32 is 3, m41 is 1, and m42 is 0. The second configuration information may include four values. For example, when the second configuration information includes {4, 1; 3, 0}, it indicates that the second configuration information indicates that a minimum value of a subcarrier ID of an occupied RE in each of the RB of the additional RE-level resource reservation on the first downlink subband is 1, and a spacing between the occupied REs is four REs, that is, the occupied REs are {1, 5, 9}; and a minimum value of a subcarrier ID of an occupied RE in each of the RB of the additional RE-level resource reservation on the second downlink subband is 0, and a spacing between the occupied REs is three REs. That is, the occupied REs are {0, 3, 6, 9}.

In the third possible example and the fourth possible example, a symbol of the discrete RB-level resource reservation, a symbol of the additional RE-level resource reservation, the first time range, and the second time range are the same as those in the first possible example and the second possible example. Mutual references may be made. For a manner in which the network device 0 indicates the symbol of the discrete RB-level resource reservation, the symbol of the additional RE-level resource reservation, the first time range, and the second time range, refer to the methods in the first possible example and the second possible example.

According to the method, the terminal device can perform interference measurement based on the first time-frequency resource and the second time-frequency resource, to improve demodulation performance.

Figure 12:
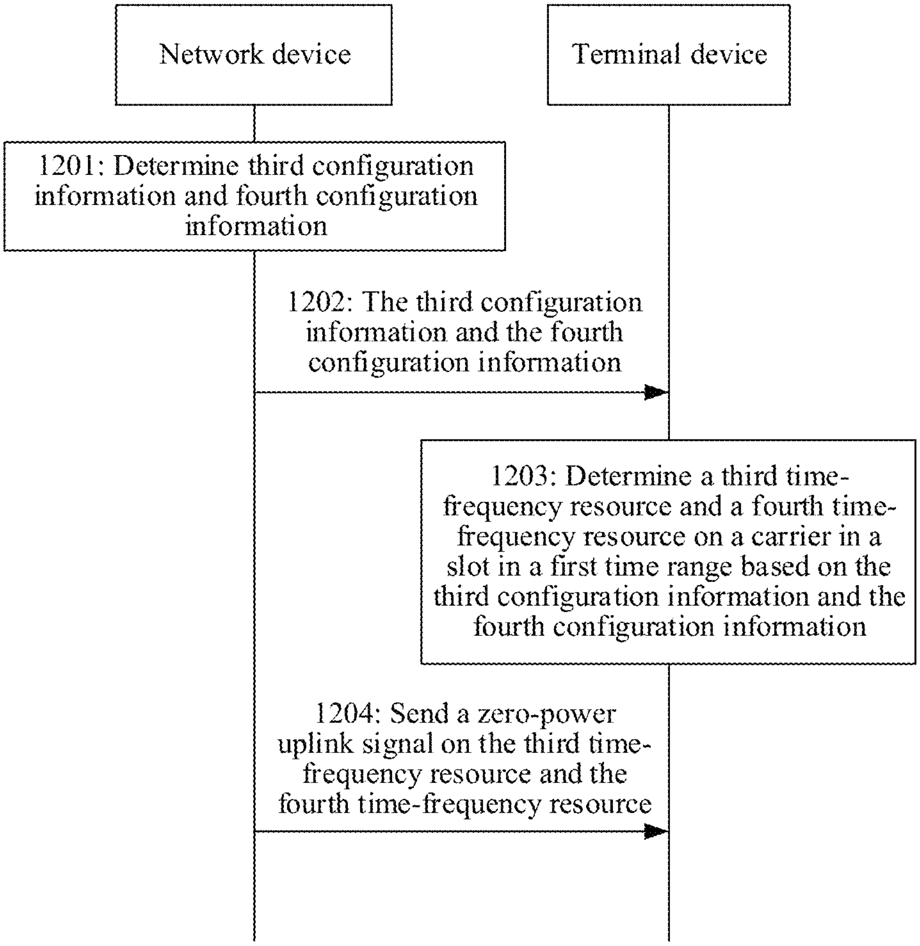
FIG. 12 is a flowchart of another communication method according to this application.

Based on the foregoing descriptions, an embodiment of this application further provides another communication method, applied to a scenario in which SBFD is performed for all network devices in a communication system. As shown in FIG. 12, a specific procedure of the method may include the following steps.

Step 1201: A network device determines third configuration information and fourth configuration information.

The third configuration information indicates a frequency domain range of a first uplink subband on a carrier and a time domain symbol position of a DL DMRS of a current cell, and the fourth configuration information indicates a frequency domain range of a third time-frequency resource and a frequency domain range of a fourth time-frequency resource on the first uplink subband.

Step 1202: The network device sends the third configuration information and the fourth configuration information to a terminal device.

Step 1203: The terminal device determines the third time-frequency resource and the fourth time-frequency resource on a carrier in one slot in a first time range based on the third configuration information and the fourth configuration information.

The terminal device may determine the third time-frequency resource and the fourth time-frequency resource on a carrier in each slot in the first time range based on the third configuration information and the fourth configuration information.

Step 1204: The network device sends a zero-power uplink signal on the third time-frequency resource and the fourth time-frequency resource.

For the first uplink subband and a relationship between the first uplink subband, a first downlink subband, and a second downlink subband, refer to related descriptions in the embodiment shown in FIG. 7. Details are not described herein again.

A cell 0 of a network device 0 and a cell 1 of a network device 1 are still used as an example for description. As shown in FIG. 8, a first uplink subband corresponding to the cell 0 is a subband 0-2, a first downlink subband corresponding to the cell 0 is a subband 0-1, a second downlink subband corresponding to the cell 0 is a subband 0-3, a first uplink subband corresponding to the cell 1 is a subband 1-2, a first downlink subband corresponding to the cell 1 is a subband 1-1, and a second downlink subband corresponding to the cell 1 is a subband 1-3.

Due to the foregoing interference, after determining the third time-frequency resource and the fourth time-frequency resource on the first uplink subband, the network device indicates the third time-frequency resource and the fourth time-frequency resource to the terminal device, so that the terminal device sends a zero-power uplink signal on the third time-frequency resource and the fourth time-frequency resource, and the network device may measure adjacent-channel cell-cell CLI and adjacent-channel SI on the third time-frequency resource and the fourth time-frequency resource. In addition, when the terminal device sends the zero-power uplink signal on the third time-frequency resource and the fourth time-frequency resource, adjacent-channel UE-UE CLI of the DL DMRS may be reduced. For example, (a) in FIG. 8 is a diagram of reducing adjacent-channel inter-cell UE-UE CLI and adjacent-channel intra-cell UE-UE CLI of a DL DMRS. The third time-frequency resource and the fourth time-frequency resource each may be referred to as a mute (mute) resource. For ease of illustration, only the mute resource is shown in FIG. 8. It should be understood that, in FIG. 8, a mute resource located on the first uplink subband (the subband 0-2 and the subband 1-2) is the third time-frequency resource and the fourth time-frequency resource.

Optionally, the network device exchanges a slot format, a periodicity (for example, a cell-level TDD periodicity), and the like with another network device, for example, information such as a start symbol position of a DMRS and a quantity of symbols occupied by the DMRS. The information is used by the network device to determine the third time-frequency resource and the fourth time-frequency resource.

For example, the network device sends a capability query request to the terminal device, to query whether the terminal device supports a subband fullduplex capability. The terminal device sends capability information to the network device. The capability information includes information about whether the terminal device supports the subband fullduplex capability. Further, the network device configures the third time-frequency resource and the fourth time-frequency resource based on the capability information of the terminal device.

In a first possible example, the network device may configure that the third time-frequency resource and the fourth time-frequency resource are a same time-frequency resource. To be specific, the network device may configure that the frequency domain range of the third time-frequency resource is all RBs on the first uplink subband, and the frequency domain range of the fourth time-frequency resource is all the RBs on the first uplink subband. In this case, overheads can be reduced.

Further, in this case, the fourth configuration information may indicate that the frequency domain range of the third time-frequency resource is all the RBs on the first uplink subband, and the fourth configuration information indicates that the frequency domain range of the fourth time-frequency resource is all the RBs on the first uplink subband. Further, the terminal device may determine a frequency range of the third time-frequency resource and a frequency range of the fourth time-frequency resource on the carrier in each slot in the first time range based on the frequency domain range that is of the first uplink subband on the carrier and that is indicated by the third configuration information and content indicated by the fourth configuration information.

In the first possible example, the fourth configuration information may perform indication by using a flag bit (flag) or a parameter.

In a second possible example, the foregoing interference is mainly caused by an RB included on a subband and an adjacent edge RB on a contradirectional subband, and the contradirectional subband is a subband with a reverse transmission direction. Adjacent-channel interference caused by another RB is small and may be ignored. Therefore, when determining a specific frequency domain resource on the third time-frequency resource and a specific frequency domain resource on the fourth time-frequency resource on the first uplink subband, the network device may determine that the frequency domain resource on which the third time-frequency resource and the fourth time-frequency resource are located is an edge RB on a corresponding subband, to reduce a quantity of RBs occupied by a reserved resource. An edge RB on the first uplink subband is an edge RB that is on the first uplink subband and that is adjacent to the first downlink subband and an edge RB that is on the first uplink subband and that is adjacent to the second downlink subband.

Optionally, that the network device may configure the frequency domain resource of the third time-frequency resource includes: N1 RBs whose start position is an RB corresponding to a smallest RB sequence number on the first uplink subband; and configuring the frequency domain resource of the fourth time-frequency resource includes: N2 RBs whose end position is an RB corresponding to a largest RB sequence number on the first uplink subband. The N1 RBs and the N2 RBs are some RBs in the RBs included on the first uplink subband. N1 and N2 are integers greater than or equal to 1.

For example, an example in which one carrier includes 150 RBs is still used for description, as shown in FIG. 9. For the cell 0 of the network device 0, a frequency domain resource occupied by the third time-frequency resource on the subband 0-2 includes N1 RBs whose start position is RB 50 on the subband 0-2, in other words, includes RB 50 to RB 49+N1, in other words, RB 50 to RB 49+N1 are lower edge RBs on the subband 0-2; and a frequency domain resource occupied by the fourth time-frequency resource on the subband 0-2 includes N2 RBs whose end position is RB 99 on the subband 0-2, in other words, includes RB 100-N2 to RB 99, in other words, RB 100-N2 to RB 99 are upper edge RBs on the subband 0-2. Similarly, lower edge RBs on the subband 1-2 are RB 50 to RB 49+N1, and upper edge RBs on the subband 1-2 are RB 100-N2 to RB 99.

Further, as shown in FIG. 9, for each edge RB on an uplink subband, that is, the subband 0-2 and the subband 1-2, a subcarrier is determined in an RB-level resource reservation manner, without performing RE-level resource reservation.

Optionally, a position of the third time-frequency resource and a position of the fourth time-frequency resource on the first uplink subband may be shown in Table 2.

TABLE 2

| First uplink subband | Subcarrier position of a third time-frequency resource | First uplink subband | Subcarrier position of a fourth time-frequency resource |
|---|---|---|---|
| | Subcarriers 0 to 11 on N1 edge RBs | | Subcarriers 0 to 11 on N2 edge RBs |
| | No another RB is occupied | | No another RB is occupied |
| | Symbol position of the third time-frequency resource | | Symbol position of the fourth time-frequency resource |
| | Symbol position of a DL DMRS of a current cell and symbol position of a DL DMRS of an adjacent cell | | Symbol position of a DL DMRS of a current cell and symbol position of a DL DMRS of an adjacent cell |

The N1 edge RBs are the N1 RBs whose start position is the RB corresponding to the smallest RB sequence number on the first uplink subband. The N2 edge RBs are the N2 RBs whose end position is the RB corresponding to the largest RB sequence number on the first uplink subband.

In an optional implementation, N1 may be equal to N2.

In another optional implementation, N1 and N2 may be equal to M1 and M2 described above.

Further, in the second possible example, the fourth configuration information may indicate that the third time-frequency resource occupies the N1 RBs, and the fourth time-frequency resource occupies the N2 RBs. Further, the terminal device may determine the frequency domain resource of the third time-frequency resource and the frequency domain resource of the fourth time-frequency resource based on the third configuration information and the fourth configuration information. Specifically, for content included in the frequency domain resource of the third time-frequency resource and content included in the frequency domain resource of the fourth time-frequency resource that are determined by the terminal device, refer to the foregoing related descriptions. Details are not described herein again.

The following describes, by using one example, how the fourth configuration information indicates that the third time-frequency resource occupies the N1 RBs and the fourth time-frequency resource occupies the N2 RBs: The fourth configuration information includes {2, 1}, where 2 indicates a quantity of RBs that are on the first uplink subband and that are adjacent to the first downlink subband, that is, indicates that the third time-frequency resource occupies two RBs; and 1 indicates a quantity of RBs that are on the first uplink subband and that are adjacent to the second downlink subband, that is, indicates that the fourth time-frequency resource occupies one RB.

In addition to the foregoing method, when the fourth configuration information indicates the frequency domain range of the third time-frequency resource and the frequency domain range of the fourth time-frequency resource on the first uplink subband, this can be further implemented by indicating a quantity of bits occupied by an RB of the third time-frequency resource and a quantity of bits occupied by an RB of the fourth time-frequency resource on the first uplink subband.

In a manner, the fourth configuration information may include a second bit group, the second bit group includes a plurality of bits, the plurality of bits correspond to an RB corresponding to the first uplink subband, and positions of RBs corresponding to bits whose values are a first value in the plurality of bits are a frequency domain position of the third time-frequency resource and a frequency domain position of the fourth time-frequency resource on the corresponding first uplink subband.

For example, in a diagram of RB reservation in FIG. 10, the third time-frequency resource occupies RBs whose RB numbers are 5 and 6 on the first uplink subband, and the fourth time-frequency resource occupies an RB whose RB number is 9 on the first uplink subband. In this case, the fourth configuration information may include 11001. Bits whose values are 1 indicate positions corresponding to RBs occupied by the third time-frequency resource and the fourth time-frequency resource.

In another manner, the fourth configuration information includes three bit groups, each of the three bit groups includes at least one bit, two bit groups whose bit values are all a second value in the three bit groups correspond to the first uplink subband, and a quantity of bits included in each of the two bit groups indicates a quantity of RBs.

For example, the fourth configuration information includes 1101. Herein, the first two digits "1" are a first bit group, 0 is a second bit group, and the last digit "1" is a third bit group. The two bit groups "11" and "1" whose bit values are 1 correspond to the first uplink subband. That a quantity of bits in the first bit group is 2 indicates that the third time-frequency resource occupies two RBs that are on the first uplink subband and that are adjacent to the first downlink subband; and that a quantity of bits in the third bit group is 1 indicates that the fourth time-frequency resource occupies one RB that is on the first downlink subband and that is adjacent to the second downlink subband.

In an optional implementation, a time domain symbol position of the third time-frequency resource and a time domain symbol position of the fourth time-frequency resource are the time domain symbol position of the DL DMRS of the current cell. In this case, the terminal device may accurately determine the third time-frequency resource and the fourth time-frequency resource with reference to the fourth configuration information and the third configuration information.

In this embodiment, the first time range may be the same as the first time range in the embodiment shown in FIG. 7. For details, refer to the foregoing related descriptions. Details are not described herein again.

In an optional implementation, the network device may further determine sixth configuration information. The sixth configuration information indicates a time domain resource of the third time-frequency resource and a time domain resource of the fourth time-frequency resource.

Optionally, the sixth configuration information may include information indicating a time domain symbol position of the third time-frequency resource and a time domain symbol position of the fourth time-frequency resource in any slot in the first time range.

For example, the sixth configuration information may include at least two pieces of information in a start time domain symbol, an end time domain symbol, and a time domain symbol length of the third time-frequency resource, and include at least two pieces of information in a start time domain symbol, an end time domain symbol, and a time domain symbol length of the fourth time-frequency resource. For example, if the sixth configuration information may include {2, 1}, it indicates that a start symbol number of the third time-frequency resource and a start symbol number of the fourth time-frequency resource are 2, and a symbol length is 1. If the time domain symbol position of the third time-frequency resource and the time domain symbol position of the fourth time-frequency resource are different, the third time-frequency resource and the fourth time-frequency resource may be separately configured.

In a manner, the sixth configuration information may further include information indicating the first time range, the first time range belongs to a second time range, and the second time range is duration T or an integer multiple of the duration T. For the duration T, refer to the descriptions of T in the embodiment shown in FIG. 7. Details are not described herein again. For example, if the sixth configuration information includes 11110, it indicates that the first time range is first four slots, for example, a slot 1 to a slot 4 shown in FIG. 11. The second time range is five slots, for example, the slot 1 to a slot 5 shown in FIG. 11.

Optionally, the information indicating the first time range may include at least two pieces of information in start slots, end slots, and quantities of slots of the third time-frequency resource and the fourth time-frequency resource.

Alternatively, the information indicating the first time range may include at least two pieces of information in a start slot, an end slot, and a quantity of slots. In this case, it indicates that time ranges of reserved resources in an uplink subband and a downlink subband may be the same.

It should be noted that, for another RB on which no resource reservation is performed on the uplink subband, resource reservation may be performed in a discrete RB-level resource reservation method or an additional RE-level resource reservation method in downlink subband resource reservation. For a manner in which the network device 0 indicates discrete RB-level resource reservation or additional RE-level resource reservation to the terminal device on the subband 0-2, refer to the method in the foregoing embodiment of the downlink subband.

According to the method, the terminal device can perform interference measurement based on the third time-frequency resource and the fourth time-frequency resource, to improve demodulation performance.

It should be noted that, the foregoing plurality of pieces of configuration information may be included in same information, or several pieces of configuration information in the plurality of pieces of configuration information may be included in same information. This is not limited in this application.

It should be noted that, the method shown in the embodiment shown in FIG. 7 and the method in the embodiment shown in FIG. 12 may be simultaneously performed, so that the terminal device receives the zero-power downlink signal on the first time-frequency resource and the second time-frequency resource, and sends the zero-power uplink signal on the third time-frequency resource and the fourth time-frequency resource. Specifically, in this case, the foregoing two embodiments are combined. For a specific process, refer to the descriptions of the foregoing two embodiments. Details are not described herein again.

It should be noted that, the embodiments shown in FIG. 7 and FIG. 12 describe a case in which the carrier includes three subbands, there are two downlink subbands, and one uplink subband is in the middle. This case may be referred to as a DUD case. Optionally, in addition to the foregoing case, there may be a plurality of cases of the subbands on the carrier. For example, the carrier includes three subbands, there are two uplink subbands, and one downlink subband is in the middle. This case may be referred to as a UDU case. For another example, the carrier includes one uplink subband and one downlink subband, and a frequency of the downlink subband is greater than a frequency of the uplink subband. This case may be referred to as a UD case. For another example, the carrier includes one uplink subband and one downlink subband, and a frequency of the uplink subband is greater than a frequency of the downlink subband. This may be referred to as a DU case. It should be understood that the three examples are merely examples, and there are a plurality of other cases. Examples are not listed one by one herein in this application. For ease of description, in the DUD case, the first downlink subband and the second downlink subband may be referred to as a downlink subband or a DL subband, and the first uplink subband may be referred to as an uplink subband or a UL subband; in the UDU case, the two uplink subbands may be referred to as a first uplink subband and a second uplink subband, the first uplink subband and the second uplink subband may be referred to as an uplink subband or a UL subband, one downlink subband may be referred to as a first downlink subband, and the first downlink subband may be referred to as a downlink subband or a DL subband; and in the UD case and the DU case, the downlink subband may be referred to as a first downlink subband or a DL subband, and the uplink subband may be referred to as a first uplink subband or a UL subband.

In an embodiment, a principle of the UDU case is similar to a principle of the DUD case in FIG. 7 and FIG. 12, except that a solution principle of the downlink subband in FIG. 7 corresponds to an uplink subband in the UDU case, and a solution principle of the uplink subband in FIG. 12 corresponds to a downlink subband in the UDU case. The following briefly describes, by using an example shown in FIG. 13, a mute resource configured in the UDU case.

In the UDU case, the uplink subband includes the first uplink subband and the second uplink subband, and the downlink subband includes the first downlink subband. The first uplink subband, the first downlink subband, and the second uplink subband are consecutive frequency domain resources on a frequency domain resource corresponding to the carrier, a frequency of the first uplink subband is less than a frequency of the first downlink subband, and a frequency of the second uplink subband is greater than the frequency of the first downlink subband.

Figure 13:
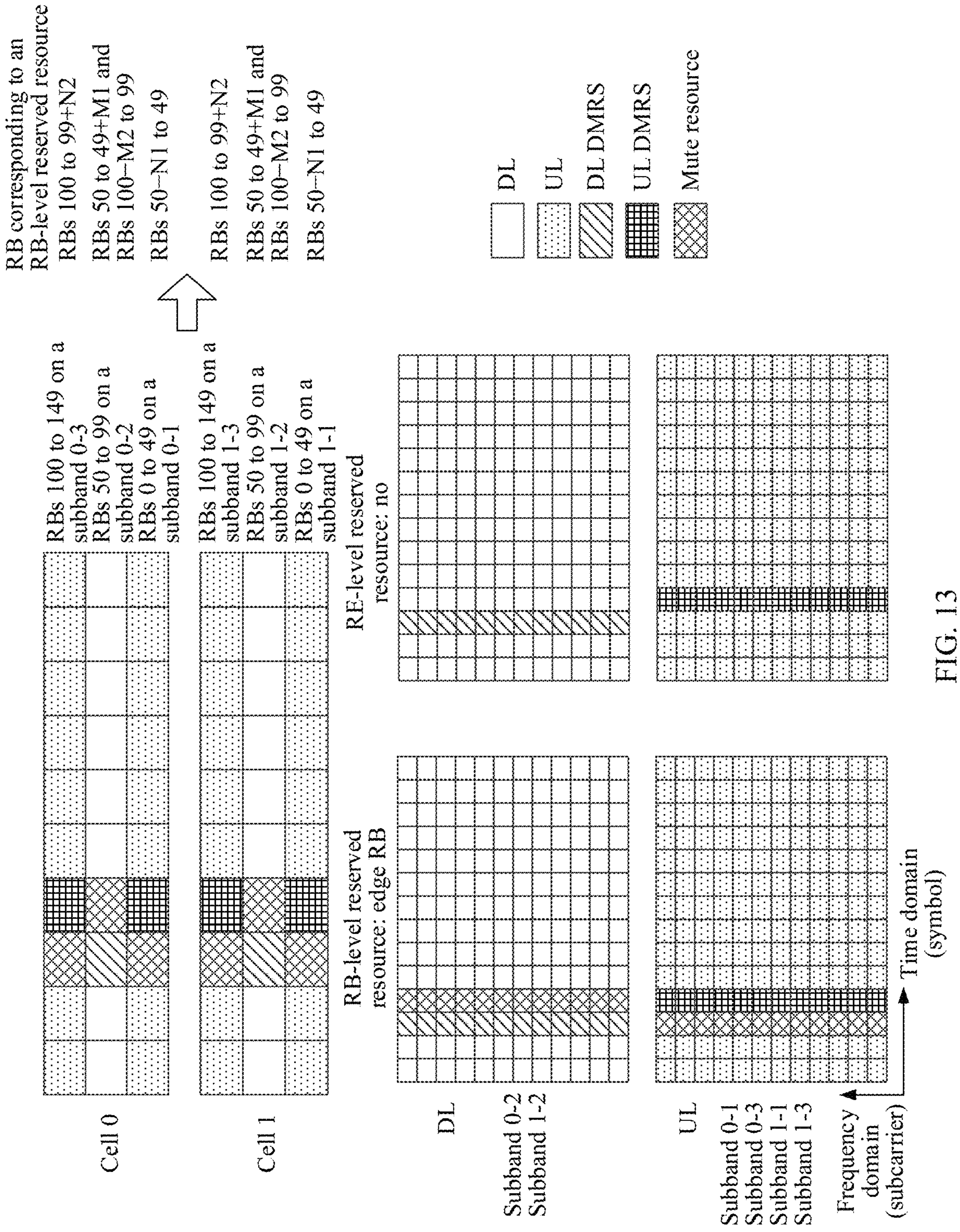
FIG. 13 is a diagram of another reserved resource according to this application.

For example, the cell 0 of the network device 0 and the cell 1 of the network device 1 are used as an example for description. As shown in FIG. 13, a downlink subband corresponding to the cell 0 is a subband 0-2, a first downlink subband corresponding to the cell 0 is a subband 0-1, a second downlink subband corresponding to the cell 0 is a subband 0-3, a first uplink subband corresponding to the cell 1 is a subband 1-2, a first downlink subband corresponding to the cell 1 is a subband 1-1, and a second downlink subband corresponding to the cell 1 is a subband 1-3.

For example, an example in which one carrier includes 150 RBs is used for description. Correspondingly, as shown in FIG. 13, the subband 0-1 includes RBs 0 to 49, the subband 0-2 includes RBs 50 to 99, and the subband 0-3 includes RBs 100 to 149. Similarly, the subband 1-1 includes RBs 0 to 49, the subband 1-2 includes RBs 50 to 99, and the subband 1-3 includes RBs 100 to 149. For the cell 0 of the network device 0, a reserved resource on the subband 0-1 may include N1 RBs whose end position is RB 49 on the subband 0-1, in other words, include RB 50-N1 to RB 49, in other words, RB 50-N1 to RB 49 are edge RBs on the subband 0-1; a reserved resource on the subband 0-3 may include N2 RBs whose start position is RB 100 on the subband 0-3, in other words, include RB 100 to RB 99+N2, in other words, RB 100 to RB 99+N2 are edge RBs on the subband 0-3; a reserved resource on the subband 0-2 may include M1 RBs whose start position is RB 50 on the subband 0-2, in other words, include RB 50 to RB 49+M1, in other words, RB 50 to RB 49+M1 are lower edge RBs on the subband 0-2; and a reserved resource on the subband 0-2 may include M2 RBs whose end position is RB 99 on the subband 0-2, in other words, include RB 100-M2 to RB 99, in other words, RB 100−M2 to RB 99 are upper edge RBs on the subband 0-2. Similarly, edge RBs on the subband 1-1 are RB 50−N1 to RB 49, edge RBs on the subband 1-3 are RB 100 to RB 99+N2, lower edge RBs on the subband 1-2 are RB 50 to RB 49+M1, and upper edge RBs on the subband 1-2 are RB 100−M2 to RB 99.

Further, as shown in FIG. 13, for each edge RB on an uplink subband, that is, the subband 0-1 and the subband 0-3, and the subband 1-1 and the subband 1-3, a subcarrier is determined in an RB-level resource reservation manner, without performing RE-level resource reservation. The downlink subband 0-2 and the subband 1-2 are similar.

Optionally, a position of the reserved resource on the uplink subband and a position of the reserved resource on the downlink subband may be shown in Table 3.

TABLE 3

| Downlink subband | Subcarrier position of a reserved resource | Uplink subband | Subcarrier position of a reserved resource |
|---|---|---|---|
| | Subcarriers 0 to 11 on M1 edge RBs and M2 edge RBs | | Subcarriers 0 to 11 on N1 edge RBs and N2 edge RBs |
| | No another RB is occupied | | No another RB is occupied |
| | Symbol position of the reserved resource | | Symbol position of the reserved resource |
| | Symbol position of a UL DMRS of a current cell and symbol position of a UL DMRS of an adjacent cell | | Symbol position of a DL DMRS of a current cell and symbol position of a DL DMRS of an adjacent cell |

The M1 edge RBs are the M1 RBs whose start position is the RB corresponding to the smallest RB sequence number on the first downlink subband. The M2 edge RBs are the M2 RBs whose end position is the RB corresponding to the largest RB sequence number on the first downlink subband.

The N1 edge RBs are the N1 RBs whose end position is the RB corresponding to the largest RB sequence number on the first uplink subband (namely, a low-frequency uplink subband). The N2 edge RBs are the N2 RBs whose start position is the resource block corresponding to the smallest RB sequence number on the second uplink subband (namely, a high-frequency uplink subband).

It should be noted that, for another RB on which no resource reservation is performed on a downlink subband and an uplink subband, resource reservation may be performed with reference to a discrete RB-level resource reservation method or an additional RE-level resource reservation method in downlink subband resource reservation and uplink subband resource reservation when both the cell 0 and the cell 1 are SBFD cells in the DUD case.

A method for determining the first time range and the second time range is similar to a method in the DUD case. Mutual references may be made. Details are not described herein again.

Specifically, based on the configuration of the reserved resource, a principle in which the network device indicates the reserved resource to the terminal device is similar to a principle of the methods shown in FIG. 7 and FIG. 12. Mutual references may be made. Details are not described herein again.

In an implementation, in the DU case and the UD case, a frequency domain position of a reserved resource on a downlink subband may be M1 RBs adjacent to an uplink subband, and a frequency domain position of a reserved resource on the uplink subband may be N1 RBs adjacent to the downlink subband. The downlink subband includes a first downlink subband, and the uplink subband includes a first uplink subband.

Figure 14:
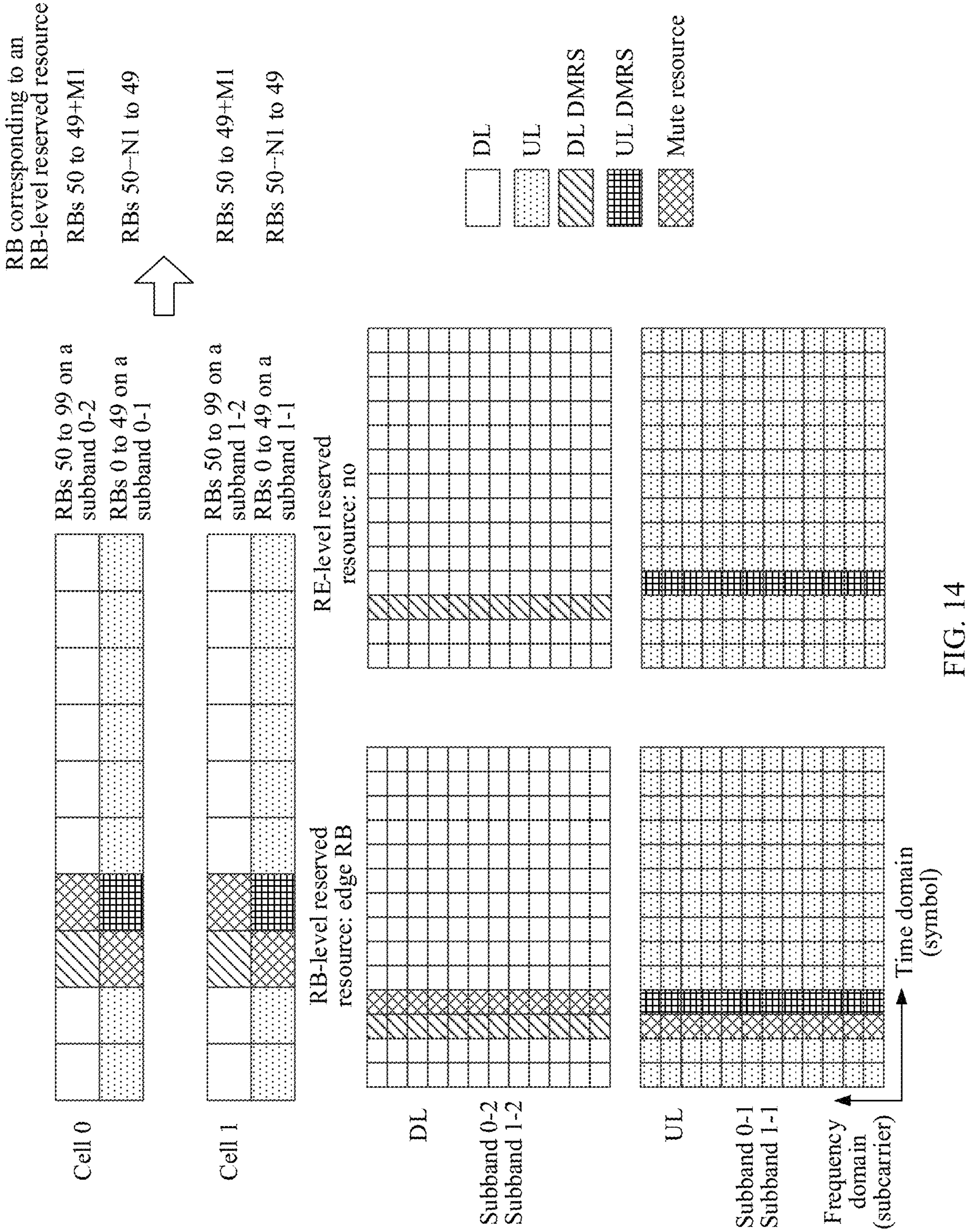
FIG. 14 is a diagram of another reserved resource according to this application.

For example, when a frequency of the downlink subband is greater than a frequency of the uplink subband, a diagram of the reserved resource on the uplink subband and the reserved resource on the downlink subband may be shown in FIG. 14.

The cell 0 of the network device 0 and the cell 1 of the network device 1 are used as an example for description. As shown in FIG. 14, a downlink subband corresponding to the cell 0 is the subband 0-2, a first downlink subband corresponding to the cell 0 is a subband 0-1, a first uplink subband corresponding to the cell 1 is a subband 1-2, a first downlink subband corresponding to the cell 1 is a subband 1-1.

An example in which one carrier includes 100 RBs is used for description. Correspondingly, as shown in FIG. 14, the subband 0-1 includes RBs 0 to 49, and the subband 0-2 includes RBs 50 to 99. Similarly, the subband 1-1 includes RBs 0 to 49, and the subband 1-2 includes RBs 50 to 99. For the cell 0 of the network device 0, a reserved resource on the subband 0-1 may include N1 RBs whose end position is RB 49 on the subband 0-1, in other words, include RB 50−N1 to RB 49, in other words, RB 50−N1 to RB 49 are edge RBs that are on the subband 0-1 and that are adjacent to the subband 0-2; and a reserved resource on the subband 0-2 may include M1 RBs whose start position is RB 50 on the subband 0-2, in other words, include RB 50 to RB 49+M1, in other words, RB 50 to RB 49+M1 are edge RBs that are on the subband 0-2 and that are adjacent to the subband 0-1. Similarly, edge RBs on the subband 1-1 are RB 50−N1 to RB 49, and edge RBs on the subband 1-2 are RB 50 to RB 49+M1.

Further, as shown in FIG. 14, for each edge RB on an uplink subband, that is, the subband 0-1 and the subband 1-1, a subcarrier is determined in an RB-level resource reservation manner, without performing RE-level resource reservation. The downlink subband 0-2 and the subband 1-2 are similar.

Optionally, a position of the reserved resource on the uplink subband and a position of the reserved resource on the downlink subband may be shown in Table 4.

TABLE 4

| Downlink subband | Subcarrier position of a reserved resource | Uplink subband | Subcarrier position of a reserved resource |
|---|---|---|---|
| | Subcarriers 0 to 11 on M1 edge RBs adjacent to an uplink subband | | Subcarriers 0 to 11 on N1 edge RBs adjacent to a downlink subband |
| | No another RB is occupied | | No another RB is occupied |
| | Symbol position of the reserved resource | | Symbol position of the reserved resource |
| | Symbol position of a UL DMRS of a current cell and symbol position of a UL DMRS of an adjacent cell | | Symbol position of a DL DMRS of a current cell and symbol position of a DL DMRS of an adjacent cell |

The M1 edge RBs are the M1 RBs whose start position is the RB corresponding to the smallest RB sequence number on the first downlink subband.

The N1 edge RBs are the N1 RBs whose end position is the RB corresponding to the largest RB sequence number on the first uplink subband.

It should be noted that, for another RB on which no resource reservation is performed on a downlink subband and an uplink subband, resource reservation may be performed with reference to a discrete RB-level resource reservation method or an additional RE-level resource reservation method in downlink subband resource reservation and uplink subband resource reservation when both the cell 0 and the cell 1 are SBFD cells in the DUD case.

A method for determining the first time range and the second time range is similar to a method in the DUD case. Mutual references may be made. Details are not described herein again.

Specifically, based on the configuration of the reserved resource, a principle in which the network device indicates the reserved resource to the terminal device is similar to a principle of the methods shown in FIG. 7 and FIG. 12. Mutual references may be made. Details are not described herein again.

Figure 15:
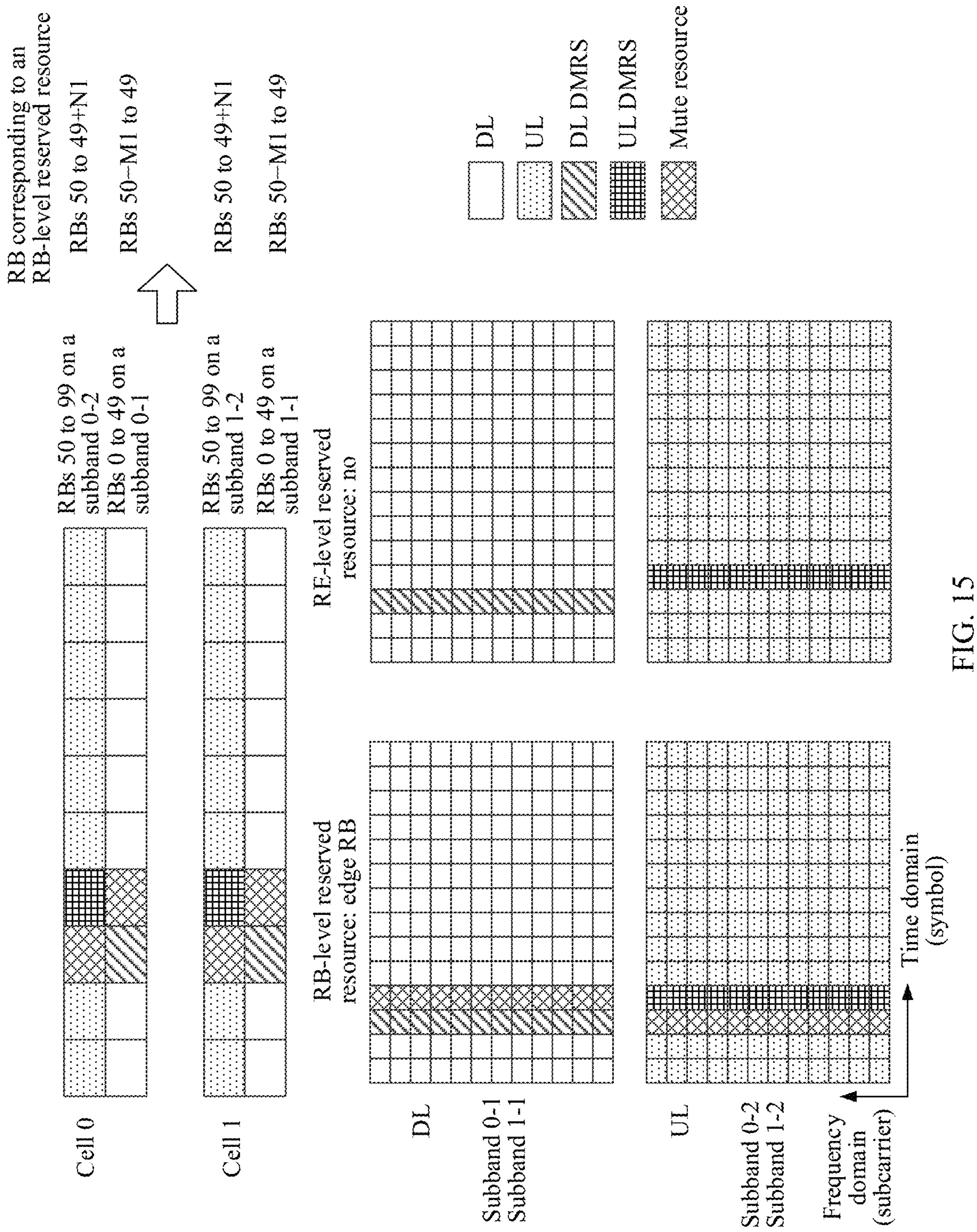
FIG. 15 is a diagram of another reserved resource according to this application.

For another example, when a frequency of the downlink subband is less than a frequency of the uplink subband, a diagram of the reserved resource on the uplink subband and the reserved resource on the downlink subband may be shown in FIG. 15.

The cell 0 of the network device 0 and the cell 1 of the network device 1 are used as an example for description. As shown in FIG. 15, a downlink subband corresponding to the cell 0 is the subband 0-1, a first downlink subband corresponding to the cell 0 is a subband 0-2, a first uplink subband corresponding to the cell 1 is a subband 1-1, a first downlink subband corresponding to the cell 1 is a subband 1-2.

An example in which one carrier includes 100 RBs is used for description.

Correspondingly, as shown in FIG. 15, the subband 0-1 includes RBs 0 to 49, and the subband 0-2 includes RBs 50 to 99. Similarly, the subband 1-1 includes RBs 0 to 49, and the subband 1-2 includes RBs 50 to 99. For the cell 0 of the network device 0, a reserved resource on the subband 0-1 may include M1 RBs whose end position is RB 49 on the subband 0-1, in other words, include RB 50−M1 to RB 49, in other words, RB 50−M1 to RB 49 are edge RBs that are on the subband 0-1 and that are adjacent to the subband 0-2; and a reserved resource on the subband 0-2 may include N1 RBs whose start position is RB 50 on the subband 0-2, in other words, include RB 50 to RB 49+N1, in other words, RB 50 to RB 49+N1 are edge RBs that are on the subband 0-2 and that are adjacent to the subband 0-1. Similarly, edge RBs on the subband 1-1 are RB 50−M1 to RB 49, and edge RBs on the subband 1-2 are RB 50 to RB 49+N1.

Further, as shown in FIG. 15, for each edge RB on a downlink subband, that is, the subband 0-1 and the subband 1-1, a subcarrier is determined in an RB-level resource reservation manner, without performing RE-level resource reservation. The uplink subband 0-2 and the subband 1-2 are similar.

Optionally, a position of the reserved resource on the uplink subband and a position of the reserved resource on the downlink subband may be shown in Table 5.

TABLE 5

| Downlink subband | Subcarrier position of a reserved resource | Uplink subband | Subcarrier position of a reserved resource |
|---|---|---|---|
| | Subcarriers 0 to 11 on M1 edge RBs adjacent to an uplink subband | | Subcarriers 0 to 11 on N1 edge RBs adjacent to a downlink subband |
| | No another RB is occupied | | No another RB is occupied |
| | Symbol position of the reserved resource | | Symbol position of the reserved resource |
| | Symbol position of a UL DMRS of a current cell and symbol position of a UL DMRS of an adjacent cell | | Symbol position of a DL DMRS of a current cell and symbol position of a DL DMRS of an adjacent cell |

The M1 edge RBs are the M1 RBs whose end position is the RB corresponding to the largest RB sequence number on the first downlink subband.

The N1 edge RBs are the N1 RBs whose start position is the RB corresponding to the smallest RB sequence number on the first uplink subband.

It should be noted that, for another RB on which no resource reservation is performed on a downlink subband and an uplink subband, resource reservation may be performed with reference to a discrete RB-level resource reservation method or an additional RE-level resource reservation method in downlink subband resource reservation and uplink subband resource reservation when both the cell 0 and the cell 1 are SBFD cells in the DUD case.

A method for determining the first time range and the second time range is similar to a method in the DUD case. Mutual references may be made. Details are not described herein again.

Specifically, based on the configuration of the reserved resource, a principle in which the network device indicates the reserved resource to the terminal device is similar to a principle of the methods shown in FIG. 7 and FIG. 12. Mutual references may be made. Details are not described herein again.

It should be understood that the listed cases are merely examples, and are not intended to limit this application.

It should be noted that a scenario in which SBFD is performed for all network devices in a communication system is shown the foregoing embodiment. The following describes in detail a configuration of a reserved resource in another scenario, namely, a scenario in which SBFD is performed for some network devices, and legacy TDD is performed for some network devices in the communication system.

In this scenario, a cell carrier corresponding to a network device on which SBFD is performed may be divided into three subbands (DUD and UDU), or two subbands (DU and UD), or another case exists. A cell carrier corresponding to a network device on which legacy TDD is performed may be divided into a plurality of subbands in frequency domain in a division manner the same as that of the SBFD cell. Specifically, the reserved resource may include RB-level reservation and RE-level reservation.

In one slot, for the SBFD cell, a subband that is codirectional with a legacy TDD cell is denoted as a subband i, a subband that is contradirectional with the subband i in the SBFD cell is denoted as a subband j, the contradirectional subband is a subband with a different transmission direction, and the codirectional subband is a subband with a same transmission direction.

Optionally, when the subband i and the subband j meet a constraint condition B1 in one slot, the subband i and the subband j are contradirectional subbands. The constraint condition B1 is a subset of a constraint condition B, and the constraint condition B may be at least one of the following:

a symbol category of at least one symbol in symbols included in the slot on the subband i is “DL”, and a symbol category on the subband j is “UL”; or a symbol category of at least one symbol in symbols included in the slot on the subband i is “DL”, and a symbol category on the subband j is “F”; or a symbol category of at least one symbol in symbols included in the slot on the subband i is “UL”, and a symbol category on the subband j is “DL”; or a symbol category of at least one symbol in symbols included in the slot on the subband i is “UL”, and a symbol category on the subband j is “F”; or a symbol category of at least one symbol in symbols included in the slot on the subband i is “F”, and a symbol category on the subband j is “UL”; or a symbol category of at least one symbol in symbols included in the slot on the subband i is "F", and a symbol category on the subband j is "DL"; or a symbol category of at least one symbol in symbols included in the slot on the subband i is "F", and a symbol category on the subband j is "F".

When the subband i and the subband j do not meet the constraint condition B1, the subband i and the subband j are codirectional subbands. It may be understood that, in one slot in legacy TDD, a category of one symbol remains the same on the entire CC. For determining that the subband i and the CC in legacy TDD are codirectional, refer to a determining criterion of the subband i and the subband j.

When resource reservation is performed in a slot, a resource reservation manner in the slot may be as follows:

An RB-level reservation manner may be as follows:

mi,j consecutive RBs that are on the subband i and that are adjacent to the contradirectional subband j are reserved;

nj,i consecutive RBs that are on the subband j and that are adjacent to the contradirectional subband i are reserved;

a symbol on which a reserved time-frequency resource on the subband i is located is a symbol on which a DMRS of an adjacent SBFD cell and a current cell on the subband j in a time unit is located; and a symbol on which a reserved time-frequency resource on the subband j is located is a symbol on which a DMRS of an adjacent legacy TDD cell in the time unit is located.

An RE-level reservation manner may be as follows:

an RB on which a reserved resource is located is an RB on which RB-level reservation is not performed on the subband j;

a subcarrier on which the reserved resource is located is a subcarrier on which a DMRS of an adjacent legacy TDD cell in a time unit is located; and a symbol on which a reserved resource is located is a symbol on which a DMRS of an adjacent legacy TDD cell in the time unit is located.

In a slot, for a legacy TDD cell, a subband that is codirectional with a subband in an SBFD cell is a subband x, and a subband that is contradirectional with the subband in the SBFD cell is a subband y. When resource reservation is performed in a slot, a resource reservation manner in the slot may be as follows:

An RB-level reservation manner may be as follows:

consecutive mx,y RBs that are on the subband x and that are adjacent to the subband y are reserved; and a symbol on which a reserved time-frequency resource on the subband x is located is a symbol on which a DMRS of an adjacent SBFD cell on the subband y in a time unit is located.

An RE-level reservation manner may be as follows:

an RB on which a reserved resource is located is an RB on which the subband y is located;

a subcarrier on which a reserved resource is located is a subcarrier on which a DMRS of an adjacent SBFD cell on the subband y in a time unit is located; and a symbol on which a reserved resource is located is a symbol on which a DMRS of an adjacent SBFD cell on the subband y in the time unit is located.

The following provides descriptions by using an example in which SBFD is performed for the network device 0, legacy TDD is performed for the network device 1, the network device 0 corresponds to an SBFD cell 0, and the network device 1 corresponds to a legacy TDD cell 1.

Figure 16:
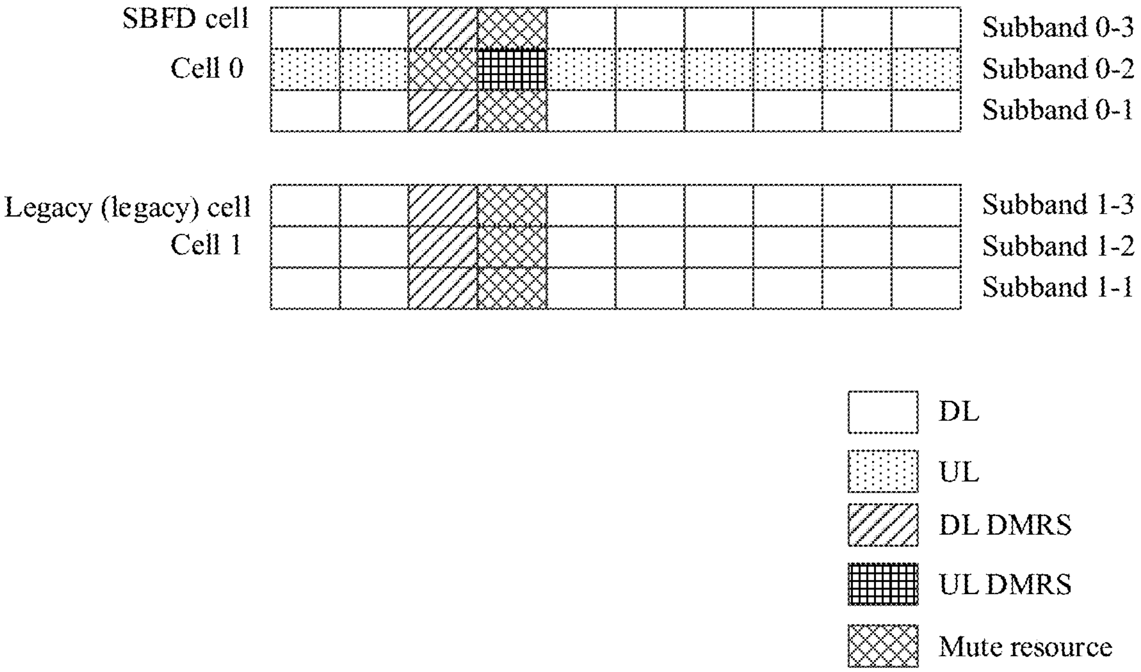
FIG. 16 is a diagram of a subband obtained through carrier division according to this application.
Figure 17:
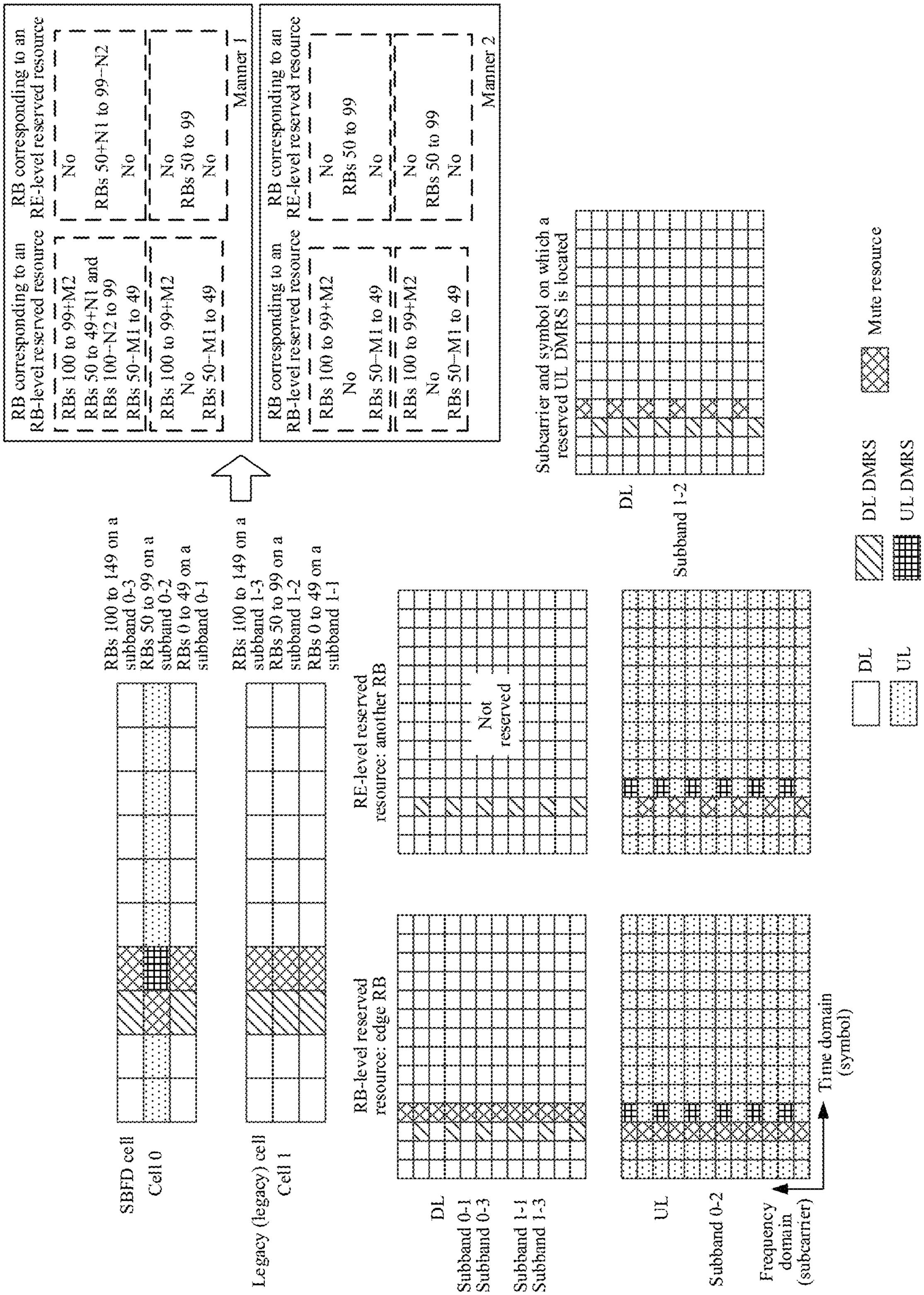
FIG. 17 is a diagram of another reserved resource according to this application.

In an embodiment, a subband obtained through carrier division of the cell 0 may be shown in FIG. 16. Specifically, the cell 0 corresponds to a low-frequency downlink subband 0-1, an uplink subband 0-2, and a high-frequency downlink subband 0-3. According to a subband division manner of the cell 0, the cell 1 may be divided into the subband 1-1, the subband 1-2, and the subband 1-3. The subband 1-1 and the subband 1-3 are codirectional with the subband 0-1 and the subband 0-3, and the subband 1-2 and the subband 0-2 are contradirectional. That is, the subband 1-1, the subband 1-2, and the subband 1-3 are all downlink subbands. As shown in FIG. 17, an example in which one carrier includes 150 RBs is used for description. Specifically, as shown in FIG. 17, the subband 0-1 includes RBs 0 to 49, the subband 0-2 includes RBs 50 to 99, and the subband 0-3 includes RBs 100 to 149. Similarly, the subband 1-1 includes RBs 0 to 49, the subband 1-2 includes RBs 50 to 99, and the subband 1-3 includes RBs 100 to 149. Resource reservation when the SBFD cell and the legacy TDD cell coexist in the DUD case is described in this embodiment. When resource reservation is performed in a slot, a resource reservation manner in the slot may be as follows:

A resource reservation manner 1 may be as follows:

Interference of the DL subband 0-1, the DL subband 0-3, the DL subband 1-1, and the DL subband 1-3 to a subband 0-2 of an adjacent cell and a current cell is adjacent-channel interference (cell-cell CLI and SI). RB-level resource reservation is performed for an edge RB, to reduce impact of adjacent-channel interference. A specific position of the reserved resource may be as follows:

A frequency domain position is as follows: Reserved RBs on the subband 0-1 and the subband 1-1 are RB 50−M1 to RB 49, and reserved RBs on the subband 0-3 and the subband 1-3 are RB 100 to RB 99+M2.

A time domain position is a symbol on which a UL DMRS (if the UL DMRS exists) of the adjacent cell and the current cell is located.

Optionally, M1 may be equal to M2.

The UL subband 0-2 exerts adjacent-channel interference (UE-UE CLI) to the subband 0-1, the subband 0-3, the subband 1-1, and the subband 1-3 of the current cell and the adjacent cell. RB-level resource reservation is performed for an edge RB, to reduce impact of adjacent-channel UE-UE CLI. A specific position of the reserved resource may be as follows:

A frequency domain position is RB 50 to RB 49+N1 and RB 100−N2 to RB 99.

A time domain position is a symbol on which a DL DMRS of the adjacent cell and the current cell is located.

Optionally, N1 may be equal to N2.

In a possible manner, M1 and M2 are equal to N1 and N2.

The UL subband 0-2 exerts co-channel UE-UE CLI to the subband 1-2 of an adjacent legacy TDD cell. RE-level reservation can be performed, to reduce impact of co-channel CLI. A specific position of the reserved resource may be as follows:

A frequency domain position of an RB is RB 50+N1 to RB 99−N2, and a frequency domain position of a subcarrier on which a reserved RE on the RB is located is a subcarrier on which a DL DMRS of a subband 1-2 of the legacy TDD cell is located.

A time domain position is a symbol on which a DL DMRS of a subband 1-2 of the adjacent legacy TDD cell is located.

The DL subband 1-2 leads co-channel interference to the adjacent SBFD cell. RE-level reservation can be performed, to reduce impact of co-channel UE-UE CLI. A specific position of the reserved resource may be as follows:

A frequency domain position of an RB is RB 50 to RB 99, and a subcarrier on which a reserved RE on the RB is located is a subcarrier on which a UL DMRS of a subband 0-2 of the adjacent SBFD cell is located.

A time domain position is a symbol on which a UL DMRS of a subband 0-2 of the adjacent SBFD cell is located.

Optionally, a subcarrier on which a DL DMRS of the legacy TDD cell is located remains the same on the subband 1-1, the subband 1-2, and the subband 1-3, and a symbol on which the DL DMRS of the legacy TDD cell is located remains the same on the subband 1-1, the subband 1-2, and the subband 1-3.

For a position of a reserved resource on each subband, refer to FIG. 17.

For example, a position at which the reserved resource on each subband is located may be shown in Table 6.

TABLE 6

| DL subband 1-2 | Subcarrier position of a reserved resource | DL subband 0-1, DL subband 0-3, DL subband 1-1, and DL subband 1-3 | Subcarrier position of a reserved resource | UL subband 0-2 | Subcarrier position of an RE of a reserved resource |
|---|---|---|---|---|---|
| | Subcarrier of a UL DMRS of an adjacent SBFD cell on all RBs | | Subcarriers 0 to 11 on M1 edge RBs and M2 edge RBs<br>No another RB is occupied | | Subcarriers 0 to 11 on N1 edge RBs and N2 edge RBs (RB-level reservation)<br>Subcarrier of a DL DMRS of a subband 1-2 on another RB (RE-level reservation) |
| | Symbol position of an RE of the reserved resource | | Symbol position of an RE of the reserved resource | | Symbol position of an RE of the reserved resource |
| | Symbol position of the UL DMRS of the adjacent SBFD cell | | Symbol position of a UL DMRS (if the UL DMRS exists) of an adjacent cell and a current cell | | Symbol position of the DL DMRS of the subband 1-2 |

The M1 edge RBs are M1 RBs whose end position is an RB corresponding to a largest RB sequence number on the DL subband 0-1 and the DL subband 1-1. The M2 edge RBs are M2 RBs whose start position is an RB corresponding to a smallest RB sequence number on the DL subband 0-3 and the DL subband 1-3.

The N1 edge RBs are N1 RBs whose start position is an RB corresponding to a smallest RB sequence number on the UL subband 0-2. The N2 edge RBs are N2 RBs whose end position is an RB corresponding to a largest RB sequence number on the UL subband 0-2.

Another resource reservation manner 2 may be as follows:

RE-level reservation is performed for the subband 0-2, and a position of a reserved resource may be as follows:

A frequency domain position of an RB is RB 50 to RB 99, and a subcarrier on which a reserved RE on the RB is located is a subcarrier on which a DL DMRS of a subband 1-2 of the adjacent legacy TDD cell is located.

A time domain position is a symbol on which a DL DMRS of a subband 1-2 of the adjacent legacy TDD cell is located.

A resource reservation method for another subband is the same as a method in the resource reservation manner 1. Details are not described herein again.

Figure 18:
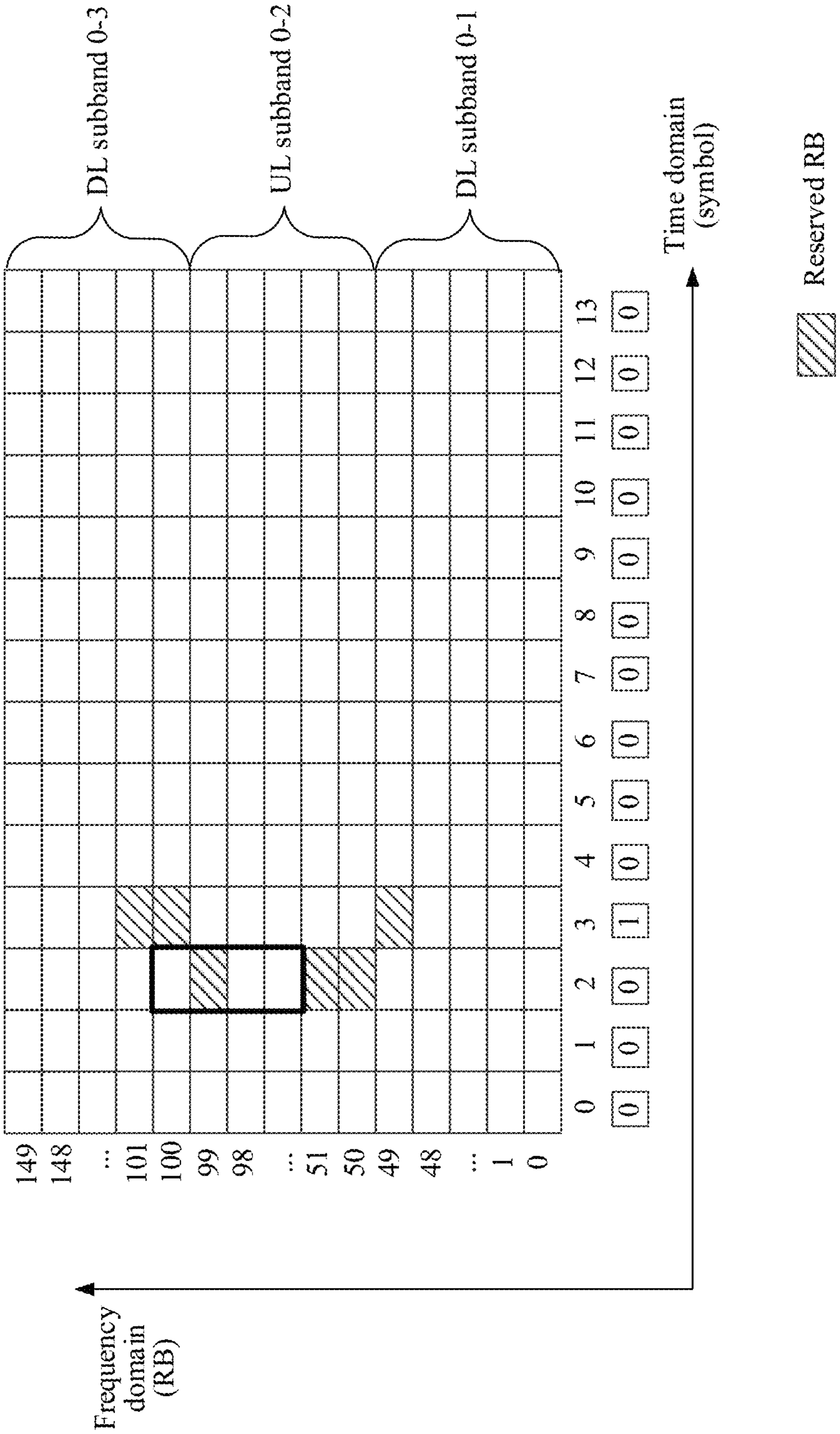
FIG. 18 is a diagram of an RB range indication according to this application.

Another resource reservation manner 3 may be as follows:

In the resource reservation manner 1, M1, M2, N1, and N2 are all 50. In this case, RBs occupied by reserved resources on the subband 0-1, the subband 0-2, the subband 0-3, the subband 1-1, and the subband 1-3 are all RBs on the corresponding subbands. It may be understood that, in this case, RE-level resource reservation does not need to be performed for the subband 0-2. Another resource reservation method is the same as a method in the resource reservation manner 1. Details are not described herein again. A manner in which the network device 0 indicates an RE-level reserved resource on the subband 0-2 to the terminal device may be as follows:

A manner for an RB on which a reserved resource is located is as follows:

A method is as follows: The network device 0 indicates a range to the terminal device. The range is greater than or equal to a range of an RB on which the reserved resource is located. For example, a start RB number and a quantity of RBs are indicated. The start RB number is an integer multiple of 4, for example, 0, 4, or 8; and a minimum value of the quantity of RBs is not less than min{24, $N_0$}, and the quantity of RBs is an integer multiple of 4. Herein, $N_0$ is a quantity of RBs included on the UL subband 0-2, and min{a, b} indicates to obtain a smaller value in the variable a and the variable b. If the indicated range overlaps RB-level reservation, an overlapped part is considered as RB-level resource reservation. If the indicated range goes beyond RB-level resource reservation, it indicates to perform no processing. For example, in FIG. 18, the indicated range is {52, 48}, and it indicates that the start RB number is 52, and the quantity of RBs is 48. In this case, RB 99 overlaps RB 99 of RB-level resource reservation on the UL subband 0-2, the RB 99 is processed based on RB-level resource reservation, and RB 100 goes beyond UL subband resource reservation, and is not processed.

Another method is as follows: The network device 0 indicates two pieces of information in a start RB number, a quantity of RBs, and an end RB number to the terminal device. The start RB number, the quantity of RBs, and the end RB number are integers.

Another method is as follows: When a parameter indicating the RB on which the reserved resource is located is default, it indicates that the RB on which the reserved resource is located is an RB on which a UL subband is located.

Another method is as follows: One bit indicates whether interference measurement of RB-level resource reservation is associated. If interference measurement of RB-level resource reservation is associated, RE-level reservation is performed for an RB that is not reserved on the UL subband.

A manner in which the network device 1 indicates the reserved resource on the subband 1-2 to the terminal device is similar to a manner in which the network device 0 indicates the RE-level reserved resource on the subband 0 to the terminal device. Mutual references may be made.

In an optional implementation, the network device 0 and the network device 1 may further indicate, to the terminal device in the following manner, a subcarrier occupied by the reserved resource on the RB:

A subcarrier indication manner may be indicating a subcarrier position in an enumeration manner.

For example, if it indicates that subcarriers are {s1, s3, s5, s7, s9, s11}, it indicates that subcarriers {1, 3, 5, 7, 9, 11} are reserved.

Another subcarrier indication manner may be indicating a start subcarrier number, a quantity of consecutive subcarriers, and a quantity of spacing subcarriers.

Optionally, the start subcarrier number is 0 by default, the quantity of consecutive subcarriers is 1 by default, and the quantity of spacing subcarriers is 2 by default; or the start subcarrier number is 1 by default, the quantity of consecutive subcarriers is 1 by default, and the quantity of spacing subcarriers is 2 by default; or the start subcarrier number is 0 by default, the quantity of consecutive subcarriers is 2 by default, and the quantity of spacing subcarriers is 6 by default; or the start subcarrier number is 2 by default, the quantity of consecutive subcarriers is 2 by default, and the quantity of spacing subcarriers is 6 by default; or the start subcarrier number is 4 by default, the quantity of consecutive subcarriers is 2 by default, and the quantity of spacing subcarriers is 6 by default.

For example, the start subcarrier number {1}, the quantity {1} of consecutive subcarriers, and the quantity {2} of spacing subcarriers indicate that the start subcarrier number is 1, there is one consecutive subcarrier, and a spacing between a current subcarrier and a next reserved subcarrier is two subcarriers. That is, subcarriers {1, 3, 5, 7, 9, 11} are reserved.

Optionally, when the quantity of consecutive subcarriers and the quantity of spacing subcarriers are default, a default value may be used.

Another subcarrier indication manner may be: A 12-bit (bit) bitmap (bitmap) indicates a reserved subcarrier in 12 subcarriers.

For example, a 12-bit bitmap {010101010101} is used for an indication. Herein, 1 indicates that a corresponding subcarrier is reserved.

Figure 19:
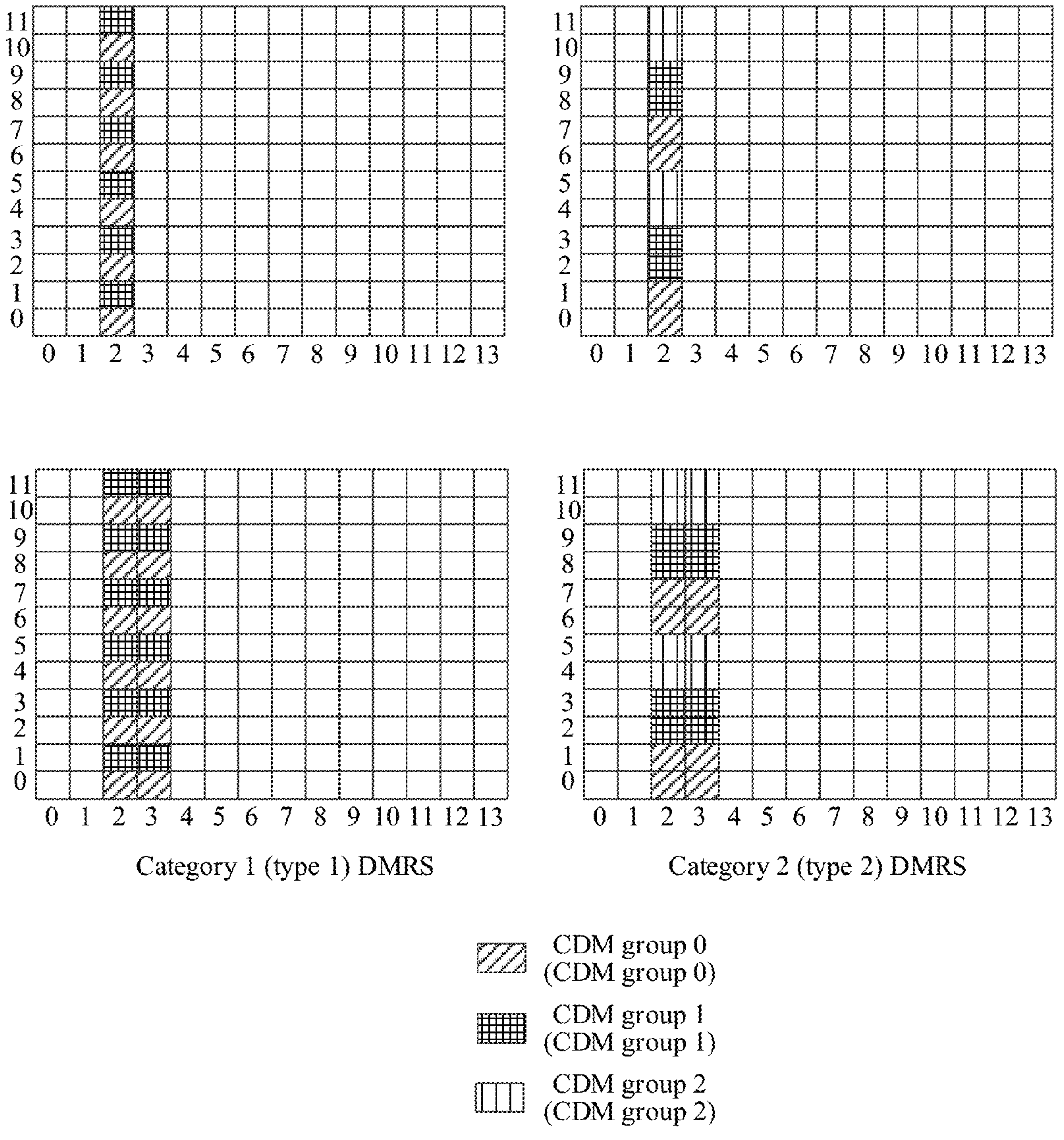
FIG. 19 is a diagram of subcarriers corresponding to different categories and different CDM groups according to this application.

Another subcarrier indication manner may be performing an indication based on a DMRS category (or referred to as a DMRS type) or a code division multiplexing (code domain multiplexing, CDM) group (group) identifier (identifier, ID). The DMRS category may be divided into a category 1 (or a type 1) (type 1) and a category 2 (or a type 2) (type 2). A symbol length of a DMRS may be determined based on a parameter configured at a higher layer, and a subcarrier position at which the DMRS is located may be determined based on the DMRS category and the CDM group ID. In a diagram of subcarriers corresponding to different categories and CDM groups shown in FIG. 19, subcarriers on which a CDM group 0 of the type 1 is located are {0, 2, 4, 6, 8, 10}, subcarriers on which a CDM group 1 of the type 1 is located are {1, 3, 5, 7, 9, 11}, subcarriers on which a CDM group 0 of the type 2 is located are {0, 1, 6, 7}, subcarriers on which a CDM group 1 of the type 2 is located are {2, 3, 8, 9}, and subcarriers on which a CDM group 2 of the type 2 is located are {4, 5, 10, 11}.

Optionally, if the DMRS category is default, the default DMRS category is one of the type 1 and the type 2.

The CDM group ID is default. A default CDM group in which resource reservation is located is one of {0}, {1}, {2}, {0, 1}, {0, 2}, {1, 2}, and {0, 1, 2}.

For example, when indicated information includes a DMRS category {type 1} and the CDM group {1}, it indicates that a CDM group 1 of the DMRS category, namely, the type 1 is reserved. In other words, subcarriers {1, 3, 5, 7, 9, 11} are reserved. Optionally, the DMRS category is default, and is a default value.

Optionally, an indication manner of a subcarrier and a symbol on which a reserved resource is located may be as follows: For a UL subband 0-2 of the SBFD cell, a subcarrier and a symbol on which a reserved RE on an RB is located are a subcarrier and a symbol on which a DL DMRS of a current cell is located; and for a DL subband 1-2 of the legacy cell, a subcarrier and a symbol on which a reserved RE on an RB is located are a subcarrier and a symbol on which a UL DMRS of a current cell is located. An indication may be performed by using a flag bit (flag) or a parameter.

A manner of indicating the symbol on which the reserved resource is located may be as follows: A 14-bit (bit) bitmap (bitmap) indicates a reserved symbol in 14 symbols. For example, a 14-bit bitmap {00110000000000} is used for an indication. Herein, 1 indicates that a corresponding symbol is reserved.

A manner in which the network device 1 indicates, to the terminal device, a subcarrier on which the reserved resource on the subband 1-2 is located is similar to a manner in which the network device 0 indicates, to the terminal device, a subcarrier on which the RE-level reserved resource on the subband 0-2 is located. Mutual references may be made. For a manner in which the network device 0 indicates, to the terminal device, a symbol on which the reserved resource of the RE on the subband 0-2 is located and a manner in which the network device 1 indicates, to the terminal device, a symbol on which the reserved resource on the subband 1-2 is located, refer to the methods in the embodiments shown in FIG. 7 and FIG. 12. Mutual references may be made.

Optionally, first time ranges and second time ranges (including RB-level resource reservation and RE-level resource reservation) of the subband 0-1, the subband 0-2, the subband 0-3, the subband 1-1, the subband 1-2, and the subband 1-3 are the same.

Optionally, a symbol type of some or all symbols in a slot in the first time range on a first downlink subband (for example, the subband 0-1) in the SBFD cell is "downlink", a symbol type of some or all symbols in the slot in the first time range on a second downlink subband (for example, the subband 0-3) in the SBFD cell is "downlink", and a symbol type of some or all symbols in the slot in the first time range on a first uplink subband (for example, the subband 0 to 2) in the SBFD cell is "uplink".

In an example, in the SBFD cell, a time period in which a symbol type of the first downlink subband is "downlink" is the same as a time period in which a symbol type of the second downlink subband is "downlink" in the first time range.

Optionally, in the SBFD cell, single-periodicity or dual-periodicity duration of an RRC slot format configuration is T, T includes N slots, and the first time range is some or all slots in the N slots.

Optionally, single-periodicity or dual-periodicity duration of RRC slot format configurations of the SBFD cell and the legacy TDD cell is the same.

Optionally, when a slot in the second time range meets a constraint condition A1, the slot belongs to the first time range. The constraint condition A1 is a subset of a constraint condition A, and the constraint condition A may be at least one of the following:

a symbol category of at least one symbol in symbols included in the slot on the downlink subband of the SBFD cell is "DL", and a symbol category on the uplink subband of the SBFD cell is "UL"; or a symbol category of at least one symbol in symbols included in the slot on the downlink subband of the SBFD cell is "DL", and a symbol category on the uplink subband of the SBFD cell is "F"; or a symbol category of at least one symbol in symbols included in the slot on the downlink subband of the SBFD cell is "F", and a symbol category on the uplink subband of the SBFD cell is "UL"; or a symbol category of at least one symbol in symbols included in the slot on the downlink subband of the SBFD cell is "F", and a symbol category on the uplink subband of the SBFD cell is "F".

Optionally, in a slot in the second time range, when the subband v and a CC of the subband w or legacy TDD meet the constraint condition B1, the slot belongs to the first time range. The subband v is a subband in the SBFD cell, and the subband w is a subband in subbands in the SBFD cell other than the subband v. The constraint condition B1 is a subset of a constraint condition B, and the constraint condition B may be at least one of the following:

a symbol category of at least one symbol in symbols included in the slot on the subband v is "DL", and a symbol category of the CC of the subband w or legacy TDD is "UL"; or a symbol category of at least one symbol in symbols included in the slot on the subband v is "DL", and a symbol category of the CC of the subband w or legacy TDD is "F"; or a symbol category of at least one symbol in symbols included in the slot on the subband v is "UL", and a symbol category of the CC of the subband w or legacy TDD is "DL"; or a symbol category of at least one symbol in symbols included in the slot on the subband v is "UL", and a symbol category of the CC of the subband w or legacy TDD is "F"; or a symbol category of at least one symbol in symbols included in the slot on the subband v is "F", and a symbol category of the CC of the subband w or legacy TDD is "UL"; or a symbol category of at least one symbol in symbols included in the slot on the subband v is "F", and a symbol category of the CC of the subband w or legacy TDD is "DL"; or a symbol category of at least one symbol in symbols included in the slot on the subband v is "F", and a symbol category on the subband w is "F".

For a method in which the network device 0 and the network device 1 indicate the first time range and the second time range to the terminal device may be similar to the indication method in FIG. 7 and FIG. 12. Mutual references may be made.

It should be noted that, for another RB on which no resource reservation is performed on a downlink subband, resource reservation may be performed in a discrete RB-level resource reservation method or an additional RE-level resource reservation method in downlink subband resource reservation when both the cell 0 and the cell 1 are SBFD cells in the DUD case.

Based on the configured reserved resource, for a manner in which the network device 0 indicates the reserved resource on the subband 0-1 and the subband 0-3 to the terminal device, a manner in which the network device 0 indicates the RB-level reserved resource on the subband 0-2 to the terminal device, and a manner in which the network device 1 indicates the reserved resource on the subband 1-1 and the subband 1-3 to the terminal device, refer to the methods in the embodiments shown in FIG. 7 and FIG. 12.

In a possible case, in a subband division scenario shown in FIG. 16, when both co-channel interference and adjacent-channel interference exist, some resources may not need to be reserved in consideration of a value of interference strength.

Interference exerted by the DL subband 0-1 and the DL subband 0-3 to the subband 0-2 in the adjacent cell and the current cell is adjacent-channel interference (A1 is adjacent-channel cell-cell CLI, and B is self-interference); interference exerted by the DL subband 1-1 and the DL subband 1-3 to the subband 0-2 in the adjacent cell is adjacent-channel interference (A2 is adjacent-channel cell-cell CLI); and interference exerted by the DL subband 1-2 to the subband 0-2 is co-channel interference (C is co-channel cell-cell CLI).

If A1+B+A2 is far less than C, interference exerted by adjacent-channel CLI and adjacent-channel SI is less than co-channel CLI, and no resource needs to be reserved for the subband 1-1, the subband 1-3, the subband 0-1, and the subband 0-3. That is, M1=0 and M2=0 in FIG. 17.

Figure 20:
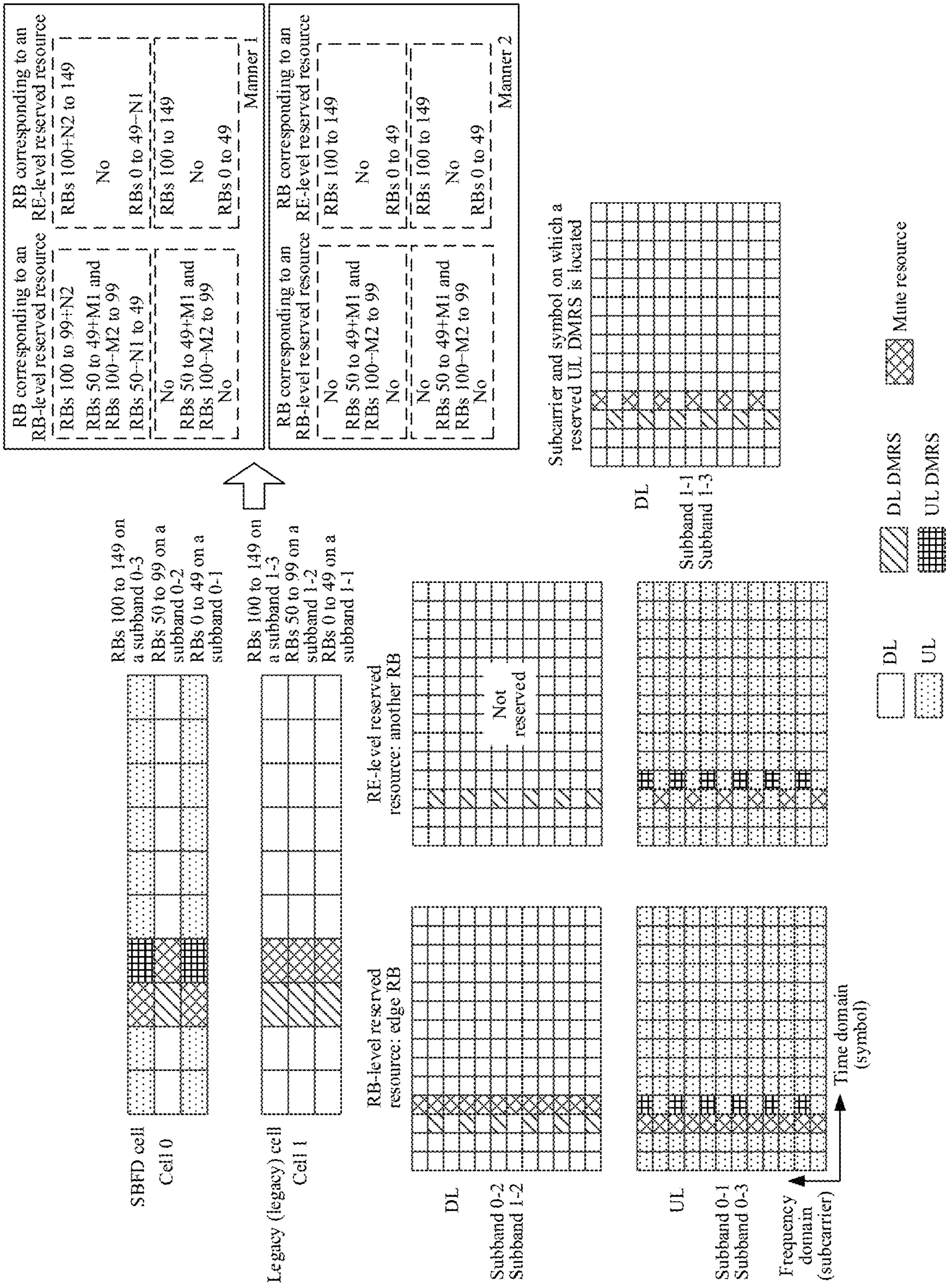
FIG. 20 is a diagram of another reserved resource according to this application.

In another embodiment, a subband obtained through carrier division of the cell 0 may be shown in FIG. 20. Specifically, the cell 0 corresponds to a low-frequency uplink subband 0-1, a downlink subband 0-2, and a high-frequency uplink subband 0-3. According to a subband division manner of the cell 0, the cell 1 may be divided into the subband 1-1, the subband 1-2, and the subband 1-3. The subband 1-1 and the subband 1-3 are contradirectional with the subband 0-1 and the subband 0-3, and the subband 1-2 and the subband 0-2 are codirectional. That is, the subband 1-1, the subband 1-2, and the subband 1-3 are all downlink subbands. As shown in FIG. 20, an example in which one carrier includes 150 RBs is used for description. Specifically, the subband 0-1 includes RBs 0 to 49, the subband 0-2 includes RBs 50 to 99, and the subband 0-3 includes RBs 100 to 149. Similarly, the subband 1-1 includes RBs 0 to 49, the subband 1-2 includes RBs 50 to 99, and the subband 1-3 includes RBs 100 to 149. Resource reservation when the SBFD cell and the legacy TDD cell coexist in the UDU case is described in this embodiment.

Specifically, for first two manners in the three manners of a reserved resource of each subband, refer to the two manners shown in FIG. 20. Brief descriptions may be as follows:

Manner 1: A specific position of the reserved resource may be as follows:

Subband 0-1: Frequency domain position: RB-level reservation: RB 50−N1 to RB 49 are reserved; RE-level reservation: Subcarrier on which a DL DMRS of a subband 1-1 in the legacy TDD cell is located on an RB in RB 0 to RB 49−N1; and Time domain position: Symbol position at which the DL DMRS of the subband 1-1 in the legacy TDD cell is located.

Subband 0-3: Frequency domain position: RB-level reservation: Reserved RBs are RB 100 to RB 99+N2; RE-level reservation: Subcarrier on which a DL DMRS of a subband 1-3 in the legacy TDD cell is located on an RB in RB 100+N2 to RB 149; and Time domain position: Symbol position at which the DL DMRS of the subband 1-3 in the legacy TDD cell is located.

Optionally, N1 may be equal to N2.

Subband 0-2 and the subband 1-2: Frequency domain position: RB 50 to RB 49+M1 and RB 100−M2 to RB 99, no RE-level reservation; and Time domain position: Symbol position at which a UL DMRS of the adjacent cell and the current cell is located.

Optionally, M1 may be equal to M2.

In a possible manner, M1 and M2 are equal to N1 and N2.

Subband 1-1: Frequency domain position: No RB-level reservation; RE-level reservation: Subcarrier on which a UL DMRS of a subband 0-1 in the adjacent SBFD cell is located on an RB in RB 0 to RB 49; and Time domain position: Symbol position at which the UL DMRS of the subband 0-1 in the adjacent SBFD cell is located.

Subband 1-3: Frequency domain position: No RB-level reservation; RE-level reservation: Subcarrier on which a UL DMRS of a subband 0-3 in the adjacent SBFD cell is located on an RB in RB 100 to RB 149; and Time domain position: Symbol position at which the UL DMRS of the subband 0-3 in the adjacent SBFD cell is located.

Optionally, a subcarrier on which a DL DMRS of the legacy TDD cell is located remains the same on the subband 1-1, the subband 1-2, and the subband 1-3, and a symbol on which the DL DMRS of the legacy TDD cell is located remains the same on the subband 1-1, the subband 1-2, and the subband 1-3.

For example, a position at which the reserved resource on each subband is located and that corresponds to the manner 1 may be shown in Table 7.

position is a resource block corresponding to a smallest RB sequence number on the UL subband 0-3.

Manner 2: A specific position of the reserved resource may be as follows:

Subband 0-1: Frequency domain position: No RB-level reservation; RE-level reservation: Subcarrier on which a DL DMRS of a subband 1-1 in the legacy TDD cell is located on an RB in RB 0 to RB 49; and Time domain position: Symbol position at which the DL DMRS of the subband 1-1 in the legacy TDD cell is located.

Subband 0-3: Frequency domain position: No RB-level reservation; RE-level reservation: Subcarrier on which a DL DMRS of a subband 1-3 in the legacy TDD cell is located on an RB in RBs 100 to 149; and Time domain position: Symbol position at which the DL DMRS of the subband 1-3 in the legacy TDD cell is located.

A resource reservation method for another subband is the same as a method in the resource reservation manner 1. Details are not described herein again.

Manner 3: A specific position of the reserved resource may be as follows:

In the resource reservation manner 1, M1, M2, N1, and N2 are all 50. In this case, RBs occupied by reserved resources on the subband 0-1, the subband 0-2, the subband 0-3, the subband 1-1, and the subband 1-3 are all RBs on the corresponding subbands. It may be understood that, in this case, RE-level resource reservation does not need to be performed for the subband 0-2. Another resource reservation method is the same as a method in the resource reservation manner 1. Details are not described herein again.

For a determining method for the first time range and the second time range, refer to a determining method when the SBFD cell and the legacy TDD cell coexist in the DUD case. Optionally, first time ranges and second time ranges (including RB-level resource reservation and RE-level resource

TABLE 7

| DL subband 1-1 and DL subband 1-3 | Subcarrier position of an RE of a reserved resource | DL subband 0-2 and DL subband 1-2 | Subcarrier position of an RE of a reserved resource | UL subband 0-1 and UL subband 0-3 | Subcarrier position of an RE of a reserved resource |
|---|---|---|---|---|---|
| | Subcarrier of a UL DMRS of an adjacent SBFD cell on all RBs | | Subcarriers 0 to 11 on M1 edge RBs and M2 edge RBs No another RB is occupied | | Subcarriers 0 to 11 on N1 edge RBs and N2 edge RBs (RB-level reservation) Subcarrier of a DL DMRS of a subband 1-1 and a subband 1-3 on another RB (RE-level reservation) |
| | Symbol position of an RE of the reserved resource | | Symbol position of an RE of the reserved resource | | Symbol position of an RE of the reserved resource |
| | Symbol position of the UL DMRS of the adjacent SBFD cell | | Symbol position of a UL DMRS (if the UL DMRS exists) of an adjacent cell and a current cell | | Symbol position of the DL DMRS of the subband 1-1 and the subband 1-3 |

The M1 edge RBs are M1 RBs whose start position is an RB corresponding to a smallest RB sequence number on the DL subband 0-2 and the DL subband 1-2. The M2 edge RBs are M2 RBs whose end position is an RB corresponding to a largest RB sequence number on the DL subband 0-2 and the DL subband 1-2.

The N1 edge RBs are N1 RBs whose end position is an RB corresponding to a largest RB sequence number on the UL subband 0-1. The N2 edge RBs are N2 RBs whose start reservation) of the subband 0-1, the subband 0-2, the subband 0-3, the subband 1-1, the subband 1-2, and the subband 1-3 are the same.

It should be noted that, for another RB on which no resource reservation is performed on a downlink subband, resource reservation may be performed with reference to a discrete RB-level resource reservation method or an additional RE-level resource reservation method in downlink subband resource reservation when both the cell 0 and the cell 1 are SBFD cells in the DUD case.

Based on the configured reserved resources, for a manner in which the network device 0 indicates the reserved resource on the subband 0-1, the subband 0-2, and the subband 0-3 to the terminal device, and a manner in which the network device 1 indicates the reserved resources on the subband 1-1, the subband 1-2, and the subband 1-3 to the terminal device, refer to the indication manner of resource reservation when the SBFD cell and the legacy TDD cell coexist in the DUD case.

Figure 21:
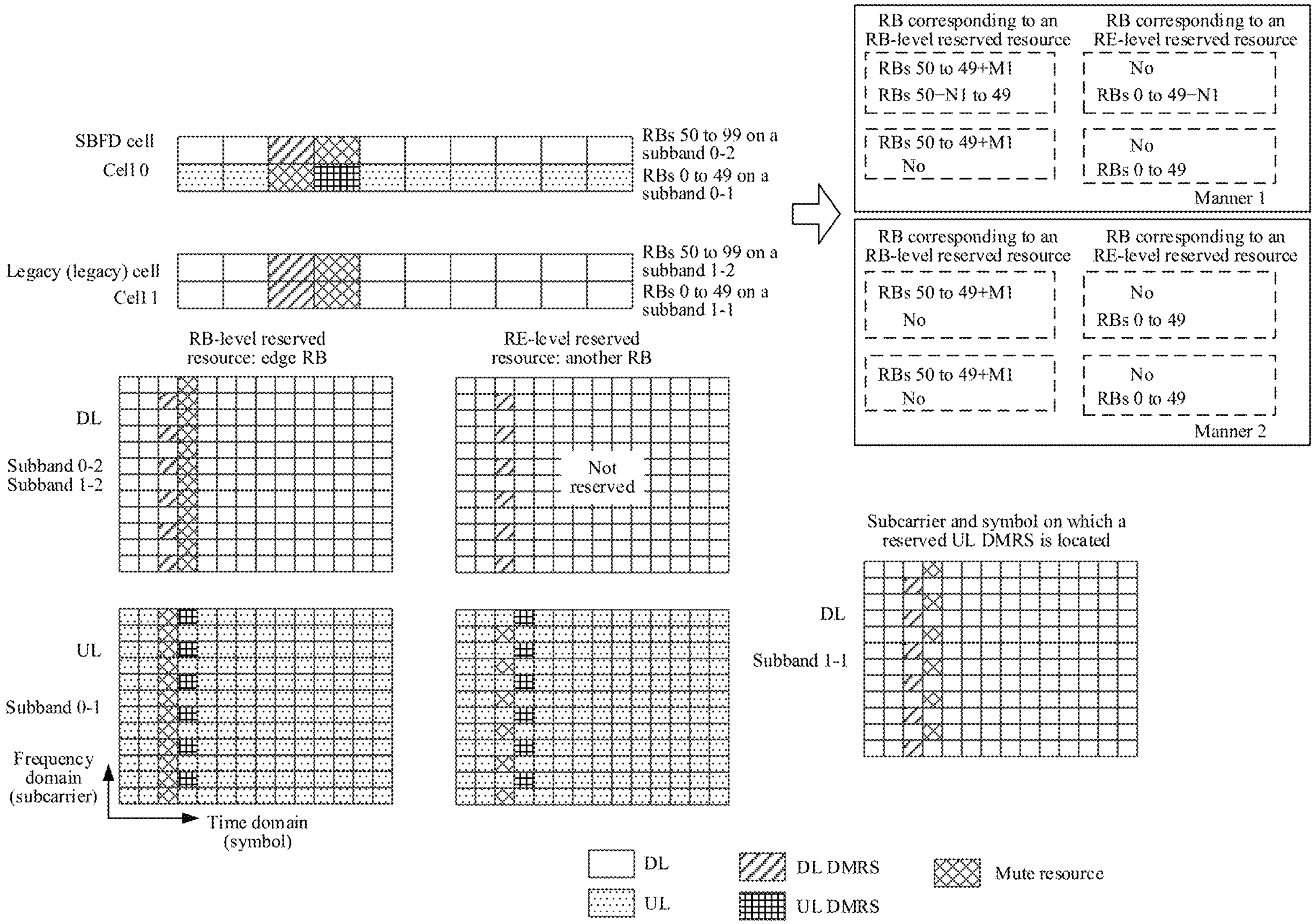
FIG. 21 is a diagram of another reserved resource according to this application.

In still another embodiment, a subband obtained through carrier division of the cell 0 may be shown in FIG. 21. Specifically, the cell 0 corresponds to an uplink subband 0-1 and a downlink subband 0-2, and a frequency of the downlink subband is higher than a frequency of the uplink subband. According to a subband division manner of the cell 0, the cell 1 may be divided into the subband 1-1 and the subband 1-2. The subband 1-1 and the subband 0-1 are contradirectional, and the subband 1-2 and the subband 0-2 are codirectional. That is, the subband 1-1 and the subband 1-2 are all downlink subbands. As shown in FIG. 21, an example in which one carrier includes 100 RBs is used for description. Specifically, the subband 0-1 includes RBs 0 to 49, and the subband 0-2 includes RBs 50 to 99. Similarly, the subband 1-1 includes RBs 0 to 49, and the subband 1-2 includes RBs 50 to 99. Resource reservation when the SBFD cell and the legacy TDD cell coexist in the UD case is described in this embodiment.

Specifically, for first two manners in the three manners of a reserved resource of each subband, refer to the two manners shown in FIG. 21. Brief descriptions may be as follows:

Manner 1: A specific position of the reserved resource may be as follows:

Subband 0-1: Frequency domain position: RB-level reservation: RB 50−N1 to RB 49 are reserved; RE-level reservation: Subcarrier on which a DL DMRS of a subband 1-1 in the legacy TDD cell is located on an RB in RB 0 to RB 49−N1; and Time domain position: Symbol position at which the DL DMRS of the subband 1-1 in the legacy TDD cell is located.

Optionally, N1 may be equal to N2.

Subband 0-2 and subband 1-2: Frequency domain position: RB-level reservation: Reserved RBs are RB 50 to RB 49+M1; no RE-level reservation; and Time domain position: Symbol position at which a UL DMRS (if the UL DMRS exists) of the adjacent cell and the current cell is located.

Optionally, M1 may be equal to M2.

In a possible manner, M1 and M2 are equal to N1 and N2.

Subband 1-1: Frequency domain position: No RB-level reservation; RE-level reservation: Subcarrier on which a UL DMRS in the adjacent SBFD cell is located on an RB in RB 0 to RB 49; and Time domain position: Symbol position at which the UL DMRS in the adjacent SBFD cell is located.

Optionally, a subcarrier on which a DL DMRS of the legacy TDD cell is located remains the same on the subband 1-1 and the subband 1-2, and a symbol on which the DL DMRS of the legacy TDD cell is located remains the same on the subband 1-1 and the subband 1-2.

For example, a position at which the reserved resource on each subband is located and that corresponds to the manner 1 may be shown in Table 8.

TABLE 8

| DL subband 1-1 | Subcarrier position of an RE of a reserved resource | DL subband 0-2 and DL subband 1-2 | Subcarrier position of an RE of a reserved resource | UL subband 0-1 | Subcarrier position of an RE of a reserved resource |
|---|---|---|---|---|---|
| | Subcarrier of a UL DMRS of an adjacent SBFD cell on all RBs | | Subcarriers 0 to 11 on M1 edge RBs No another RB is occupied | | Subcarriers 0 to 11 on N1 edge RBs (RB-level reservation) Subcarrier of a DL DMRS of a subband 1-1 on another RB (RE-level reservation) |
| | Symbol position of an RE of the reserved resource | | Symbol position of an RE of the reserved resource | | Symbol position of an RE of the reserved resource |
| | Symbol position of the UL DMRS of the adjacent SBFD cell | | Symbol position of a UL DMRS (if the UL DMRS exists) of an adjacent cell and a current cell | | Symbol position of the DL DMRS of the subband 1-1 |

The M1 edge RBs are M1 RBs whose start position is a resource block corresponding to a smallest RB sequence number on the DL subband 0-2 and the DL subband 1-2.

The N1 edge RBs are N1 RBs whose end position is an RB corresponding to a largest RB sequence number on the UL subband 0-1.

Manner 2: A specific position of the reserved resource may be as follows:

Subband 0-1: Frequency domain position: No RB-level reservation; RE-level reservation: Subcarrier on which a DL DMRS of a subband 1-1 in the legacy TDD cell is located on an RB in RB 0 to RB 49; and Time domain position: Symbol position at which the DL DMRS of the subband 1-1 in the legacy TDD cell is located.

A resource reservation method for another subband is the same as a method in the resource reservation manner 1. Details are not described herein again.

Manner 3: A specific position of the reserved resource may be as follows:

In the resource reservation manner 1, M1, M2, N1, and N2 are all 50. In this case, RBs occupied by reserved resources on the subband 0-1, the subband 0-2, the subband 0-3, the subband 1-1, and the subband 1-3 are all RBs on the corresponding subbands. It may be understood that, in this case, RE-level resource reservation does not need to be performed for the subband 0-2. Another resource reservation method is the same as a method in the resource reservation manner 1. Details are not described herein again.

For a determining method for the first time range and the second time range, refer to a determining method when the SBFD cell and the legacy TDD cell coexist in the DUD case.

Optionally, first time ranges and second time ranges (including RB-level resource reservation and RE-level resource reservation) of the subband 0-1, the subband 0-2, the subband 1-1, and the subband 1-2 are the same.

It should be noted that, for another RB on which no resource reservation is performed on a downlink subband, resource reservation may be performed in a discrete RB-level resource reservation method or an additional RE-level resource reservation method in downlink subband resource reservation when both the cell 0 and the cell 1 are SBFD cells in the DUD case.

Based on the configured reserved resources, for a manner in which the network device 0 indicates the reserved resource on the subband 0-1 and the subband 0-2 to the terminal device, and a manner in which the network device 1 indicates the reserved resources on the subband 1-1 and the subband 1-2 to the terminal device, refer to the indication manner of resource reservation when the SBFD cell and the legacy TDD cell coexist in the DUD case.

Figure 22:
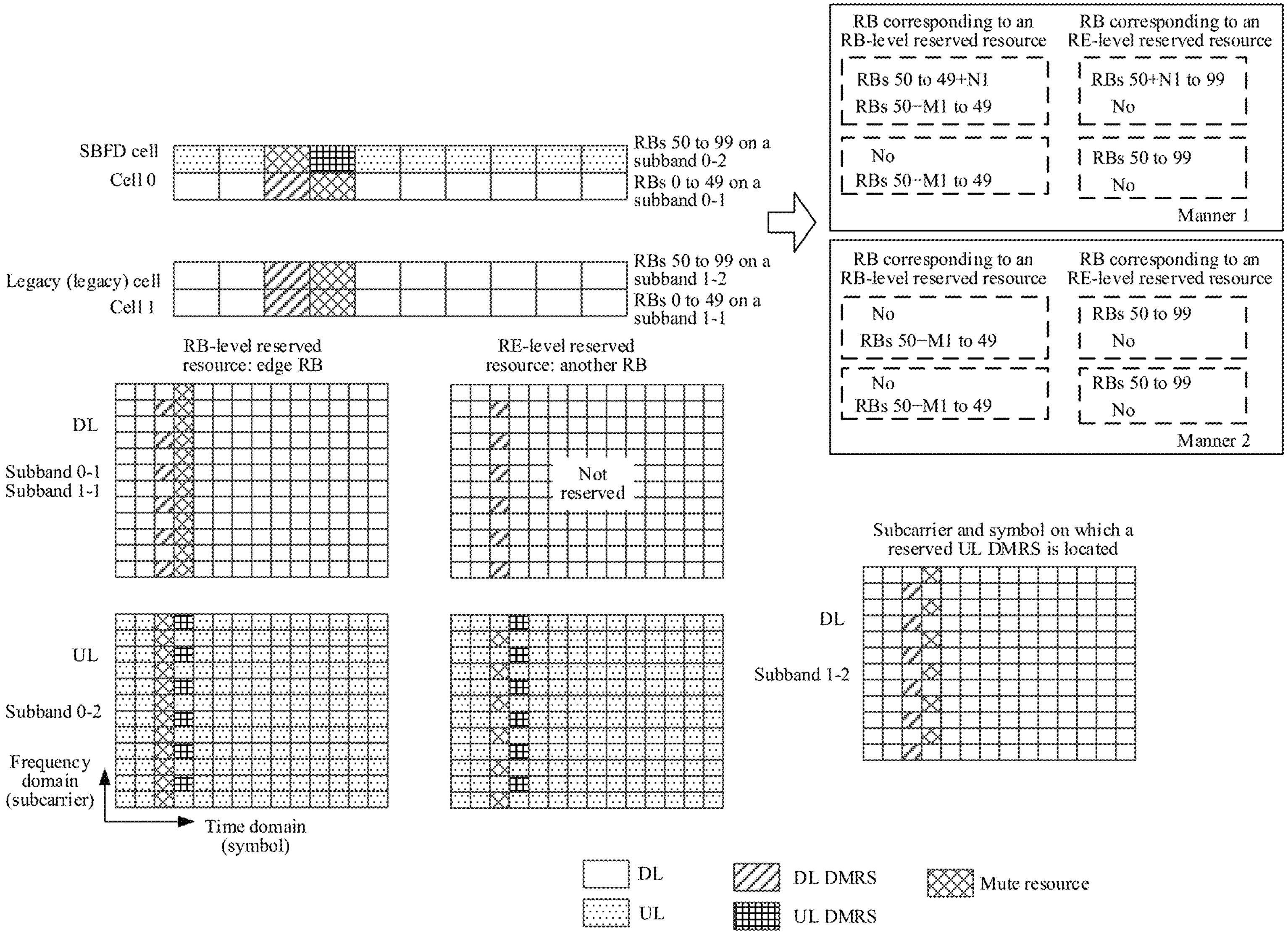
FIG. 22 is a diagram of another reserved resource according to this application.

In still another embodiment, a subband obtained through carrier division of the cell 0 may be shown in FIG. 22. Specifically, the cell 0 corresponds to a downlink subband 0-1 and an uplink subband 0-2, and a frequency of the uplink subband is higher than a frequency of the downlink subband. According to a subband division manner of the cell 0, the cell 1 may be divided into the subband 1-1 and the subband 1-2. The subband 1-1 and the subband 0-1 are codirectional, Manner 1: A specific position of the reserved resource may be as follows:

Subband 0-1 and subband 1-1: Frequency domain position: RB-level reservation: Reserved RBs are RB 50−M1 to RB 49; no RE-level reservation; and Time domain position: Symbol position at which a UL DMRS of the adjacent cell and the current cell is located.

Optionally, M1 may be equal to M2.

Subband 0-2: Frequency domain position: RB-level reservation: Reserved RBs are RB 50 to RB 49+N1; RE-level reservation: Subcarrier on which a DL DMRS of a subband 1-2 in the legacy TDD cell is located on an RB in RBs 50+N1 to 99; and Time domain position: Symbol position at which the DL DMRS of the subband 1-2 in the legacy TDD cell is located.

Optionally, N1 may be equal to N2.

In a possible manner, M1 and M2 are equal to N1 and N2.

Subband 1-2: Frequency domain position: No RB-level reservation; RE-level reservation: Subcarrier on which a UL DMRS in the adjacent SBFD cell is located on an RB in RB 50 to RB 99; and Time domain position: Symbol position at which the UL DMRS in the adjacent SBFD cell is located.

Optionally, a subcarrier on which a DL DMRS of the legacy TDD cell is located remains the same on the subband 1-1 and the subband 1-2, and a symbol on which the DL DMRS of the legacy TDD cell is located remains the same on the subband 1-1 and the subband 1-2.

For example, a position at which the reserved resource on each subband is located and that corresponds to the manner 1 may be shown in Table 9.

TABLE 9

| DL subband 1-2 | | DL subband 0-1 and DL subband 1-1 | | UL subband 0-2 | |
| --- | --- | --- | --- | --- | --- |
| | Subcarrier position of an RE of a reserved resource | | Subcarrier position of an RE of a reserved resource | | Subcarrier position of an RE of a reserved resource |
| | Subcarrier of a UL DMRS of an adjacent SBFD cell on all RBs | | Subcarriers 0 to 11 on M1 edge RBs No another RB is occupied | | Subcarriers 0 to 11 on N1 edge RBs (RB-level reservation) Subcarrier of a DL DMRS of a subband 1-2 on another RB (RE-level reservation) |
| | Symbol position of an RE of the reserved resource | | Symbol position of an RE of the reserved resource | | Symbol position of an RE of the reserved resource |
| | Symbol position of the UL DMRS of the adjacent SBFD cell | | Symbol position of a UL DMRS (if the UL DMRS exists) of an adjacent cell and a current cell | | Symbol position of the DL DMRS of the subband 1-2 |

and the subband 1-2 and the subband 0-2 are contradirectional. That is, the subband 1-1 and the subband 1-2 are all downlink subbands. As shown in FIG. 21, an example in which one carrier includes 100 RBs is used for description. Specifically, the subband 0-1 includes RBs 0 to 49, and the subband 0-2 includes RBs 50 to 99. Similarly, the subband 1-1 includes RBs 0 to 49, and the subband 1-2 includes RBs 50 to 99. Resource reservation when the SBFD cell and the legacy TDD cell coexist in the DU case is described in this embodiment.

Specifically, for first two manners in the three manners of a reserved resource of each subband, refer to the two manners shown in FIG. 22. Brief descriptions may be as follows:

The M1 edge RBs are M1 RBs whose end position is an RB corresponding to a largest RB sequence number on the DL subband 0-1 and the DL subband 1-1.

The N1 edge RBs are N1 RBs whose start position is an RB corresponding to a smallest RB sequence number on the UL subband 0-2.

Manner 2: A specific position of the reserved resource may be as follows:

Subband 0-2: Frequency domain position: No RB-level reservation; RE-level reservation: Subcarrier on which a DL DMRS of a subband 1-2 in the legacy TDD cell is located on an RB in RB 50 to RB 99; and Time domain position: Symbol position at which the DL DMRS of the subband 1-2 in the legacy TDD cell is located.

A resource reservation method for another subband is the same as a method in the resource reservation manner 1. Details are not described herein again.

Manner 3: A specific position of the reserved resource may be as follows:

In the resource reservation manner 1, M1, M2, N1, and N2 are all 50. In this case, RBs occupied by reserved resources on the subband 0-1, the subband 0-2, the subband 0-3, the subband 1-1, and the subband 1-3 are all RBs on the corresponding subbands. It may be understood that, in this case, RE-level resource reservation does not need to be performed for the subband 0-2. Another resource reservation method is the same as a method in the resource reservation manner 1. Details are not described herein again.

For a determining method for the first time range and the second time range, refer to a determining method when the SBFD cell and the legacy TDD cell coexist in the DUD case.

Optionally, first time ranges and second time ranges (including RB-level resource reservation and RE-level resource reservation) of the subband 0-1, the subband 0-2, the subband 1-1, and the subband 1-2 are the same.

It should be noted that, for another RB on which no resource reservation is performed on a downlink subband, resource reservation may be performed in a discrete RB-level resource reservation method or an additional RE-level resource reservation method in downlink subband resource reservation when both the cell 0 and the cell 1 are SBFD cells in the DUD case.

Based on the configured reserved resources, for a manner in which the network device 0 indicates the reserved resource on the subband 0-1 and the subband 0-2 to the terminal device, and a manner in which the network device 1 indicates the reserved resources on the subband 1-1 and the subband 1-2 to the terminal device, refer to the indication manner of resource reservation when the SBFD cell and the legacy TDD cell coexist in the DUD case.

Figure 23:
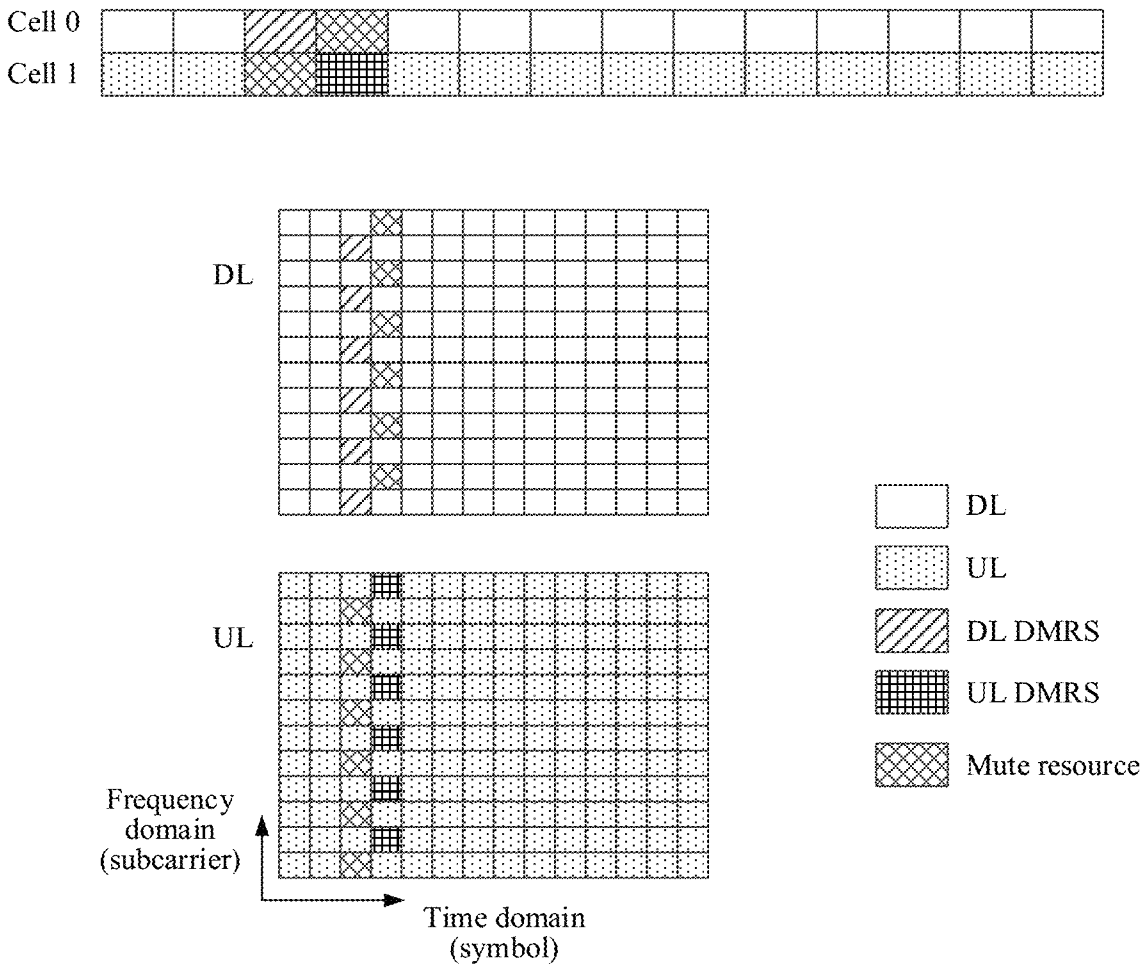
FIG. 23 is a diagram of another reserved resource according to this application.

In addition to the foregoing described scenarios, in a different-configuration scenario, a possible resource reservation manner may be shown in FIG. 23.

The different-configuration scenario may be understood as follows: The SBFD system is used, and a quantity of uplink transmission resources may be increased by increasing a quantity of resources occupied by an uplink in FIG. 1, to reduce an uplink delay and enhance uplink coverage (which may be referred to as new TDD). A downlink transmission resource may correspond to a time-frequency resource whose slot format is configured as "downlink" on one CC, and the uplink transmission resource may correspond to a time-frequency resource whose slot format is configured as "uplink" on one CC. When a legacy TDD slot configuration is used for a cell and a new TDD slot configuration is used for a cell, there is a difference between slot configurations used for the two cells. Such a scenario is referred to as a different-configuration scenario.

The cell for which the legacy TDD slot configuration is used may be referred to as a legacy TDD cell, and the cell for which the new TDD slot configuration is used may be referred to as a new TDD cell.

In this case, there is a scenario in which a slot k is a DL slot in the legacy TDD cell and is a UL slot in the new TDD cell. In other words, in the slot k, the network device sends a DL signal in the legacy TDD system, and UE sends a UL signal in the new TDD system. In this scenario, interference of the DL signal to the UL signal is co-channel cell-cell CLI, and interference of the UL signal to the DL signal is co-channel UE-UE CLI.

In the different-configuration scenario, accuracy of channel estimation performed based on the DMRS may also be improved in a resource reservation manner.

For example, a slot format configuration of the cell 0 is DSUDD (a format of slots 0 to 4), and a slot format configuration of the cell 1 is DSUUU. A slot format S indicates that in the slot, a type of some symbols is "DL", a type of some symbols is "UL", and a type of some symbols is "F". FIG. 23 shows that the slot k (for example, a slot 3 or 4) is a DL slot (a category of a symbol included in the slot is "DL") in the legacy TDD cell (for example, the cell 0), and is a UL slot (a category of a symbol included in the slot is "UL") in the new TDD cell (for example, the cell 1) system (in this case, subbands are not distinguished).

In this scenario, the RB on which the reserved resource is located is all RBs included on the CC.

The reserved resource may be reserved in the following manners:

Resource reservation for a legacy TDD cell:

A subcarrier on which the reserved resource is located is a subcarrier on which a UL DMRS of an adjacent new TDD cell is located.

A symbol on which the reserved resource is located is a symbol on which a UL DMRS of an adjacent new TDD cell is located.

A slot in which the reserved resource is located is a slot in which a symbol type of at least one symbol in included symbols in the legacy TDD cell is "DL", and a symbol type in the adjacent new TDD cell is "UL".

A resource reservation periodicity is duration T or an integer multiple of the duration T. For the duration T, refer to the descriptions of T in the embodiment shown in FIG. 7. Details are not described herein again.

Resource reservation for a new TDD cell:

A subcarrier on which the reserved resource is located is a subcarrier on which a DL DMRS of an adjacent legacy TDD cell is located.

A symbol on which the reserved resource is located is a symbol on which a DL DMRS of an adjacent legacy TDD cell is located.

A slot in which the reserved resource is located is a slot in which a symbol type of at least one symbol in included symbols in the legacy TDD cell is "DL", and a symbol type in the adjacent new TDD cell is "UL".

A resource reservation periodicity is duration T or an integer multiple of the duration T. For the duration T, refer to the descriptions of T in the embodiment shown in FIG. 7. Details are not described herein again.

A position at which an RE of the reserved resource is located is shown in Table 10.

For a subcarrier on which the reserved resource is located and a symbol on which the reserved resource is located, refer to RE-level resource reservation when SBFD and legacy TDD coexist.

For a manner in which the network device performs an indication to the terminal device, refer to the indication method for RE-level resource reservation when SBFD and legacy TDD coexist. Mutual references may be made.

Specifically, positions of reserved resources of the new TDD cell and the legacy TDD cell in the different-configuration scenario may be shown in Table 10.

TABLE 10

| | | | |
|---|---|---|---|
| Resource reservation for a legacy TDD cell | Subcarrier position of an RE of a reserved resource Subcarrier on which a UL DMRS of an adjacent new TDD cell is located Symbol position of an RE of the reserved resource Symbol on which the UL DMRS of the adjacent new TDD cell is located | Resource reservation for a new TDD cell | Subcarrier position of an RE of a reserved resource Subcarrier on which a DL DMRS of an adjacent legacy TDD cell is located Symbol position of an RE of the reserved resource Symbol on which the DL DMRS of the adjacent legacy TDD cell is located |

It may be understood that, if the subcarrier on which the reserved resource is located includes subcarriers 0 to 11, RB-level resource reservation is performed.

It should be noted that, in the foregoing embodiment, a resource reservation solution for the SBFD system is for a terminal device that can identify a subband slot format configuration. The following briefly describes resource reservation of a terminal device that cannot identify a subband slot format configuration.

The terminal device that can identify the subband slot format configuration may be referred to as a subband fullduplex terminal device (SBFD UE), and the terminal device that cannot identify the subband slot format configuration may be referred to as a legacy terminal device (legacy UE). For the legacy UE, a category of a symbol remains the same on the entire CC in frequency domain. This may be referred to as a CC slot format configuration. For the SBFD UE, a symbol may have different slot formats on different subbands. This may be referred to as a subband slot format configuration. The CC slot format configuration and the subband slot format configuration are an RRC slot format configuration. For the legacy UE, RB-level resource reservation is performed for the reserved time-frequency resource.

In a possible manner, a slot format configuration on the DL subband is the same as the CC slot format configuration. The slot format configuration on the UL subband is different from the CC slot format configuration.

As mentioned above, in the DUD case, the DL subband includes the first downlink subband and the second downlink subband, and the UL subband includes the first uplink subband. In the UDU case, the DL subband includes the first downlink subband, and the UL subband includes the first uplink subband and the second uplink subband. In the UD case and the DU case, the DL subband includes the first downlink subband, and the UL subband includes the first uplink subband.

In the UDU case, in a possible manner, the first uplink subband and the second uplink subband have a same slot format configuration.

For the legacy UE, a time-frequency resource reserved on the DL subband is the same as that of the SBFD UE. For details, refer to the descriptions of the time-frequency resource reserved for the DL subband in the SBFD system in the foregoing embodiment. Details are not described herein again.

In the slot in which the reserved resource is located, the time-frequency range of the reserved resource on the UL subband may be as follows:

RB on which the reserved resource is located: all RBs on the UL subband.

Symbol on which the reserved resource is located: For a symbol in symbols on which the UL subband is located, when symbol categories configured for the legacy UE and the SBFD UE are different and meet a constraint condition Cl, the symbol needs to be reserved on a time-frequency resource including the UL subband.

The constraint condition Cl is a subset of a constraint condition C, and the constraint condition C may be as follows:

- for the legacy UE, a symbol category is “DL” based on the CC slot format configuration; and for the SBFD UE, a symbol category of one symbol on the UL subband is “UL” based on the subband slot format configuration; or
- for the legacy UE, a symbol category is “DL” based on the CC slot format configuration; and for the SBFD UE, a symbol category of one symbol on the UL subband is “F” based on the subband slot format configuration; or
- for the legacy UE, a symbol category is “F” based on the CC slot format configuration; and for the SBFD UE, a symbol category of one symbol on the UL subband is “UL” based on the subband slot format configuration.

When there is a guard band frequency domain resource between subbands in the SBFD system on some symbols, a symbol on which the guard band frequency domain resource is located forms a guard band time-frequency resource, and the legacy UE performs resource reservation for the guard band time-frequency resource.

Slot in which the reserved resource is located: The slot in which the reserved resource is located is determined based on a slot to which the symbol on which the reserved resource is located belongs.

A manner of indicating a reserved resource in a slot of the legacy UE may be as follows:

A possible manner of indicating the frequency domain range in which the reserved resource is located may be as follows:

In the DUD case, the DU case, or the UD case, two pieces of information in a start RB, an RB length, and an end RB of a frequency domain range 1 of a reserved resource 1 are indicated by using one piece of information 1, and the frequency domain range 1 includes a UL subband and a frequency domain range in which a guard band between the UL subband and a DL subband is located. Two pieces of information in a start RB, an RB length, and an end RB of a frequency domain range 2 of a reserved resource 2 are indicated by using one piece of information 2, a start position of the frequency domain range 2 is a minimum frequency of the DL subband, an end position of the frequency domain range 2 is a maximum frequency of the DL subband, and the DL subband includes one or two DL subbands.

In the UDU case, the uplink subband includes the first uplink subband and the second uplink subband, the two pieces of information in the start RB, the RB length, and the end RB of the frequency domain range 1 of the reserved resource 1 are indicated by using one piece of information 1, and the frequency domain range 1 includes the first uplink subband and a frequency domain range in which a guard band between the first uplink subband and the first downlink subband is located. Two pieces of information in a start RB, an RB length, and an end RB of a frequency domain range 2 of a reserved resource 2 are indicated by using one piece of information 2, a start position of the frequency domain range 2 is a minimum frequency of the DL subband, and an end position of the frequency domain range 2 is a maximum frequency of the DL subband. Two pieces of information in a start RB, an RB length, and an end RB of a frequency domain range 3 of a reserved resource 3 are indicated by using one piece of information 3, and the frequency domain range 3 includes the second uplink subband and a frequency domain range in which a guard band between the second uplink subband and the first downlink subband is located.

For an indication of the symbol on which the reserved resource is located, refer to the methods in the embodiments shown in FIG. 7 and FIG. 12. Mutual references may be made.

For an indication of the first time range and the second time range, refer to the methods in the embodiments shown in FIG. 7 and FIG. 12. Mutual references may be made.

It should be noted that, for a determining method and an indication manner of a reserved resource when the SBFD cell and the new TDD cell coexist, refer to the method in the foregoing embodiment when the SBFD cell and the legacy TDD cell coexist.

The following briefly describes a case in which a guard band exists between subbands in the SBFD system.

When a guard band exists between subbands in the SBFD system, and a DL subband resource is reserved in the legacy TDD system, an RB corresponding to the guard band also needs to be reserved, that is, a start position or an end position of the reserved resource needs to be updated.

Figure 24:
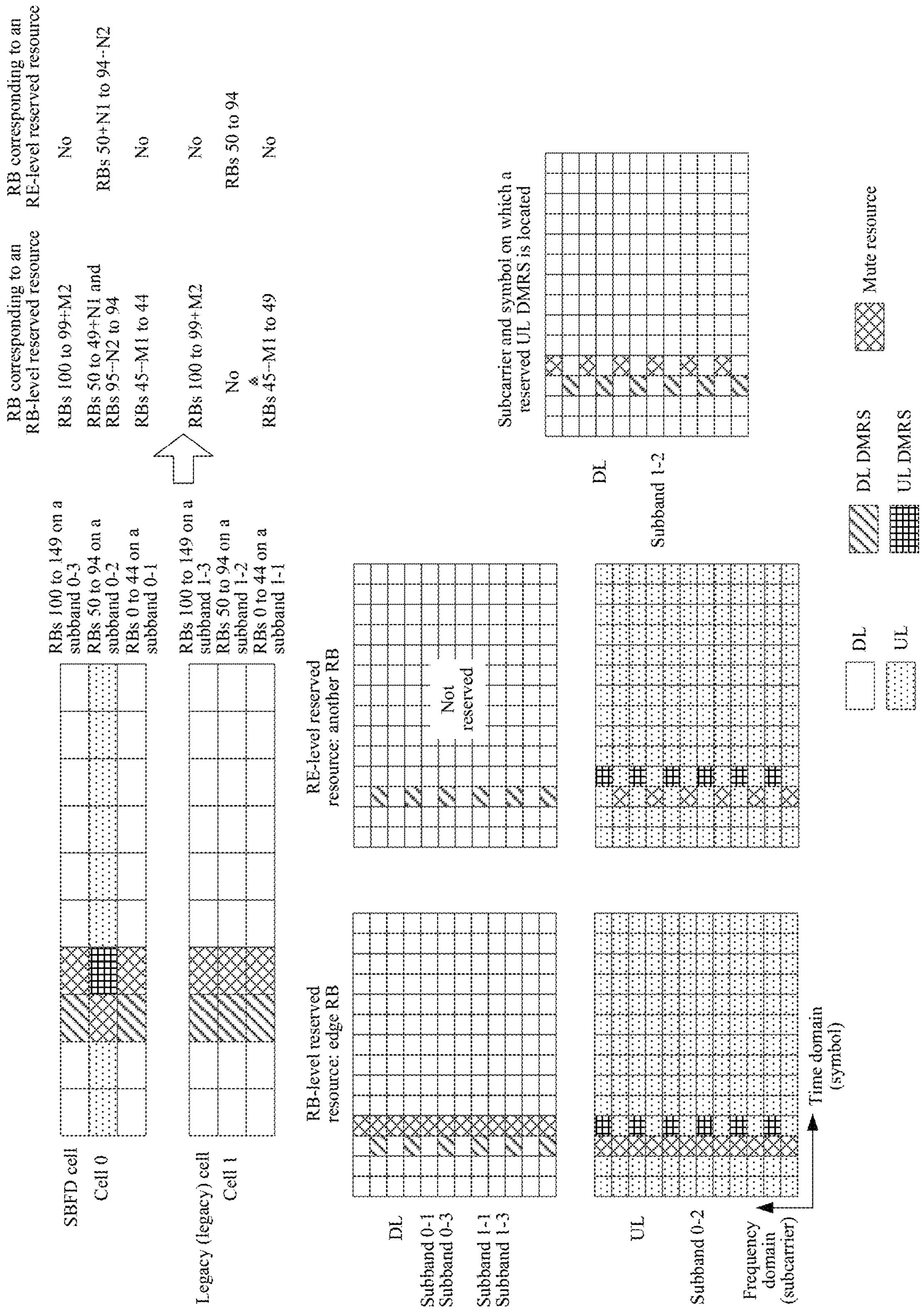
FIG. 24 is a diagram of another reserved resource according to this application.

For example, it is assumed that a guard band of 5 RBs exists between subbands. As shown in FIG. 24, a guard band of 5 RBs exists between the subband 0-1 and the subband 0-2, and between the subband 0-2 and the subband 0-3. In this case, as shown in FIG. 24, the end position of the reserved resource of the subband 1-1 includes five RBs of the guard band, and the start position of the reserved resource of the subband 1-3 includes five RBs of the guard band. In this case, a time-frequency position at which the RE-level resource reservation is performed remains unchanged.

Figure 25:
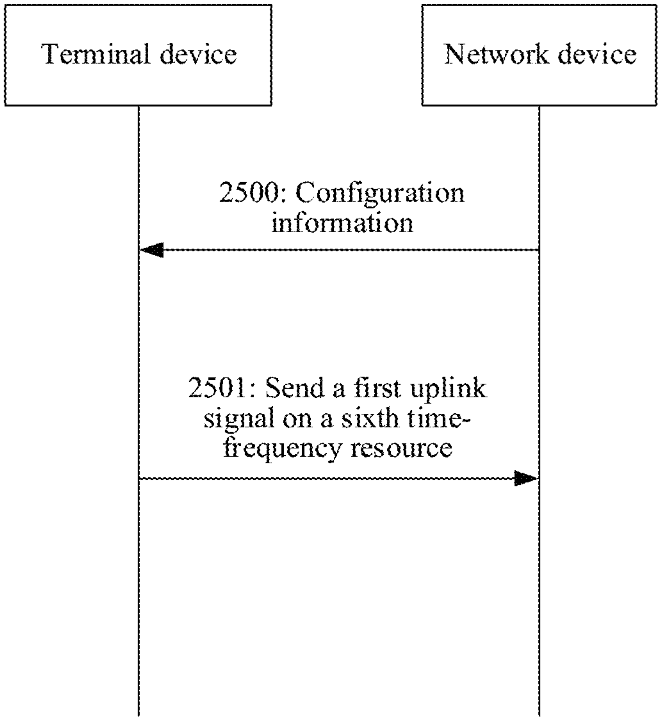
FIG. 25 is a flowchart of another communication method according to this application.

Based on the foregoing embodiments, an embodiment of this application further provides another communication method. As shown in FIG. 25, a specific procedure of the method may include the following steps.

Step 2501: A terminal device sends a first uplink signal to a network device on a sixth time-frequency resource, and correspondingly, the network device receives the first uplink signal from the terminal device on the sixth time-frequency resource.

A sending time point of the first uplink signal is $t1-(N_{TA}T_c+N_{TA,\ offset}T_c)$, $N_{TA}T_c$ is a timing advance, $N_{TA}$ is greater than or equal to 0, $N_{TA,\ offset}\ T_c$ is a timing advance offset, a value of $N_{TA,\ offset}$ is 0, $T_c$ is a time unit, a value of $T_c$ is 1/(48000×4096), a unit of $T_c$ is second, a frequency domain resource on which the sixth time-frequency resource is located is on a first uplink subband, t1 is a time point at which a first downlink signal arrives at the terminal device, $t1=t0+N_{TA}T_c/2$, a fifth time-frequency resource is used by the network device to send the first downlink signal, a sending time point of the first downlink signal is t0, a frequency domain resource on which the fifth time-frequency resource is located is on a first downlink subband and/or a second downlink subband, and a start moment of the fifth time-frequency resource and a start moment of the sixth time-frequency resource are t0.

Herein, the first uplink subband, the first downlink subband, and the second downlink subband are consecutive frequency domain resources on a frequency domain resource corresponding to a carrier, a frequency of the first uplink subband is greater than a frequency of the first downlink subband, and a frequency of the second downlink subband is greater than the frequency of the first uplink subband.

Optionally, before step 2501, as shown in step 2500, the network device sends configuration information to the terminal device. The configuration information indicates that a value of $N_{TA,\ offset}$ is 0. Correspondingly, the terminal device receives the configuration information from the network device. The configuration information indicates that the value of $N_{TA,\ offset}$ is 0.

According to the method, when the value of $N_{TA,\ offset}$ is 0, adjacent-channel self-interference caused by a signal received by the network device from the terminal device and a signal sent by the network device may be symbol aligned in terms of time, to help suppress adjacent-channel self-interference. If symbol alignment between an adjacent-channel self-interference signal and a received signal of the terminal device in terms of time is not considered, the value of $N_{TA,\ offset}$ is $N_{TA,\ offset,\ 0}$. When SBFD is used in a cell, a duplex mode of the cell is TDD.

Optionally, when the field $N_{TA,\ offset}$ exists, the network device configures, for the terminal device, information indicating that a value of a timing advance offset $N_{TA,\ offset}$ is $N_{TA,\ offset,\ 0}$. When a frequency domain range of a CC of the cell falls within the frequency range 1 (Frequency range 1) defined in the 3GPP technical specification 38.104, the value of $N_{TA,\ offset,\ 0}$ is one of {25600, 39936} in a legacy TDD cell. When the duplex mode of the cell is FDD, the value of $N_{TA}$, offset, O is one of {0, 25600, 39936}.

Optionally, the field $N_{TA,\ offset}$ does not exist. In this case, the value of $N_{TA}$, offset, 0 may be determined based on the duplex mode (TDD or FDD) and the frequency domain range (an FR 1 or a frequency range 2 (Frequency range 2, FR 2)) of the CC and with reference to a value predefined in Table 7.1.2-2 in the 3GPP technical specification 38.133 version G60.

For example, the duplex mode of the cell is TDD, the frequency domain range is the FR 1, a frequency band on which the CC of the cell is located does not coexist with an evolved universal terrestrial radio access-new radio (Evolved Universal Terrestrial Radio Access-New Radio, E-UTRA-NR) and does not coexist with narrowband internet of things-new radio (Narrowband Internet of Things-New Radio, NB-IoT-NR), and the value of $N_{TA,\ offset,\ 0}$ is 25600.

For example, the duplex mode of the cell is TDD, the frequency domain range is the FR 1, the frequency band on which the CC of the cell is located coexists with E-UTRA-NR and/or NB-IoT-NR, and the value of $N_{TA,\ offset,\ 0}$ is 39936.

For example, when a frequency domain range of the CC of the cell falls within the FR 2 defined in the 3GPP technical specification 38.104, the value of $N_{TA,\ offset,\ 0}$ is 13792.

When an SBFD cell has a UL-DL switching point (in same frequency domain, a symbol type UL is closely followed by a symbol type DL), and $N_{TA,\ offset}=0$, the network device receives a last UL symbol and then a first DL symbol, and there is no spacing between the last UL symbol and the first DL symbol. To ensure that the network device switches to a sending state after receiving a signal on the UL symbol, to send a signal on the DL symbol, the terminal device needs to send no signal on last k UL symbols at a UL-DL switching point. In this case, a spacing between receiving the last UL symbol by the network device and sending the first DL symbol is k symbols.

Optionally, k has the following three cases:

Case c1:k is 1.

Case c2: A length of k symbols is greater than or equal to $N_{TA,\ offset,\ 0}\ T_c$.

Case c3: k is an integer greater than or equal to 1.

In an optional implementation, one or more last symbols in symbols included on a first subband in an $n^{th}$ slot are uplink symbols, the first subband is the first downlink subband, the second downlink subband, or the first uplink subband, n is an integer greater than or equal to 0, one or more start symbols in symbols included on the first subband in an $(n+1)^{th}$ slot are downlink symbols, and no uplink signal is sent on the last symbol of the symbols included on the first subband in the $n^{th}$ slot. In this case, k is 1.

Figure 26:
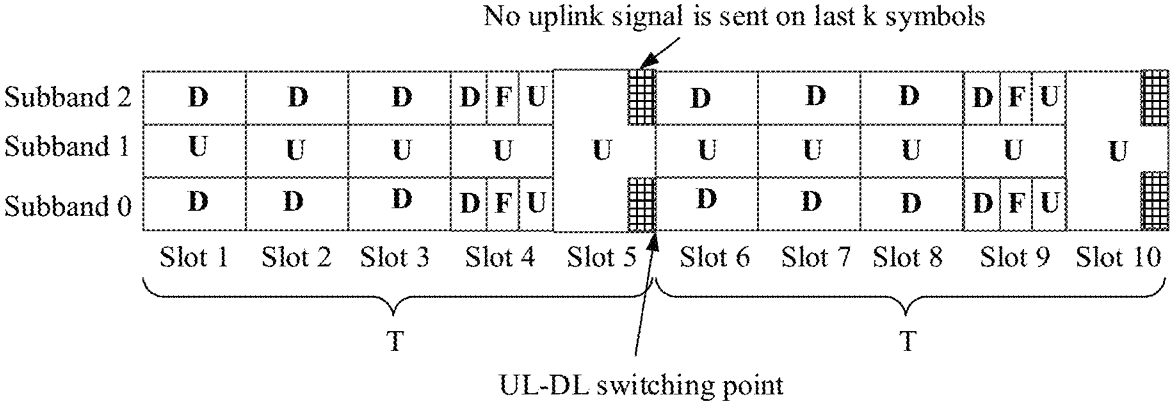
FIG. 26 is a diagram of switching from a UL symbol to a DL symbol according to this application.

For example, one periodicity T includes five slots, and the five slots are slots 1, 2, 3, 4, and 5. In FIG. 26, there are 10 slots, the 10 slots are numbered as slots 1, 2, 3, 4, 5, 6, 7, 8, 9, and 10, and a switching point for switching from a UL symbol to a DL symbol exists on a subband 0 and a subband 2. One or more last symbols in a fifth slot of the subband 0 are uplink symbols, and one or more start symbols in a sixth slot of the subband 0 are downlink symbols. In this case, no uplink signal is sent in the last symbol in the fifth slot of the subband 0.

Figure 27:
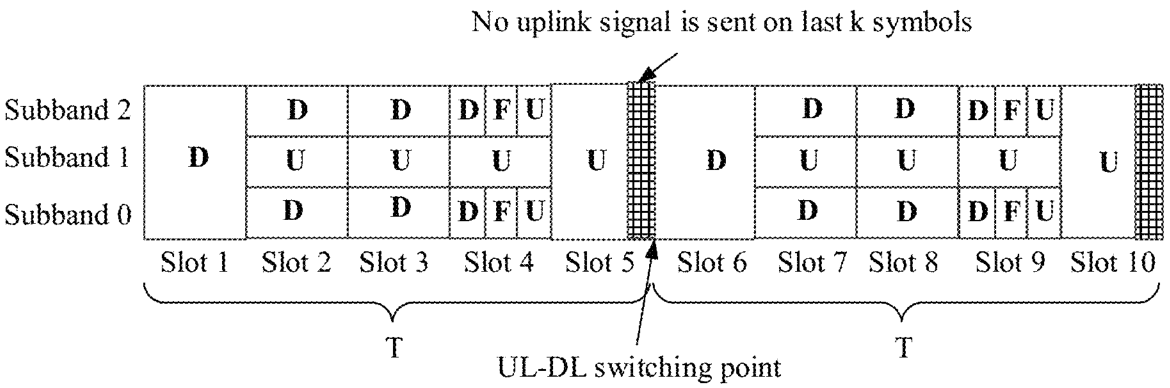
FIG. 27 is another diagram of switching from a UL symbol to a DL symbol according to this application.

For another example, one periodicity T includes five slots, and the five slots are slots 1, 2, 3, 4, and 5. In FIG. 27, there are 10 slots, the 10 slots are numbered as slots 1, 2, 3, 4, 5, 6, 7, 8, 9, and 10, and a switching point for switching from a UL symbol to a DL symbol exists on a subband 0, a subband 1, and a subband 2. One or more last symbols in a fifth slot of the subband 0 are uplink symbols, and one or more start symbols in a sixth slot of the subband 0 are downlink symbols. In this case, no uplink signal is sent in the last symbol in the fifth slot of the subband 0.

In FIG. 26 and FIG. 27, D represents a DL symbol, F represents an F symbol, and U represents a UL symbol. If one slot includes only D, it indicates that a symbol category of the slot is "DL"; if one slot includes only U, it indicates that a symbol category of the slot is "UL"; and if one slot includes D, F, and U, it indicates that the slot includes a DL symbol, a UL symbol, and an F symbol.

According to the method, when the value of $N_{TA,\ offset}$ is 0, that the network device transmits a signal and that the network device receives a signal may be symbol aligned in terms of time, to help suppress self-interference.

It should be noted that a configuration of $N_{TA,\ offset}$ in the communication method shown in FIG. 25 may be further applied to a scenario in which the network device supports simultaneous sending and receiving on a same time-frequency resource, that is, a scenario in which the network device supports co-channel fullduplex. In this case, self-interference caused by a signal received by the network device from the terminal device and a signal sent by the network device may be symbol aligned in terms of time, to help suppress co-channel self-interference. It may be understood that, when the network device supports simultaneous receiving and sending on a same time-frequency resource, on the same frequency domain resource, the network device switches to the sending state after receiving the signal on the UL symbol, to send the signal on the DL symbol without a switching time. In the communication method shown in FIG. 25, a value of k is 0.

The following briefly describes a method for configuring a start symbol position of a DMRS in this embodiment of this application.

Currently, a start symbol position of a UL and DL type A (type A) DMRS is configured based on a parameter DMRS type A position (dmrs-TypeA-Position) configured at an RRC layer. In this embodiment, that is, in a scenario in which SBFD cells coexist, and the SBFD cell and the legacy TDD cell coexist, a symbol on which a UL DMRS is located and a symbol on which a DL DMRS is located need to not overlap. A specific start symbol position of the DMRS may be configured in the following two manners:

Manner 1: The parameter dmrs-TypeA-Position configured through RRC represents a start position of the DL DMRS, and a parameter dmrs-TypeA-Position-UL configured through RRC is newly added to indicate a symbol start position of the UL DMRS, or a parameter dmrs-TypeA-Position-offset configured through RRC is newly added to indicate an offset of the start position of the UL DMRS relative to the start position of the DL DMRS.

Manner 2: The parameter dmrs-TypeA-Position configured through RRC represents a start position of the UL DMRS, and a parameter dmrs-TypeA-Position-DL configured through RRC is newly added to indicate a symbol start position of the DL DMRS, or a parameter dmrs-TypeA-Position-offset configured through RRC is newly added to indicate an offset of the start position of the DL DMRS relative to the start position of the UL DMRS.

In addition, this application further provides a resource reservation manner and configuration during multi-transmission time interval (transmission time interval, TTI) pilot sharing (also referred to as multi-slot DMRS sharing). The following briefly describes three scenarios. In an environment such as a factory, a moving speed of UE is slow, and an uplink transmission requirement is high. In this case, the UE may need to transmit uplink data in a plurality of consecutive slots. In consideration that the moving speed of the UE is low, a channel between the UE and the network device changes slightly in n consecutive slots, and channel information obtained through estimation performed based on a UL DMRS in a first slot may be used for 2–n subsequent slots. In this case, the UL DMRS may not be used for the 2–n subsequent slots, to reduce overheads of the UL DMRS. The first slot may be referred to as a first UL DMRS sharing slot, and a $(2-n)^{th}$ slot may be referred to as another UL DMRS sharing slot.

The network device may indicate a start slot and an end slot of a shared pilot. Specifically, the network device may indicate, by newly adding a field to DCI, a quantity of slots in which the pilot is shared.

Figure 28:
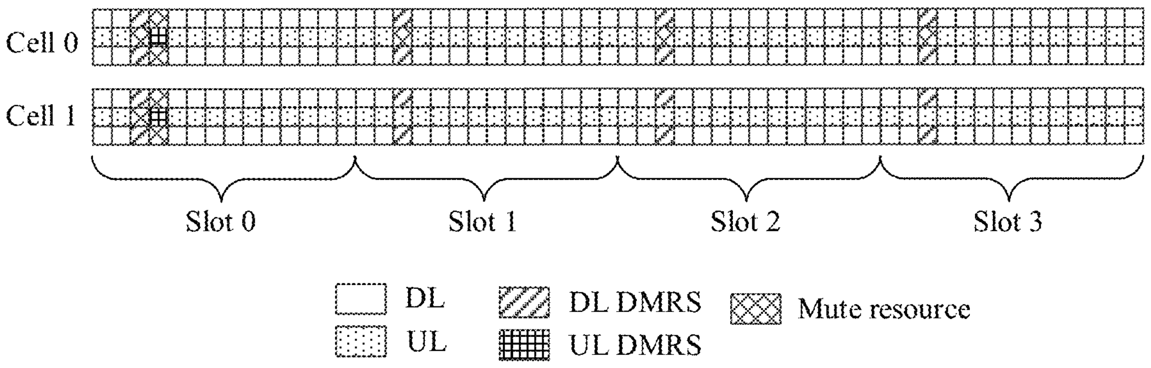
FIG. 28 is a diagram of four-slot UL DMRS sharing according to this application.

For example, an example of a resource reservation manner may be shown in an example of four-slot UL DMRS sharing in FIG. 28.

In an example, there is a UL DMRS in a slot 0, and a slot 1, a slot 2, and a slot 3 share channel information obtained through estimation performed based on the UL DMRS in the slot 0. In this case, a field may be newly added to the DCI, to indicate that DMRS sharing duration is four slots.

Scenario 1: A pilot is shared when SBFD cells coexist.

In an SBFD scenario, a reserved resource on a DL subband may be used to improve accuracy of channel estimation performed based on the UL DMRS, and may also be used to estimate, on the DL subband, adjacent-channel UE-UE CLI exerted by a UL subband to the DL subband. In consideration that the adjacent-channel UE-UE CLI is small, when the UL DMRS does not need to be used for channel estimation in 2−n subsequent slots, no resource needs to be reserved on the DL subband to estimate the adjacent-channel UE-UE CLI. However, adjacent-channel self-interference and adjacent-channel cell-cell CLI are large, the DL DMRS changes in different slots, and a resource continues to be reserved on the UL subband, so that a measurement result of adjacent-channel self-interference and adjacent-channel cell-cell CLI of the DL subband on the UL subband may be updated.

For example, a periodicity of a TDD configuration is five slots, the five slots are slots 0, 1, 2, 3, and 4, and resource reservation does not need to be performed in the slot 4. When the UL DMRS is not shared, both an uplink reserved resource and a downlink reserved resource need to be configured in the slots 0, 1, 2, and 3. When UL DMRS pilot sharing is performed in the slots 0, 1, 2, and 3, no resource needs to be reserved for the DL subband in the slots 1, 2, and 3. In other words, no downlink resource reservation needs to be performed. In this case, a time-frequency position of the reserved resource changes compared with a case in which the UL DMRS is not shared, and needs to be reconfigured by using higher layer signaling. In this case, the slot 0 is the first UL DMRS sharing slot, and the slots 1, 2, and 3 each are another UL DMRS sharing slot. An indication manner of a reserved resource of the first UL DMRS sharing slot may be Manner d1, and an indication manner of a reserved resource of the another UL DMRS sharing slot may be Manner d2.

Manner d1: Both the uplink reserved resource and the downlink reserved resource are configured in the first UL DMRS sharing slot. For a manner in which the network device performs an indication to the terminal device, refer to the methods in the embodiments shown in FIG. 7 and FIG. 12. Mutual references may be made.

Manner d2: Only an uplink reserved resource is configured in the another UL DMRS sharing slot. For a manner in which the network device performs an indication to the terminal device, refer to the methods in the embodiments shown in FIG. 7 and FIG. 12. Mutual references may be made.

Scenario 2: UL DMRS pilot sharing when SBFD and legacy TDD coexist.

An indication manner of a reserved resource of the first UL DMRS sharing slot may be Manner d3, and an indication manner of a reserved resource of the another UL DMRS sharing slot may be Manner d4.

Manner d3: In the first UL DMRS sharing slot, both an uplink reserved resource and a downlink reserved resource are configured in the SBFD cell, and a downlink reserved resource is configured in the legacy TDD cell. For a manner in which the network device performs an indication to the terminal device, refer to the methods in the embodiments shown in FIG. 17. Mutual references may be made.

Manner d4: In the another UL DMRS sharing slot, only an uplink reserved resource is configured in the SBFD cell, and no reserved resource is configured in the legacy TDD cell. For a manner in which a network device serving the SBFD cell performs an indication to the terminal device, refer to the method in the embodiment shown in FIG. 17. Mutual references may be made.

Figure 29:
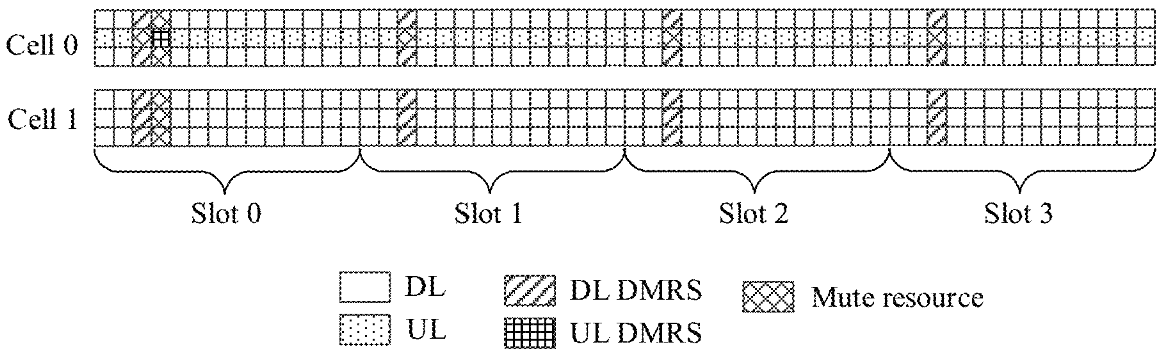
FIG. 29 is a diagram of UL DMRS pilot sharing in an SBFD cell according to this application.

In a possible example, FIG. 29 shows UL DMRS pilot sharing in an SBFD cell.

Scenario 3: Different-Configuration Scenario

An indication manner of a reserved resource of the first UL DMRS sharing slot may be Manner d5, and an indication manner of a reserved resource of the another UL DMRS sharing slot may be Manner d6.

Manner d5: In the first UL DMRS sharing slot, a downlink reserved resource is configured in a legacy TDD cell, and an uplink reserved resource is configured in a new TDD cell. For a manner in which the network device performs an indication to the terminal device, refer to the methods in the embodiments shown in FIG. 23. Mutual references may be made.

Manner d6: In the another UL DMRS sharing slot, no reserved resource is configured in a legacy TDD cell, and an uplink reserved resource is configured in a new TDD cell. For a manner in which a network device serving the new TDD cell performs an indication to the terminal device, refer to the method in the embodiment shown in FIG. 23. Mutual references may be made.

Figure 30:
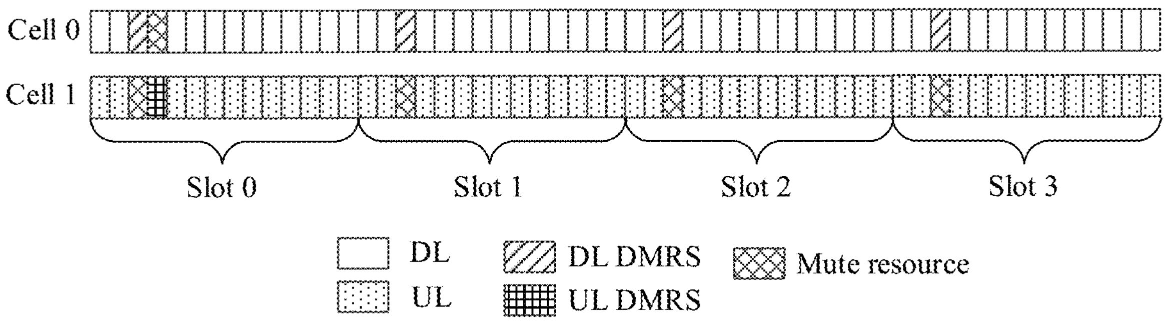
FIG. 30 is a diagram of UL DMRS pilot sharing according to this application.

For example, FIG. 30 shows UL DMRS pilot sharing.

Figure 31:
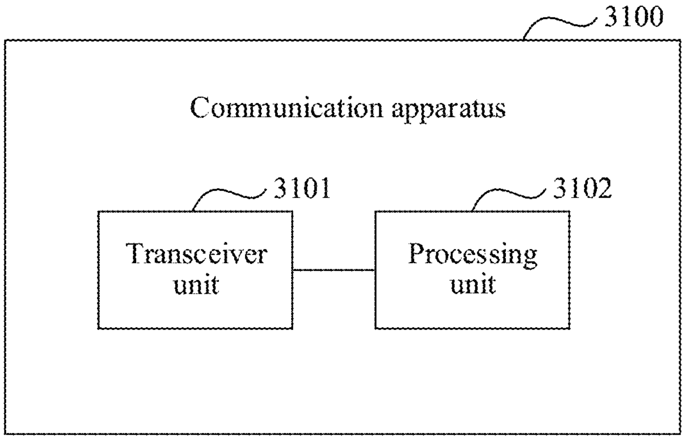
FIG. 31 is a diagram of a structure of a communication apparatus according to this application.

Based on the foregoing embodiments, an embodiment of this application further provides a communication apparatus. As shown in FIG. 31, a communication apparatus 3100 may include a transceiver unit 3101 and a processing unit 3102. The transceiver unit 3101 is configured to be used by the communication apparatus 3100 to receive information (a message or data) or send information (a message or data). The processing unit 3102 is configured to control and manage an action of the communication apparatus 3100. The processing unit 3102 may further control a step performed by the transceiver unit 3101.

For example, the communication apparatus 3100 may be specifically the terminal device in the foregoing embodiments or a processor, a chip, a chip system, a functional module, or the like in the terminal device. Alternatively, the communication apparatus 3100 may be specifically the network device in the foregoing embodiments or a processor, a chip, a chip system, a functional module, or the like in the network device.

In an embodiment, when the communication apparatus 3100 is configured to implement functions of the terminal device in the embodiment shown in FIG. 7 and/or FIG. 12, the following content may be specifically included:

The transceiver unit 3101 is configured to receive first configuration information and second configuration information, and/or third configuration information and fourth configuration information from a network device. The first configuration information indicates a frequency domain range of a first downlink subband and a frequency domain range of a second downlink subband on a carrier and a time domain symbol position of an uplink demodulation reference signal UL DMRS, the second configuration information indicates a frequency domain range of a first time-frequency resource on the first downlink subband and a frequency domain range of a second time-frequency resource on the second downlink subband, the third configuration information indicates a frequency domain range of a first uplink subband on the carrier and a time domain symbol position of a downlink demodulation reference signal DL DMRS, and the fourth configuration information indicates a frequency domain range of a third time-frequency resource and a frequency domain range of a fourth time-frequency resource on the first uplink subband; and the first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband. The processing unit 3102 is configured to: determine the first time-frequency resource and the second time-frequency resource on a carrier in a slot in a first time range based on the first configuration information and the second configuration information; and/or determine the third time-frequency resource and the fourth time-frequency resource on the carrier in the slot in the first time range based on the third configuration information and the fourth configuration information. The transceiver unit 3101 is configured to: receive the zero-power downlink signal on the first time-frequency resource and the second time-frequency resource; and/or send a zero-power uplink signal on the third time-frequency resource and the fourth time-frequency resource.

In an optional manner, the second configuration information indicates that the frequency domain range of the first time-frequency resource is all RBs on the first downlink subband, and the second configuration information indicates that the frequency domain range of the second time-frequency resource is all RBs on the second downlink subband; and the fourth configuration information indicates that the frequency domain range of the third time-frequency resource is all RBs on the first uplink subband, and the fourth configuration information indicates that the frequency domain range of the fourth time-frequency resource is all the RBs on the first uplink subband.

In another optional manner, the second configuration information indicates that the first time-frequency resource occupies M1 RBs, and the second time-frequency resource occupies M2 RBs, the fourth configuration information indicates that the third time-frequency resource occupies N1 RBs, and the fourth time-frequency resource occupies N2 RBs, M1, M2, N1, and N2 are integers greater than or equal to 1, the M1 RBs are some of the RBs included on the first downlink subband, the M2 RBs are some of the RBs included on the second downlink subband, and N1 RBs and N2 RBs are some of the RBs included on the first uplink subband.

For example, the processing unit 3102 is specifically configured to: determine a frequency domain resource of the first time-frequency resource and a frequency domain resource of the second time-frequency resource based on the first configuration information and the second configuration information, and/or determine a frequency domain resource of the third time-frequency resource and a frequency domain resource of the fourth time-frequency resource based on the third configuration information and the fourth configuration information. The frequency domain resource of the first time-frequency resource includes the M1 RBs whose end position is an RB corresponding to a largest RB sequence number on the first downlink subband; the frequency domain resource of the second time-frequency resource includes the M2 RBs whose start position is a resource block corresponding to a smallest RB sequence number on the second downlink subband; the frequency domain resource of the third time-frequency resource includes the N1 RBs whose start position is an RB corresponding to a smallest RB sequence number on the first uplink subband; and the frequency domain resource B of the fourth time-frequency resource includes the N2 RBs whose end position is an RB corresponding to a largest RB sequence number on the first uplink subband.

Optionally, M1 is equal to M2, and N1 is equal to N2.

In an optional implementation, a time domain symbol position of the first time-frequency resource and a time domain symbol position of the second time-frequency resource are the time domain symbol position of the UL DMRS, and a time domain symbol position of the third time-frequency resource and a time domain symbol position of the fourth time-frequency resource are the time domain symbol position of the DL DMRS.

For example, a symbol type of some or all symbols in the slot in the first time range on the first downlink subband is “downlink”, a symbol type of some or all symbols in the slot in the first time range on the second downlink subband is “downlink”, and a symbol type of some or all symbols in the slot in the first time range on the first uplink subband is “uplink”.

Optionally, a time period in which a symbol type of the first downlink subband is “downlink” is the same as a time period in which a symbol type of the second downlink subband is “downlink” in the first time range.

In an embodiment, when the communication apparatus 3100 is configured to implement functions of the network device in the embodiment shown in FIG. 7 and/or FIG. 12, the following content may be specifically included:

The processing unit 3102 is configured to determine first configuration information and second configuration information, and/or third configuration information and fourth configuration information. The first configuration information indicates a frequency domain range of a first downlink subband and a frequency domain range of a second downlink subband on a carrier and a time domain symbol position of an uplink demodulation reference signal UL DMRS, the second configuration information indicates a frequency domain range of a first time-frequency resource on the first downlink subband and a frequency domain range of a second time-frequency resource on the second downlink subband, the third configuration information indicates a frequency domain range of a first uplink subband on the carrier and a time domain symbol position of a downlink demodulation reference signal DL DMRS, and the fourth configuration information indicates a frequency domain range of a third time-frequency resource and a frequency domain range of a fourth time-frequency resource on the first uplink subband; and the first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband. The transceiver unit 3101 is configured to send the first configuration information and the second configuration information, and/or the third configuration information and the fourth configuration information to a terminal device.

In an optional manner, the second configuration information indicates that the frequency domain range of the first time-frequency resource is all RBs on the first downlink subband, and the second configuration information indicates that the frequency domain range of the second time-frequency resource is all RBs on the second downlink subband; and the fourth configuration information indicates that the frequency domain range of the third time-frequency resource is all RBs on the first uplink subband, and the fourth configuration information indicates that the frequency domain range of the fourth time-frequency resource is all the RBs on the first uplink subband.

In another optional manner, the second configuration information indicates that the first time-frequency resource occupies M1 RBs, and the second time-frequency resource occupies M2 RBs, the fourth configuration information indicates that the third time-frequency resource occupies N1 RBs, and the fourth time-frequency resource occupies N2

RBs, M1, M2, N1, and N2 are integers greater than or equal to 1, the M1 RBs are some of the RBs included on the first downlink subband, the M2 RBs are some of the RBs included on the second downlink subband, and N1 RBs and N2 RBs are some of the RBs included on the first uplink subband.

For example, the frequency domain resource of the first time-frequency resource includes the M1 RBs whose end position is an RB corresponding to a largest RB sequence number on the first downlink subband; the frequency domain resource of the second time-frequency resource includes the M2 RBs whose start position is a resource block corresponding to a smallest RB sequence number on the second downlink subband; the frequency domain resource of the third time-frequency resource includes the N1 RBs whose start position is an RB corresponding to a smallest RB sequence number on the first uplink subband; and the frequency domain resource of the fourth time-frequency resource includes the N2 RBs whose end position is an RB corresponding to a largest RB sequence number on the first uplink subband.

Optionally, M1 is equal to M2, and N1 is equal to N2.

In an optional implementation, a time domain symbol position of the first time-frequency resource and a time domain symbol position of the second time-frequency resource are the time domain symbol position of the UL DMRS, and a time domain symbol position of the third time-frequency resource and a time domain symbol position of the fourth time-frequency resource are the time domain symbol position of the DL DMRS.

In a possible example, a symbol type of some or all symbols in the slot in the first time range on the first downlink subband is “downlink”, a symbol type of some or all symbols in the slot in the first time range on the second downlink subband is “downlink”, and a symbol type of some or all symbols in the slot in the first time range on the first uplink subband is “uplink”.

Optionally, a time period in which a symbol type of the first downlink subband is “downlink” is the same as a time period in which a symbol type of the second downlink subband is “downlink” in the first time range.

In an embodiment, when the communication apparatus 3100 is configured to implement functions of the terminal device in the embodiment shown in FIG. 25, the following content may be specifically included:

The transceiver unit 3101 is configured to send a first uplink signal to a network device on a sixth time-frequency resource. A sending time point of the first uplink signal is $t1-(N_{TA}T_c+N_{TA,\ offset}T_c)$, $N_{TA}T_c$ is a timing advance, $N_{TA}$ is greater than or equal to 0, $N_{TA,\ offset}T_c$ is a timing advance offset, a value of $N_{TA,\ offset}$ is 0, $T_c$ is a time unit, a value of $T_c$ is 1/(48000×4096), a unit of $T_c$ is second, a frequency domain resource on which the sixth time-frequency resource is located is on a first uplink subband, t1 is a time point at which a first downlink signal arrives at the terminal device, $t1=t0+N_{TA}T_c/2$, a fifth time-frequency resource is used by the network device to send the first downlink signal, a sending time point of the first downlink signal is t0, a frequency domain resource on which the fifth time-frequency resource is located is on a first downlink subband and/or a second downlink subband, a start moment of the fifth time-frequency resource and a start moment of the sixth time-frequency resource are t0, the first uplink subband, the first downlink subband, and the second downlink subband are consecutive frequency domain resources on a frequency domain resource corresponding to a carrier, a frequency of the first uplink subband is greater than a frequency of the first downlink subband, and a frequency of the second downlink subband is greater than the frequency of the first uplink subband. The processing unit 3102 is configured to control the transceiver unit 3101 to perform the foregoing operations.

Optionally, one or more last symbols in symbols included on a first subband in an $n^{th}$ slot are uplink symbols, the first subband is the first downlink subband, the second downlink subband, or the first uplink subband, n is an integer greater than or equal to 0, one or more start symbols in symbols included on the first subband in an $(n+1)^{th}$ slot are downlink symbols, and no uplink signal is sent on the last symbol of the symbols included on the first subband in the $n^{th}$ slot.

In an optional implementation, the transceiver unit 3101 is further configured to receive configuration information from the network device. The configuration information indicates that the value of $N_{TA,\ offset}$ is 0.

In an embodiment, when the communication apparatus 3100 is configured to implement functions of the network device in the embodiment shown in FIG. 25, the following content may be specifically included:

The transceiver unit 3101 is configured to receive a first uplink signal from a terminal device on a sixth time-frequency resource. A sending time point of the first uplink signal is $t1-(N_{TA}T_c+N_{TA,\ offset}T_c)$, $N_{TA}T_c$ is a timing advance, $N_{TA}$ is greater than or equal to 0, $N_{TA,\ offset}T_c$ is a timing advance offset, a value of $N_{TA,\ offset}$ is 0, $T_c$ is a time unit, a value of $T_c$ is 1/(48000×4096), a unit of $T_c$ is second, a frequency domain resource on which the sixth time-frequency resource is located is on a first uplink subband, t1 is a time point at which a first downlink signal arrives at the terminal device, $t1=t+N_{TA}T_c/2$, a fifth time-frequency resource is used by the network device to send the first downlink signal, a sending time point of the first downlink signal is t0, a frequency domain resource on which the fifth time-frequency resource is located is on a first downlink subband and/or a second downlink subband, a start moment of the fifth time-frequency resource and a start moment of the sixth time-frequency resource are t0, the first uplink subband, the first downlink subband, and the second downlink subband are consecutive frequency domain resources on a frequency domain resource corresponding to a carrier, a frequency of the first uplink subband is greater than a frequency of the first downlink subband, and a frequency of the second downlink subband is greater than the frequency of the first uplink subband. The processing unit 3102 is configured to control the transceiver unit 3101 to perform the foregoing operations.

Optionally, one or more last symbols in symbols included on a first subband in an $n^{th}$ slot are uplink symbols, the first subband is the first downlink subband, the second downlink subband, or the first uplink subband, n is an integer greater than or equal to 0, one or more start symbols in symbols included on the first subband in an $(n+1)^{th}$ slot are downlink symbols, and no uplink signal is received on the last symbol of the symbols included on the first subband in the $n^{th}$ slot.

In an optional implementation, the transceiver unit 3101 is further configured to send configuration information to the terminal device. The configuration information indicates that the value of $N_{TA,\ offset}$ is 0.

It should be noted that, in this embodiment of this application, division into the units is an example, and is merely a logical function division. During actual implementation, another division manner may be used. Functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Figure 32:
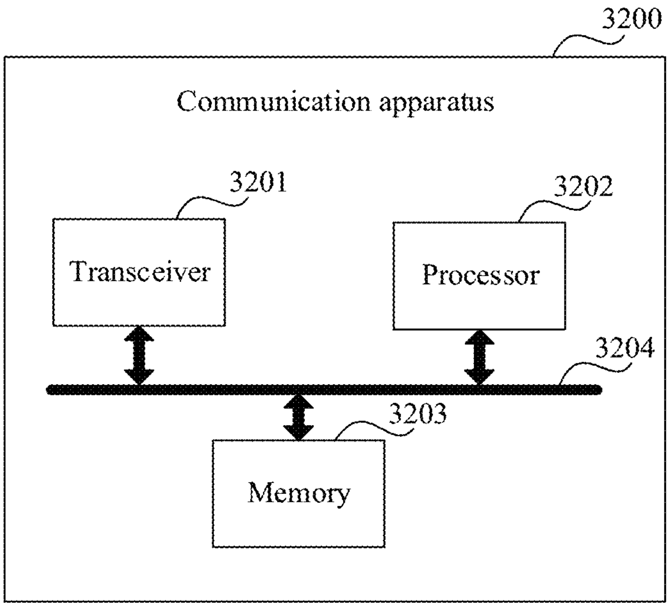
FIG. 32 is a diagram of a structure of a communication apparatus according to this application.

Based on the foregoing embodiments, an embodiment of this application further provides a communication apparatus. As shown in FIG. 32, a communication apparatus 3200 may include a transceiver 3201 and a processor 3202. Optionally, the communication apparatus 3200 may further include a memory 3203. The memory 3203 may be disposed inside the communication apparatus 3200, or may be disposed outside the communication apparatus 3200. The processor 3202 may control the transceiver 3201 to receive and send information, a message, data, or the like.

Specifically, the processor 3202 may be a central processing unit (central processing unit, CPU), a network processor (network processor, NP), or a combination of a CPU and an NP. The processor 3202 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), a generic array logic (generic array logic, GAL), or any combination thereof.

The transceiver 3201, the processor 3202, and the memory 3203 are connected to each other. Optionally, the transceiver 3201, the processor 3202, and the memory 3203 are connected to each other through a bus 3204. The bus 3204 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 32, but this does not mean that there is only one bus or only one type of bus.

In an optional implementation, the memory 3203 is configured to store a program, and the like. Specifically, the program may include program code, and the program code includes computer operation instructions. The memory 3203 may include a RAM, and may further include a nonvolatile memory (nonvolatile memory), for example, one or more disk memories. The processor 3202 executes an application program stored in the memory 3203, to implement the foregoing functions, so as to implement a function of the communication apparatus 3200.

For example, the communication apparatus 3200 may be the terminal device in the foregoing embodiments, or may be the network device in the foregoing embodiments.

In an embodiment, when the communication apparatus 3200 implements a function of the terminal device in the embodiment shown in FIG. 7, the transceiver 3201 may implement a receiving/sending operation performed by the terminal device in the embodiment shown in FIG. 7, and the processor 3202 may implement another operation other than the receiving/sending operation performed by the terminal device in the embodiment shown in FIG. 7. Specifically, for related specific descriptions, refer to related descriptions in the embodiment shown in FIG. 7. Details are not described herein again.

In an embodiment, when the communication apparatus 3200 implements a function of the network device in the embodiment shown in FIG. 7, the transceiver 3201 may implement a receiving/sending operation performed by the network device in the embodiment shown in FIG. 7, and the processor 3202 may implement another operation other than the receiving/sending operation performed by the network device in the embodiment shown in FIG. 7. Specifically, for related specific descriptions, refer to related descriptions in the embodiment shown in FIG. 7. Details are not described herein again.

In an embodiment, when the communication apparatus 3200 implements a function of the terminal device in the embodiment shown in FIG. 12, the transceiver 3201 may implement a receiving/sending operation performed by the terminal device in the embodiment shown in FIG. 12, and the processor 3202 may implement another operation other than the receiving/sending operation performed by the terminal device in the embodiment shown in FIG. 12. Specifically, for related specific descriptions, refer to related descriptions in the embodiment shown in FIG. 12. Details are not described herein again.

In an embodiment, when the communication apparatus 3200 implements a function of the network device in the embodiment shown in FIG. 12, the transceiver 3201 may implement a receiving/sending operation performed by the network device in the embodiment shown in FIG. 12, and the processor 3202 may implement another operation other than the receiving/sending operation performed by the network device in the embodiment shown in FIG. 12. Specifically, for related specific descriptions, refer to related descriptions in the embodiment shown in FIG. 12. Details are not described herein again.

In an embodiment, when the communication apparatus 3200 implements a function of the terminal device in the embodiment shown in FIG. 25, the transceiver 3201 may implement a receiving/sending operation performed by the terminal device in the embodiment shown in FIG. 25, and the processor 3202 may implement another operation other than the receiving/sending operation performed by the terminal device in the embodiment shown in FIG. 25. Specifically, for related specific descriptions, refer to related descriptions in the embodiment shown in FIG. 25. Details are not described herein again.

In an embodiment, when the communication apparatus 3200 implements a function of the network device in the embodiment shown in FIG. 25, the transceiver 3201 may implement a receiving/sending operation performed by the network device in the embodiment shown in FIG. 25, and the processor 3202 may implement another operation other than the receiving/sending operation performed by the network device in the embodiment shown in FIG. 25. Specifically, for related specific descriptions, refer to related descriptions in the embodiment shown in FIG. 25. Details are not described herein again.

Based on the foregoing embodiments, an embodiment of this application provides a communication system. The communication system may include the terminal device, the network device, and the like in the foregoing embodiments.

An embodiment of this application further provides a computer-readable storage medium. The computer-readable storage medium is configured to store a computer program. When the computer program is executed by a computer, the computer may implement the communication method provided in the method embodiments.

An embodiment of this application further provides a computer program product. The computer program product is configured to store a computer program. When the computer program is executed by a computer, the computer may implement the communication method provided in the method embodiments.

An embodiment of this application further provides a chip, including a processor. The processor is coupled to a memory, and is configured to invoke a program in the memory, so that the chip implements the communication method provided in the method embodiments.

An embodiment of this application further provides a chip. The chip is coupled to a memory, and the chip is configured to implement the communication method provided in the method embodiments.

A person skilled in the art should understand that the embodiments of this application may be provided as a method, a system, or a computer program product. Therefore, this application may be in a form of a hardware-only embodiment, a software-only embodiment, or an embodiment with a combination of software and hardware. In addition, this application may be in a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable storage that can instruct the computer or the another programmable data processing device to work in a specific way, so the instructions stored in the computer-readable storage generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:

receiving first configuration information, second configuration information, third configuration information, and fourth configuration information from a network device, wherein the first configuration information indicates a frequency domain range of a first downlink subband and a frequency domain range of a second downlink subband on a carrier and a time domain symbol position of an uplink demodulation reference signal (UL DMRS), the second configuration information indicates a frequency domain range of a first time-frequency resource on the first downlink subband and a frequency domain range of a second time-frequency resource on the second downlink subband, the third configuration information indicates a frequency domain range of a first uplink subband on the carrier and a time domain symbol position of a downlink demodulation reference signal (DL DMRS), and the fourth configuration information indicates a frequency domain range of a third time-frequency resource and a frequency domain range of a fourth time-frequency resource on the first uplink subband, and wherein the first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband;

determining the first time-frequency resource and the second time-frequency resource on a carrier in a slot in a first time range based on the first configuration information and the second configuration information;

receiving a zero-power downlink signal on the first time-frequency resource and the second time-frequency resource;

determining the third time-frequency resource and the fourth time-frequency resource on the carrier in the slot in the first time range based on the third configuration information and the fourth configuration information; and sending a zero-power uplink signal on the third time-frequency resource and the fourth time-frequency resource.

2. The method according to claim 1, wherein the second configuration information indicates that the frequency domain range of the first time-frequency resource is resource blocks (RBs) on the first downlink subband, and the second configuration information indicates that the frequency domain range of the second time-frequency resource is RBs on the second downlink subband; and the fourth configuration information indicates that the frequency domain range of the third time-frequency resource is RBs on the first uplink subband, and the fourth configuration information indicates that the frequency domain range of the fourth time-frequency resource is the RBs on the first uplink subband.

3. The method according to claim 1, wherein the second configuration information indicates that the first time-frequency resource occupies M1 RBs and the second time-frequency resource occupies M2 RBs, wherein the fourth configuration information indicates that the third time-frequency resource occupies N1 RBs and the fourth time-frequency resource occupies N2 RBs, wherein M1, M2, N1, and N2 are integers greater than or equal to 1, and wherein the M1 RBs are comprised on the first downlink subband, the M2 RBs are RBs comprised on the second downlink subband, and N1 RBs and N2 RBs are comprised on the first uplink subband.

4. The method according to claim 3, wherein the method further comprises:

determining a frequency domain resource of the first time-frequency resource and a frequency domain resource of the second time-frequency resource based on the first configuration information and the second configuration information; and determining a frequency domain resource of the third time-frequency resource and a frequency domain resource of the fourth time-frequency resource based on the third configuration information and the fourth configuration information, wherein:

the frequency domain resource of the first time-frequency resource comprises the M1 RBs whose end position is an RB corresponding to a largest RB sequence number on the first downlink subband;

the frequency domain resource of the second time-frequency resource comprises the M2 RBs whose start position is a resource block corresponding to a smallest RB sequence number on the second downlink subband;

the frequency domain resource of the third time-frequency resource comprises the N1 RBs whose start position is an RB corresponding to a smallest RB sequence number on the first uplink subband; and the frequency domain resource of the fourth time-frequency resource comprises the N2 RBs whose end position is an RB corresponding to a largest RB sequence number on the first uplink subband.

5. The method according to claim 3, wherein M1 is equal to M2, and N1 is equal to N2.

6. The method according to claim 1, wherein a time domain symbol position of the first time-frequency resource and a time domain symbol position of the second time-frequency resource are the time domain symbol position of the UL DMRS, and a time domain symbol position of the third time-frequency resource and a time domain symbol position of the fourth time-frequency resource are the time domain symbol position of the DL DMRS.

7. A communication method, comprising:

determining first configuration information, second configuration information, third configuration information, and fourth configuration information, wherein the first configuration information indicates a frequency domain range of a first downlink subband and a frequency domain range of a second downlink subband on a carrier and a time domain symbol position of an uplink demodulation reference signal (UL DMRS), the second configuration information indicates a frequency domain range of a first time-frequency resource on the first downlink subband and a frequency domain range of a second time-frequency resource on the second downlink subband, the third configuration information indicates a frequency domain range of a first uplink subband on the carrier and a time domain symbol position of a downlink demodulation reference signal (DL DMRS), and the fourth configuration information indicates a frequency domain range of a third time-frequency resource and a frequency domain range of a fourth time-frequency resource on the first uplink subband, and wherein the first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband; and sending the first configuration information, the second configuration information, the third configuration information, and the fourth configuration information to a terminal device.

8. The method according to claim 7, wherein the second configuration information indicates that the frequency domain range of the first time-frequency resource is resource blocks (RBs) on the first downlink subband, and the second configuration information indicates that the frequency domain range of the second time-frequency resource is RBs on the second downlink subband; and the fourth configuration information indicates that the frequency domain range of the third time-frequency resource is RBs on the first uplink subband, and the fourth configuration information indicates that the frequency domain range of the fourth time-frequency resource is the RBs on the first uplink subband.

9. The method according to claim 7, wherein the second configuration information indicates that the first time-frequency resource occupies M1 RBs and the second time-frequency resource occupies M2 RBs, wherein the fourth configuration information indicates that the third time-frequency resource occupies N1 RBs and the fourth time-frequency resource occupies N2 RBs, wherein M1, M2, N1, and N2 are integers greater than or equal to 1, and wherein the M1 RBs are comprised on the first downlink subband, the M2 RBs are RBs comprised on the second downlink subband, and N1 RBs and N2 RBs are comprised on the first uplink subband.

10. The method according to claim 9, wherein the frequency domain resource of the first time-frequency resource comprises the M1 RBs whose end position is an RB corresponding to a largest RB sequence number on the first downlink subband;

the frequency domain resource of the second time-frequency resource comprises the M2 RBs whose start position is an RB corresponding to a smallest RB sequence number on the second downlink subband;

the frequency domain resource of the third time-frequency resource comprises the N1 RBs whose start position is an RB corresponding to a smallest RB sequence number on the first uplink subband; and the frequency domain resource of the fourth time-frequency resource comprises the N2 RBs whose end position is an RB corresponding to a largest RB sequence number on the first uplink subband.

11. The method according to claim 9, wherein M1 is equal to M2, and N1 is equal to N2.

12. The method according to claim 7, wherein a time domain symbol position of the first time-frequency resource and a time domain symbol position of the second time-frequency resource are the time domain symbol position of the UL DMRS, and a time domain symbol position of the third time-frequency resource and a time domain symbol position of the fourth time-frequency resource are the time domain symbol position of the DL DMRS.

13. A communication apparatus, comprising:

at least one processor; and a memory storing programming instructions for execution by the at least one processor, the programming instructions instructing the communication apparatus to perform operations comprising:

receiving first configuration information, second configuration information, third configuration information, and fourth configuration information from a network device, wherein the first configuration information indicates a frequency domain range of a first downlink subband and a frequency domain range of a second downlink subband on a carrier and a time domain symbol position of an uplink demodulation reference signal (UL DMRS), the second configuration information indicates a frequency domain range of a first time-frequency resource on the first downlink subband and a frequency domain range of a second time-frequency resource on the second downlink subband, the third configuration information indicates a frequency domain range of a first uplink subband on the carrier and a time domain symbol position of a downlink demodulation reference signal (DL DMRS), and the fourth configuration information indicates a frequency domain range of a third time-frequency resource and a frequency domain range of a fourth time-frequency resource on the first uplink subband, and wherein the first uplink subband, the first downlink subband, and the second downlink subband are consecutive frequency domain resources on a frequency domain resource corresponding to the carrier, a frequency of the first uplink subband is greater than a frequency of the first downlink subband, and a frequency of the second downlink subband is greater than the frequency of the first uplink subband;

determining the first time-frequency resource and the second time-frequency resource on a carrier in a slot in a first time range based on the first configuration information and the second configuration information;

receiving a zero-power downlink signal on the first time-frequency resource and the second time-frequency resource; and/or determining the third time-frequency resource and the fourth time-frequency resource on the carrier in the slot in the first time range based on the third configuration information and the fourth configuration information; and sending a zero-power uplink signal on the third time-frequency resource and the fourth time-frequency resource.

14. The apparatus according to claim 13, wherein the second configuration information indicates that the frequency domain range of the first time-frequency resource is resource blocks (RBs) on the first downlink subband, and the second configuration information indicates that the frequency domain range of the second time-frequency resource is RBs on the second downlink subband; and the fourth configuration information indicates that the frequency domain range of the third time-frequency resource is RBs on the first uplink subband, and the fourth configuration information indicates that the frequency domain range of the fourth time-frequency resource is the RBs on the first uplink subband.

15. The apparatus according to claim 13, wherein the second configuration information indicates that the first time-frequency resource occupies M1 RBs and the second time-frequency resource occupies M2 RBs, wherein the fourth configuration information indicates that the third time-frequency resource occupies N1 RBs and the fourth time-frequency resource occupies N2 RBs, wherein M1, M2, N1, and N2 are integers greater than or equal to 1, and wherein the M1 RBs are comprised on the first downlink subband, the M2 RBs are RBs comprised on the second downlink subband, and N1 RBs and N2 RBs are comprised on the first uplink subband.

16. The apparatus according to claim 15, wherein the operations further comprises:

determining a frequency domain resource of the first time-frequency resource and a frequency domain resource of the second time-frequency resource based on the first configuration information and the second configuration information; and determining a frequency domain resource of the third time-frequency resource and a frequency domain resource of the fourth time-frequency resource based on the third configuration information and the fourth configuration information, wherein:

the frequency domain resource of the first time-frequency resource comprises the M1 RBs whose end position is an RB corresponding to a largest RB sequence number on the first downlink subband;

the frequency domain resource of the second time-frequency resource comprises the M2 RBs whose start position is a resource block corresponding to a smallest RB sequence number on the second downlink subband;

the frequency domain resource of the third time-frequency resource comprises the N1 RBs whose start position is an RB corresponding to a smallest RB sequence number on the first uplink subband; and the frequency domain resource of the fourth time-frequency resource comprises the N2 RBs whose end position is an RB corresponding to a largest RB sequence number on the first uplink subband.

17. The apparatus according to claim 15, wherein M1 is equal to M2, and N1 is equal to N2.

18. The apparatus according to claim 13, wherein a time domain symbol position of the first time-frequency resource and a time domain symbol position of the second time-frequency resource are the time domain symbol position of the UL DMRS, and a time domain symbol position of the third time-frequency resource and a time domain symbol position of the fourth time-frequency resource are the time domain symbol position of the DL DMRS.

* * * * *